US012606747B2

(12) United States Patent
Li et al.

(10) Patent No.: US 12,606,747 B2
(45) Date of Patent: Apr. 21, 2026

(54) SURFACTANT

(71) Applicant: Sphere Fluidics Limited, Cambridgeshire (GB)

(72) Inventors: Xin Li, Cambridgeshire (GB); Clive Smith, Cambridgeshire (GB); Ben Mackworth, Cambridgeshire (GB)

(73) Assignee: Sphere Fluidics Limited, Cambridgeshire (GB)

(*) Notice: Subject to any disclaimer, the term of this patent is extended or adjusted under 35 U.S.C. 154(b) by 680 days.

(21) Appl. No.: 17/922,283

(22) PCT Filed: May 4, 2021

(86) PCT No.: PCT/EP2021/061677
§ 371 (c)(1),
(2) Date: Oct. 28, 2022

(87) PCT Pub. No.: WO2021/224229
PCT Pub. Date: Nov. 11, 2021

(65) Prior Publication Data
US 2023/0193137 A1 Jun. 22, 2023

(30) Foreign Application Priority Data
May 4, 2020 (GB) .................................... 2006525

(51) Int. Cl.
*C09K 23/42* (2022.01)

(52) U.S. Cl.
CPC .................................. *C09K 23/42* (2022.01)

(58) Field of Classification Search
CPC ............................ C08G 65/007; C09K 23/42
See application file for complete search history.

(56) References Cited

U.S. PATENT DOCUMENTS 3,621,059 A 11/1971 Bartlett
5,587,153 A 12/1996 Angelone et al.
6,017,546 A 1/2000 Glover
6,162,421 A 12/2000 Ordino
6,379,682 B1 4/2002 Tchinnis
7,129,091 B2 10/2006 Ismagilov et al.
8,273,573 B2 9/2012 Ismagilov et al.
8,304,193 B2 11/2012 Ismagilov et al.
8,329,407 B2 12/2012 Ismagilov et al.
8,822,148 B2 9/2014 Ismagilov et al.
8,889,083 B2 11/2014 Ismagilov et al.
9,012,390 B2 * 4/2015 Holtze ................. C08G 81/00 435/212
9,498,761 B2 11/2016 Holtze et al.
9,839,893 B2 12/2017 Ismagilov et al.
10,054,961 B2 8/2018 Ismagilov et al.
10,118,174 B2 11/2018 Ismagilov et al.
2002/0172703 A1 11/2002 Lorant et al.
2004/0081633 A1 4/2004 Mercier et al.
2005/0087122 A1 4/2005 Ismagilov et al.
2005/0096244 A1 * 5/2005 Audenaert ............ C08G 65/08 562/587
2007/0275415 A1 11/2007 Srinivasan
2008/0053205 A1 3/2008 Pollack et al.
2016/0051960 A1 2/2016 Ismagilov et al.
2019/0113509 A1 4/2019 Wagner et al.
2020/0017635 A1 * 1/2020 Li ....................... C12Q 1/6806
2020/0188920 A1 6/2020 Delaney et al.
2020/0316545 A1 * 10/2020 Li ..................... B01D 11/0492
2023/0097116 A1 * 3/2023 Kang .................... C09K 23/42 528/405

FOREIGN PATENT DOCUMENTS

CN 101646645 2/2010
CN 101765581 6/2010
CN 109310965 2/2019
CN 110845719 2/2020
EP 2077912 7/2009
EP 2282214 2/2011

(Continued)

OTHER PUBLICATIONS

International Preliminary Report on Patentability for application No. PCT/EP2021/061677, mailed on Nov. 17, 2022, 7 pages.
Chowdhury et al., "Dendronized fluorosurfactant for highly stable water-in-fluorinated oil emulsions with minimal inter-droplet transfer of small molecules," *Nature Communications*, vol. 10, No. 1, Oct. 4, 2019, 10 pages.
Duncanson et al, "Microfluidic synthesis of monodisperse porous microspheres with size-tunable pores", Soft Matters, vol. 8, 2012, pp. 10636-10640.
Krafft et al, "Synthesis and preliminary data on the biocompatibility and emulsifying properties of perfluoroalkylated phosphoramidates", European Journal of Medicinal Chemistry, vol. 26, 1991, pp. 545-550.
PCT International Search Report and Written Opinion (w/ English translation) for corresponding PCT Application No. PCT/EP2021/061677, mailed on Jul. 19, 2021, 14 pages.

(Continued)

*Primary Examiner* — Karuna P Reddy
(74) *Attorney, Agent, or Firm* — Dority & Manning, P.A.

(57) ABSTRACT

The present invention provides a surfactant of formula (I): $(A)_m$-X—$(B)_n$ (I) wherein X is a linking group; each A is independently a fluorocarbon or a perfluoropolyether; each B is independently (II) wherein a is an integer between 3 and 50 and each R is independently $C_{1-6}$ alkyl, $CH_2CH_2OC_{1-6}$ alkyl or $CH_2CH(CH_3)OC_{1-6}$ alkyl; m is an integer between 1 and 10; and n is an integer between 1 and 10.

(II)

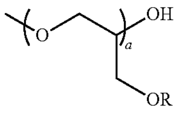

22 Claims, 6 Drawing Sheets

(56) References Cited

FOREIGN PATENT DOCUMENTS

| | | | | |
|---|---|---|---|---|
| EP | 3536396 | | | 9/2019 |
| JP | H01-246237 | A | | 10/1989 |
| JP | H01-308242 | A | | 12/1989 |
| WO | WO-8300162 | A | * | 1/1983 |
| WO | WO2004/038363 | | | 5/2004 |
| WO | WO2005/099661 | | | 10/2005 |
| WO | WO 2005/107764 | A1 | | 11/2005 |
| WO | WO2008/021123 | | | 2/2008 |
| WO | WO2008/063227 | | | 5/2008 |
| WO | WO2009/050512 | | | 4/2009 |
| WO | WO2014/138711 | | | 9/2014 |
| WO | WO2015/015199 | | | 2/2015 |
| WO | WO 2017/002560 | A1 | | 1/2017 |
| WO | WO2017/203280 | | | 11/2017 |
| WO | WO2018/236615 | | | 12/2018 |
| WO | WO2019/020626 | | | 1/2019 |
| WO | WO2019/106366 | | | 6/2019 |

OTHER PUBLICATIONS

Wagner et al, "Biocompatible fluorinated polyglycerols for droplet microfluidics as an alternative to PEG-based copolymer surfactants", Lab on a Chip, Nov. 24, 2015, 5 pages.

Wagner et al, "Perfluoroalkyl-Functionalized Hyperbranched Polyglycerol as Pore Forming Agents and Supramolecular Hosts in Polymer Microspheres", International Journal of Molecular Science, vol. 16, 2015, pp. 20183-20194.

Office Action (with English translation) received in corresponding Application No. CN 2021800330086, dated Jan. 9, 2025, 10 pages.

English Translation of Office Action in corresponding JP Application No. 2022-567281, dated Jun. 4, 2025, in 5 pgs.

* cited by examiner

SURFACTANT

CROSS-REFERENCE TO RELATED APPLICATIONS

This application is a national stage of PCT Patent Application No. PCT/EP2021/061677, filed on May 4, 2021, which, in turn, claims the right of priority to GB Patent Application No. 2006525.6, filed on May 4, 2020, the entire contents of both of which are hereby incorporated herein by reference in their entirety for all purposes.

INTRODUCTION

The present invention relates to a surfactants of formula (I) that are particularly useful for the stabilisation of water in oil emulsions, e.g. in microfluidic devices. The surfactants of formula (I) generally have a star structure. The present invention also relates to a method for making surfactants of formula (I) as well as to compositions, such as emulsions, comprising the surfactant of formula (I). Additionally, the present invention relates to uses of compounds of formula (I) as a surfactant and to various methods, wherein the surfactant and/or emulsions comprising the surfactant, are employed, e.g. in droplet generation, droplet sorting, coalescing droplets, splitting droplets, dispensing of droplets, etc.

BACKGROUND

Surfactants have been used for many years in the production of stable emulsions for various applications. General background prior art relating to emulsions can be found in the following: U.S. Pat. Nos. 5,587,153; 6,017,546; WO2005/099661; US2004/081633; U.S. Pat. No. 6,379,682; US2002/172703; WO2004/038363; US2005/087122; US2007/275415 and US2008/053205. Conventional surfactants generally comprise a hydrophilic head group soluble in an aqueous phase of an emulsion and one or more lipophilic tails soluble in an oil phase of an emulsion.

More recently, surfactant-stabilised emulsions comprising droplets of water in a continuous oil phase have found applications in microfluidic technologies, enabling, for example, high-throughput screening, enzyme studies, nucleic acid amplification and other biological processes to be conducted. Biological assays may, for example, be performed in microfluidic devices using a very small quantity of biological material. Further information relating to microfluidic technology can be found in our previous applications WO2009/050512 and WO2015/015199. Other general background prior art on droplets can be found in patents/applications in the name of RainDance Technologies Inc., for example WO2008/063227.

In microfluidic applications the use of oils and especially fluorous oils as the continuous phase in emulsion formation and production is beneficial because they have useful microfluidic properties, such as low friction, non-volatility (unlike alcohols), temperature-resistance and can easily create oil-water emulsions.

However, conventional surfactants are generally not suitable for stabilising emulsions comprising a fluorous oil phase due to solubility issues. Furthermore, many conventional surfactants are toxic to biological molecules and to cells and can hinder gas transfer from the external environment to the inner regions of the emulsion.

New surfactants suitable for stabilising water in oil (e.g. fluorous oil) emulsions, and in particular such emulsions comprising hydrophobic small organic molecules in the aqueous phase, are therefore required.

SUMMARY OF INVENTION

Viewed from a first aspect the present invention provides a surfactant of formula (I):

$$(A)_m\text{-}X\text{—}(B)_n \qquad (I)$$

wherein

X is a linking group;

each A is independently a fluorocarbon or a perfluoropolyether;

each B is independently

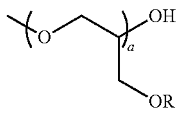

wherein a is an integer between 3 and 50 and each R is independently $C_{1-6}$ alkyl, $CH_2CH_2OC_{1-6}$ alkyl or $CH_2CH(CH_3)OC_{1-6}$ alkyl;

m is an integer between 1 and 10; and n is an integer between 1 and 10.

Viewed from a further aspect the present invention provides a method for making a surfactant as hereinbefore described comprising:

reacting a compound of formula (II)

$$(A)_m\text{-}X\text{—}(OH)_n \qquad (II)$$

wherein

X is a linking group;

each A is independently a fluorocarbon or a perfluoropolyether;

m is an integer between 1 and 10;

n is an integer between 1 and 10; and with a compound of formula (III)

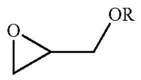

(III)

wherein each R is independently $C_{1-6}$ alkyl, $CH_2CH_2OC_{1-6}$ alkyl or $CH_2CH(CH_3)OC_{1-6}$ alkyl.

Viewed from a further aspect the present invention provides a method for making a surfactant as hereinbefore described comprising reacting a compound comprising (A)m with a compound comprising (B)n, wherein said reaction is a coupling reaction and forms linker X between said (A)m and said (B)n.

Viewed from a further aspect the present invention provides a composition, preferably an emulsion, comprising a surfactant of formula (I) as hereinbefore described.

Viewed from a further aspect the present invention provides an emulsion comprising a surfactant of formula (I) as hereinbefore described.

Viewed from a further aspect the present invention provides the use of a compound as hereinbefore defined as a surfactant of formula (I).

Viewed from a further aspect the present invention provides the use of a surfactant of formula (I) as hereinbefore described in the preparation of an emulsion.

Viewed from a further aspect the present invention provides a method of preparing an emulsion as hereinbefore defined comprising:

(i) providing an aqueous phase;

(ii) providing an oil phase, preferably a fluorous oil phase; and (iii) mixing said aqueous phase, said oil phase and a surfactant of formula (I) as hereinbefore defined to form said emulsion.

Viewed from a further aspect the present invention provides a method comprising performing one or more chemical and/or biological reactions, and/or biological processes in the discontinuous aqueous phase of an emulsion as hereinbefore defined.

Viewed from a further aspect the present invention provides a method for sorting droplets in a microfluidic device, the method comprising:

(i) providing a stream of aqueous droplets in an emulsion as hereinbefore defined in a channel of the microfluidic device;

(ii) illuminating the stream from a first direction;

(iii) detecting light from analytes within the droplets in a second direction; and (iv) sorting the droplets into one of a plurality of differentiated streams responsive to the detected light or a measurable signal.

Viewed from a further aspect the present invention provides a method of coalescing droplets in a microfluidic device, the method comprising:

(i) providing at least two aqueous droplets in an emulsion as hereinbefore defined in a channel of the microfluidic device; and (ii) exposing the aqueous droplets to an electric field, thereby causing coalescence of the at least two aqueous droplets into a single droplet.

Viewed from a further aspect the present invention provides a method of introducing a fluid into a droplet in a microfluidic device, the method comprising:

(i) providing an aqueous droplet in an emulsion as hereinbefore defined in a channel of the microfluidic device; and (ii) contacting the aqueous droplet with a stream of fluid, thereby introducing said fluid into the aqueous droplet.

Viewed from a further aspect the present invention provides a method of splitting droplets in a microfluidic device, the method comprising:

(i) providing a microfluidic device comprising a microfluidic junction, said microfluidic junction comprising a first microfluidic channel, a second microfluidic channel and a third microfluidic channel;

(ii) providing an aqueous droplet in an emulsion as hereinbefore defined in said first microfluidic channel; and (iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel.

Viewed from a further aspect the present invention provides a method of dispensing droplets of an emulsion as hereinbefore defined in a microfluidic device, the method comprising:

receiving droplets of an emulsion as hereinbefore defined in a droplet outlet line from a droplet feed line;

ejecting a droplet from said droplet outlet line through droplet outlet by providing a pressurised dispensing fluid into said droplet outlet line;

receiving droplets in a waste line from droplet outlet line when pressurised dispensing fluid is not provided into droplet outlet line; and protecting droplets upstream of said droplet outlet line by providing pressurised dispensing fluid upstream of droplet outlet line.

Viewed from a further aspect the present invention provides a method of dispensing droplets of an emulsion as hereinbefore defined in a microfluidic device, the method comprising:

receiving droplets of an emulsion as hereinbefore defined in a droplet outlet line from a droplet feed line;

ejecting a droplet from said droplet outlet line through droplet outlet by providing a pressurised dispensing fluid into said droplet outlet line;

receiving droplets in a waste line when pressurised dispensing fluid is not provided into droplet outlet line; and injecting fluid into the waste line when pressurised dispensing fluid is provided into droplet outlet line.

Viewed from a further aspect the present invention provides a method of sorting droplets in a microfluidic device, the method comprising:

(i) providing a microfluidic device comprising a microfluidic junction, said microfluidic junction comprising a first microfluidic channel, a second microfluidic channel and a third microfluidic channel;

(ii) providing an aqueous droplet in an emulsion as hereinbefore defined in said first microfluidic channel;

(iii) passing the aqueous droplet through the microfluidic junction, thereby splitting said aqueous droplet into at least a first daughter droplet and a second daughter droplet, the first daughter droplet in the second microfluidic channel and the second daughter droplet in the third microfluidic channel;

(iv) detecting said first daughter droplet by mass spectroscopy; and (v) sorting said second daughter droplets into one of a plurality of differentiated streams responsive to the mass spectroscopy on said first daughter droplet.

Viewed from a further aspect the present invention provides a method of extracting a molecule from a fluid, the method comprising:

(i) dissolving a surfactant of formula (I) as hereinbefore defined in carbon dioxide to form a carbon dioxide/surfactant of formula (I) mixture;

(ii) adding a fluid comprising the molecule to the carbon dioxide/surfactant of formula (I) mixture, thereby extracting the molecule from the fluid into the carbon dioxide.

Viewed from a further aspect the present invention provides the use of a surfactant of formula (I) as hereinbefore defined in a carrier fluid (e.g. fluorous oil) for droplet spacing during droplet processing.

Viewed from a further aspect the present invention provides the use of a surfactant of formula (I) as hereinbefore defined in a microfluidic channel or device, in a molecular isolation in larger fluidic devices, containers or vats, or in an automated device with associated software that controls a microfluidic channel or device.

Viewed from a further aspect the present invention provides the use of an emulsion as hereinbefore defined in a microfluidic channel or device or in an automated device with associated software that controls a microfluidic channel or device.

Definitions

As used herein the term "fluorocarbon" refers to a hydrocarbyl group wherein one or more hydrogen atoms are replaced by fluorine atoms. In a "perfluorocarbon", all of the hydrogen atoms are replaced by fluorine atoms.

As used herein the term "perfluoropolyether" refers to a polyether compound wherein all of the hydrogen atoms have been replaced by fluorine atoms.

As used herein the term "polyether" refers to an organic compound comprising two or more —O— linkages.

As used herein the term "star surfactant" refers to a surfactant having a star-like shape. Star surfactants comprise a core, which is a linking group, and at least two arms, and more preferably at least 3 arms, which extend from the core, wherein each arm is linear. The number of arms is determined by the core, and particularly on the number of branch points in the core.

As used herein the term "star polymeric surfactant" refers to a surfactant having a core, which is a linking group, and at least two arms, and more preferably at least 3 arms, which extend from the core, wherein each arm is a linear oligomer or polymer. Each arm is polymerised in a linear manner by sequential polymerisation at a single functional group in the growing arm. Thus, a linear arm cannot generate a branch arm.

As used herein the term "charged group" refers to a group comprising at least one positively charged or negatively charged atom or group of atoms. The term encompasses groups wherein both a positive charge and a negative charge is present, i.e. zwitterionic groups.

As used herein, a wavy bond indicates the point of attachment of a group to another part of the compound of which it is a constituent part. Thus, a group with one wavy bond is a terminal group whereas a group with two wavy bonds is generally a linking group.

As used herein the term "oligomer", when used in relation to group A of formula (I), refers to a linear chain of 3 to 10 glycerol units.

As used herein the term "polymer", when used in relation to group A of formula (A), refers to a linear chain of 11 to 50 glycerol units.

As used herein the term "linear" refers to a linear oligomer or polymer. A linear polymer does not comprise side-chains, which are themselves oligomeric or polymeric.

As used herein the term "alkyl" refers to saturated, straight chained, branched or cyclic groups. Alkyl groups may be substituted or unsubstituted.

As used herein the term "alkylene" refers to a bivalent alkyl group.

As used herein the term "substituted" refers to a group wherein one or more, for example up to 6, more especially 1, 2, 3, 4, 5 or 6, of the hydrogen atoms in the group are replaced independently of each other by the corresponding number of the described substituents. The term "optionally substituted" as used herein means substituted or unsubstituted.

As used herein the term "fluorous" refers to any group or substance which contains one or more fluorine atoms. Generally, the group or substance contains multiple fluorine atoms. For example, a fluorous oil refers to any oil containing fluorine atoms, including partially fluorinated hydrocarbons, perfluorocarbons, hydrofluoroethers and mixtures thereof.

As used herein the term "leaving group" refers to any atom or group capable of departing from a molecule following heterolytic cleavage of the covalent bond joining the leaving group to the rest of the molecule, taking with it the bonding electrons from the covalent bond.

DESCRIPTION OF THE INVENTION

The present invention relates to surfactants, which are particularly useful for the stabilisation of water in oil emulsions. The surfactants comprise one or more lipophilic, perfluoropolyether or fluorocarbon tails which extend out into or "faces" the oil phase and one or more hydrophilic tails which extend into or "faces" the aqueous phase and a linking group which connects the lipophilic tail(s) and the hydrophilic tail(s). In preferred surfactants of the present invention, the surfactants comprise at least one lipophilic tail and at least one hydrophilic tail and a total of at least two, and more preferably at least three, lipophilic and hydrophilic tails as well as a linking group which connects the lipophilic tail(s) and the hydrophilic tail(s). Such surfactants are referred to herein as star surfactants due to the resemblance of their resulting structure to stars.

The surfactants of the invention are of formula (I):

$$(A)_m\text{-}X\text{—}(B)_n \qquad (I)$$

wherein

X is a linking group;

each A is independently a fluorocarbon or a perfluoropolyether;

each B is independently

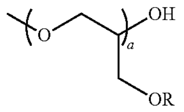

wherein a is an integer between 3 and 50 and each R is independently $C_{1-6}$ alkyl, $CH_2CH_2OC_{1-6}$ alkyl or $CH_2CH(CH_3)OC_{1-6}$ alkyl;

m is an integer between 1 and 10; and n is an integer between 1 and 10.

In formula (I), the A groups are lipophilic tails and the B groups are hydrophilic tails. In formula (I), B is a linear glycerol oligomer or polymer comprising at least 3 glycerol repeat units. As shown in the formula above, the oligomer or polymer is linear, rather than branched. This is because there is only one reactive group (i.e. —OH) in the B group. The linear form of the oligomer or polymer is important to achieving the star structure of the surfactant of the present invention.

Preferred surfactants of the present invention are star surfactants. Particularly preferred surfactants of the present invention are star polymeric surfactants. The latter term reflects the fact that at least some of the arms in the surfactant of the present invention are oligomeric or polymeric.

In preferred surfactants of formula (I), a is an integer between 3 and 30, more preferably 3 and 20 and still more preferably 4 and 20. Thus the surfactants of formula (I) comprise linear oligomers and/or linear polymers of glycerol.

In preferred surfactants of formula (I), each R is $C_{1-6}$ alkyl. Preferably each R is the same. Representative examples of suitable $C_{1-6}$ alkyl groups include methyl, ethyl, propyl, butyl, pentyl and hexyl. More preferably each R is selected from methyl and ethyl. Particularly preferably each R is methyl.

In further preferred surfactants of formula (I), a is an integer between 3 and 30, more preferably 3 and 24 and still more preferably 4 and 20 and each R is $C_{1-6}$ alkyl, preferably methyl. In still further preferred surfactants of formula (I), a is an integer between 4 and 20 and each R is methyl.

In preferred surfactants of formula (I), the sum of n and m is greater than 2. In more preferred surfactants the sum of n and m is an integer between 3 and 10. Preferably the sum of n and m is 3, 4, 5, 6 or 7. Particularly preferably the sum of n and m is 3 or 4.

In preferred surfactants of formula (I), n is an integer between 1 and 6. In other words, the number of hydrophilic arms formed by linear glycerol oligomers or polymers, is between 1 and 6.

In preferred surfactants of formula (I), m is 1, 2 or 3. In other words, the number of lipophilic arms formed by perfluoropolyether and/or fluorocarbon is 1, 2, or 3. More preferably m is 1 or 2.

In some particularly preferred surfactants of formula (I), m is 1 and n is 2 or 3 or m is 2 and n is 1 or 2.

In further preferred surfactants of formula (I), a is an integer between 4 and 20, each R is methyl and m is 1 and n is 2 or 3 or m is 2 and n is 1 or 2.

In some preferred surfactants of formula (I), at least one A is a fluorocarbon. In some preferred surfactants of formula (I), each A is a fluorocarbon. Preferred fluorocarbons are $C_{1-18}$ fluorocarbons, and in particular $C_{1-18}$ perfluorocarbons. More preferred fluorocarbons are $C_{2-16}$ fluorocarbons, more preferably $C_{4-14}$ fluorocarbons and still more preferably $C_{4-12}$ fluorocarbons. Yet more preferably the fluorocarbon is a $C_{2-16}$ perfluorocarbon, especially preferably a $C_{4-14}$ fluorocarbon and yet more preferably a $C_{4-12}$ perfluorocarbon.

In other preferred surfactants of formula (I), at least one A is a perfluoropolyether. In further preferred surfactants of formula (I), each A is a perfluoropolyether.

Preferred perfluoropolyether present in surfactants of formula (I) comprise a repeat unit of the formula $—[CF(CF_3)CF_2O]_b—$, wherein b is a positive integer. More preferably the perfluoropolyether present in surfactants of formula (I) comprise a unit of the formula $—[CF_2CF_2O]_c—[CF(CF_3)CF_2O]_b—$, wherein b and c are each 0 or a positive integer, with the proviso that b and c are not both 0. c is preferably 0 or an integer from 1 to 100, e.g. an integer from 5 to 50. In preferred surfactants c is 0. Particularly preferred perfluoropolyether present in surfactants of formula (I) consists of the formula $CF_3CF_2CF_2O—[CF(CF_3)CF_2O]_m—CF(CF_3)—$, wherein b is a positive integer. In preferred perfluoropolyether present in the surfactants of formula (I) b is preferably an integer from 1 to 100 (e.g. 1 to 50), more preferably an integer from 5 to 50 and particularly preferably an integer from 10 to 25. Preferred perfluoropolyether present in surfactants of formula (I) has a weight average molecular weight of 166 to 16,600 Da, more preferably 800 to 9,000 Da and yet more preferably 1,500 to 6,000 Da.

In further preferred surfactants of formula (I), a is an integer between 4 and 20, each R is methyl, m is 1 and n is 2 or 3 or m is 2 and n is 1 or 2 and each A is a perfluoropolyether, preferably a perfluoropolyether comprising a repeat unit of the formula $—[CF(CF_3)CF_2O]_b—$, wherein b is a positive integer.

In the surfactants of the present invention, and as described above, a linking group 'X' connects the one or more lipophilic, perfluoropolyether and/or fluorocarbon tails and the one or more hydrophilic tails comprising a linear glycerol oligomer or polymer. In preferred surfactants of formula (I) of the present invention the backbone structure of the linking group (i.e. excluding hydrogen and halogen atoms, as well as any atoms on side or branch groups) contains 1-50 atoms, more preferably 2-30 atoms and still more preferably 3-15 atoms. In preferred surfactants of the present invention the ratio of the number of atoms in the backbone structure of the linking group (i.e. excluding hydrogen and halogen atoms, as well as any atoms on side or branch groups) to the total number of atoms in the backbone structure of groups A and B (i.e. excluding hydrogen and halogen atoms, as well as any atoms on side or branch groups) is 1:2 to 1:500, more preferably 1:3 to 1:100 and still more preferably 1:5 to 1:50. This ratio reflects the polymeric nature of the hydrophilic arms of the surfactant of the present invention.

In preferred surfactants of the present invention the linking group 'X' comprises a group selected from —C(O)NH—, —C(O)NMe-, —NHC(O)—, —NMeC(O)—, —C(O)S—, —SC(O)—, —C(O)O—, —OC(O)—, —OC(O)O—, —OC(O)NH—, —OC(O)NMe-, —O—, —S—, —NHC(O)NH—, —NMeC(O)NH—, —NHC(O)NMe-, —NHC(O)O—, —NMeC(O)O—, $—SO_2NH—$, $—NHSO_2—$, $—NHSO_2—C_6H_4—O—$ and $—O—C_6H_4—SO_2NH—$. In further preferred surfactants of the present invention, the linking group 'X' comprises a group selected from —C(O)NH—, —C(O)NMe-, —NHC(O)—, —NMeC(O)—, —OC(O)NH—, —C(O)O—, —NHC(O)O—, —NMeC(O)O— and —O—.

In some preferred surfactants of formula (I) of the present invention, the linking group 'X' comprises a charged group. The charged group may be a positively charged group, a zwitterionic group or a negatively charged group, but is preferably a positively charged group. A preferred positively charged group is a quaternary ammonium group. Some preferred surfactants of formula (I) of the present invention comprise a linking group 'X' comprising a group of formula (II):

(II)

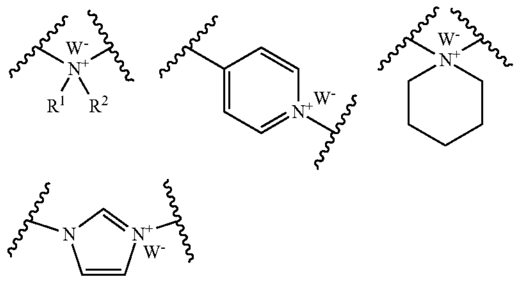

wherein $R^1$ and $R^2$ are independently selected from H and $C_{1-6}$ alkyl; and $W^-$ is a counter ion.

Preferably $R^1$ and $R^2$ are independently selected from $C_{1-6}$ alkyl. More preferably $R^1$ and $R^2$ are selected from methyl, ethyl, propyl and butyl. Still more preferably $R^1$ and $R^2$ are methyl.

$W^-$ may be any counter ion. Representative examples of $W^-$ include halides (e.g. Br—, I—, Cl—), tosylate, mesylate and acetate. Additionally, $W^-$ may be a polycharged compound (e.g. a di or tri carboxylate) or polymer e.g. poly (carboxylate).

The wavy line in formula (II) denotes where the charged group is attached to the remainder of the linking group 'X' or to a group A or B, as defined in formula (I). In preferred surfactants of formula (I), the wavy lines denote where the charged group is attached to the remainder of the linking group 'X'.

In other preferred surfactants of the present invention the linking group 'X' comprises a heterocycle. Examples of heterocycles that might be present in linking group 'X include 1,2,3-triazole, 1,2,3-triazole fused with 5-10 member rings and 1,2,3-triazole fused with bicyclic structures. Representative examples of suitable heterocycles are shown below:

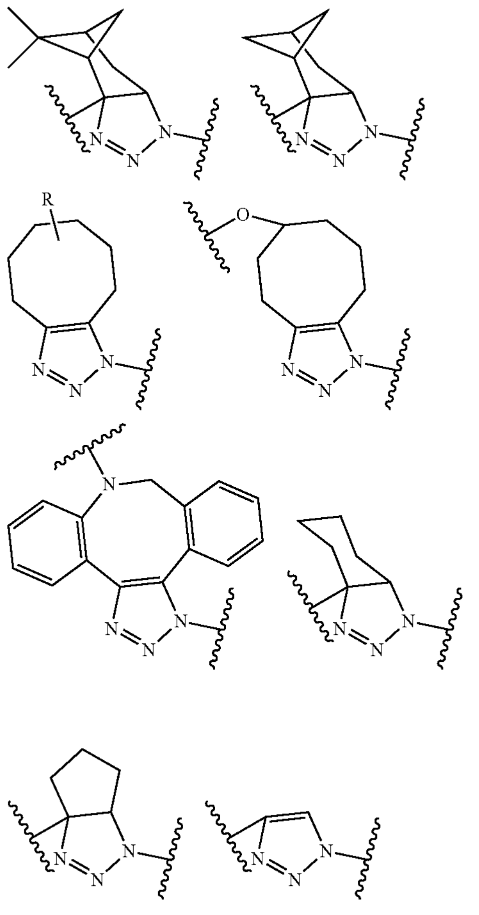

In other preferred surfactants of the present invention the linking group 'X' comprises a $C_{1-6}$ alkylene group. In some preferred surfactants of the present invention, the linking group 'X' consists of a $C_{1-6}$ alkylene group. More preferably the linking group 'X' comprises or consists of a $C_1$, $C_2$, $C_3$ or $C_4$ alkylene group.

Preferred surfactants of formula (I) of the present invention, wherein the linking group 'X', consists of a $C_{1-6}$ alkylene group are shown below:

1

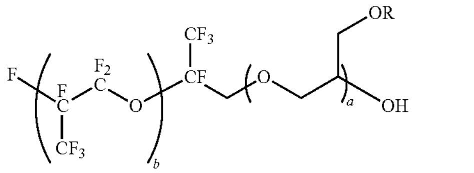

13

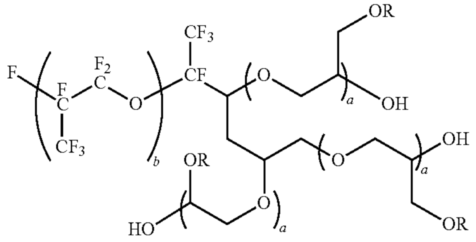

wherein each of a, b and R are as defined above in relation to formula I.

Further preferred surfactants of formula (I) of the present invention comprise a linking group 'X' which comprises a group of formula (III):

IIIa

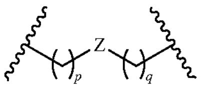

IIIb

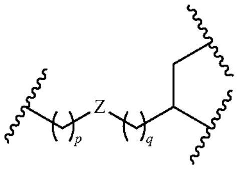

IIIc

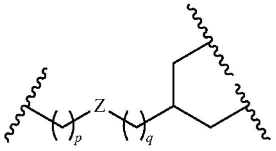

IIId

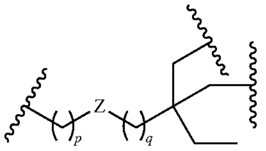

IIIe

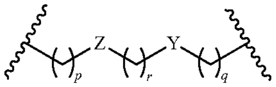

IIIf

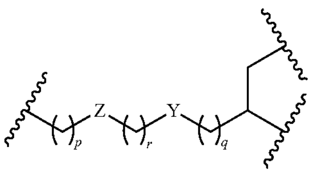

-continued

IIIg

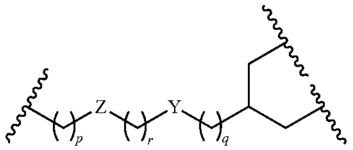

IIIh

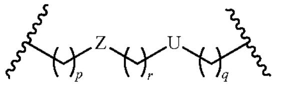

IIIi

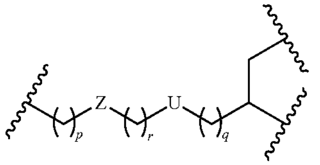

IIIj

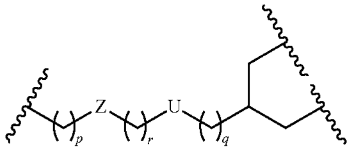

IIIk

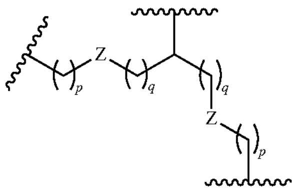

IIIl

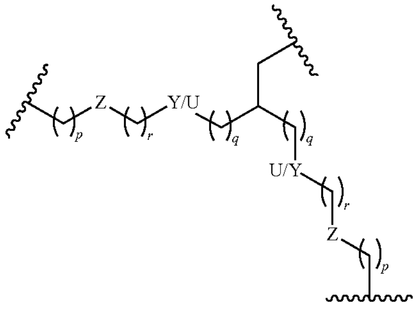

IIIm

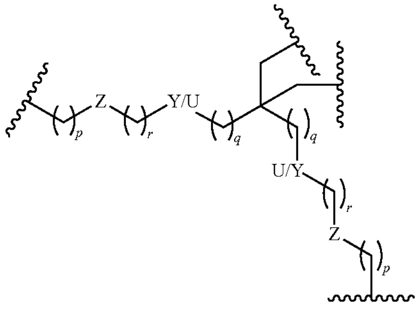

-continued

IIIn

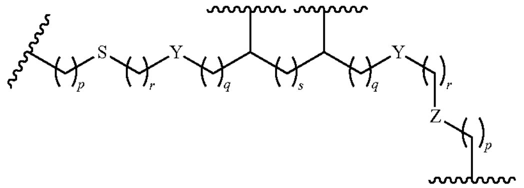

wherein each p is independently 0 or an integer between 1 and 6;

each q is independently 0 or an integer between 1 and 6;

each r is independently an integer between 1 and 6;

s is an integer between 1 and 6, preferably 1 or 2, still more preferably 1;

each Z is independently selected from C(O)NH, C(O)NMe, NHC(O), NMeC(O), OC(O)NH, C(O)O, —NHC(O)O—, —NMeC(O)O— and O;

each U is independently a heterocycle; and each Y is independently selected from

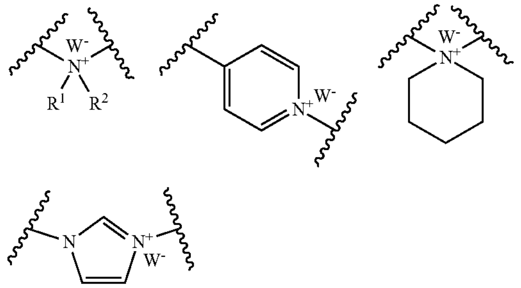

wherein W, $R^1$ and $R^2$ and the wavy lines are as hereinbefore defined in relation to formula (II).

Further preferred surfactants of formula (I) of the present invention comprise a linking group 'X' which comprises a group of formula (IIIo-q):

IIIo

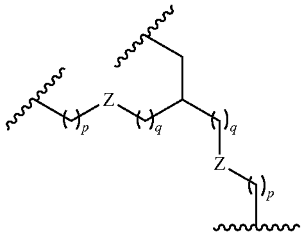

IIIp

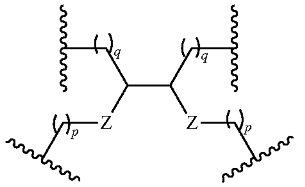

-continued

IIIq

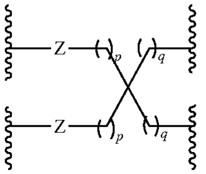

wherein each p is independently 0 or an integer between 1 and 6;

each q is independently 0 or an integer between 1 and 6; and each Z is independently selected from C(O)NH, C(O)NMe, NHC(O), NMeC(O), OC(O)NH, C(O)O, —NHC(O)O—, —NMeC(O)O— and O.

Yet further preferred surfactants of formula (I) of the present invention comprise a linking group 'X' which comprises a group of formula (IIIa)-(IIIq) as shown above.

Some preferred surfactants of the present invention comprise a linking group 'X' of formula (IIIa), (IIIb), (IIIc) or (IIId), preferably a group of formula (IIIb), (IIIc), or (IIId):

IIIa

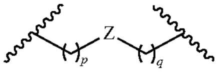

IIIb

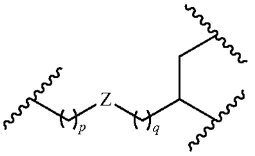

IIIc

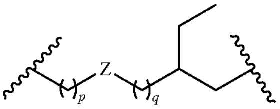

IIId

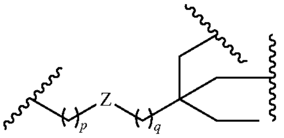

wherein p is 0 or 1;

q is 0, 1 or 2, preferably 0 or 1; and

Z is selected from C(O)NH, C(O)NMe, NHC(O), NMeC(O), OC(O)NH, C(O)O, —NHC(O)O—, —NMeC(O)O— and O.

Preferred surfactants of formula (I) of the present invention comprising a linking group 'X' of formula (IIIa), (IIIb), (IIIc) or (IIId) are shown below:

2

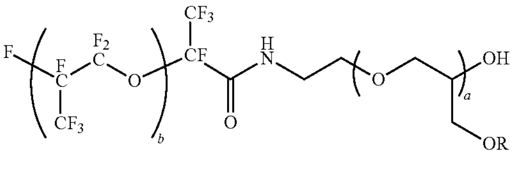

-continued

3

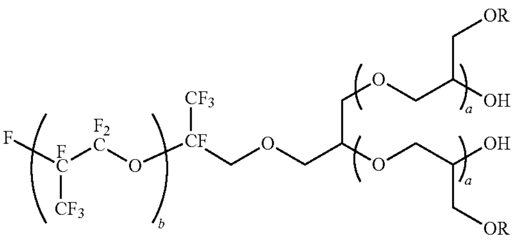

4

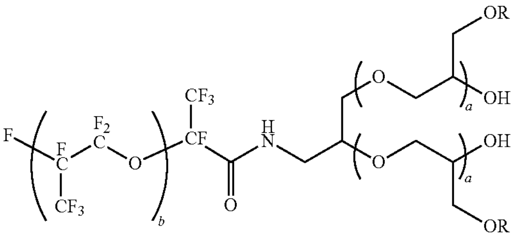

5

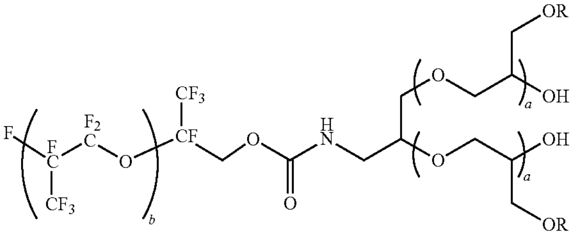

6

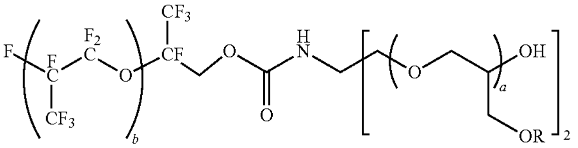

11

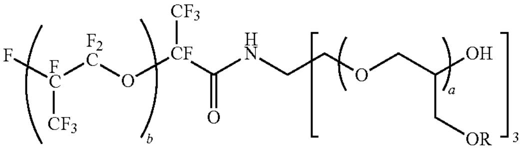

12

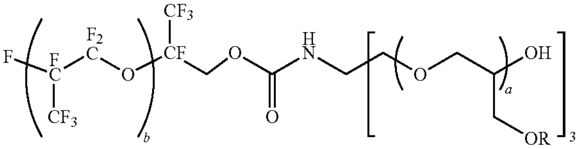

wherein each of a, b and R are as defined above in relation to formula (I).

Some preferred surfactants of the present invention comprise a linking group 'X' of (IIIe), (IIIf) or (IIIg), preferably (IIIf) or (IIIg):

(IIIe)

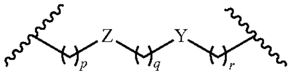

-continued (IIIf)

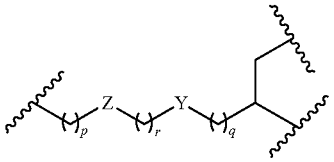

IIIg (IIIg)

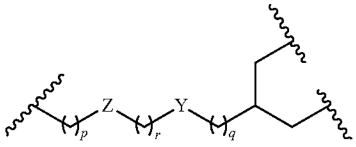

wherein p is 0 or 1;

q is 0, 1 or 2, preferably 0 or 1;

r is an integer between 1 and 6, preferably 1, 2 or 3;

Z is selected from C(O)NH, C(O)NMe, NHC(O), NMeC(O), OC(O)NH, C(O)O, —NHC(O)O—, —NMeC(O)O— and O;

Y is selected from

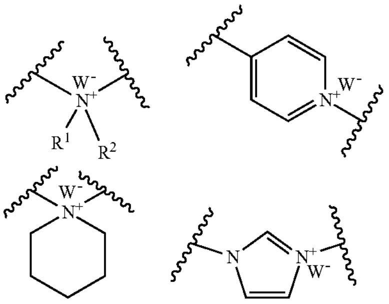

wherein W, $R^1$ and $R^2$ are as defined above in relation to formula (II).

Preferred surfactants of formula (I) of the present invention comprising a linking group 'X' of formula (IIIe), (IIIf) or (IIIg) are shown below:

7

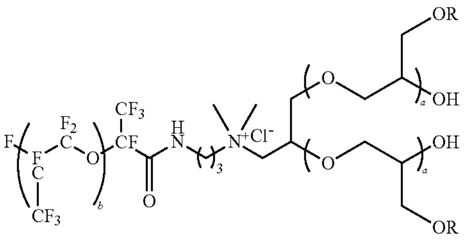

8

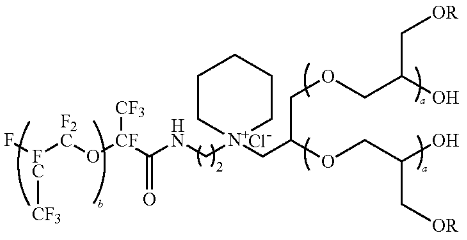

-continued

9

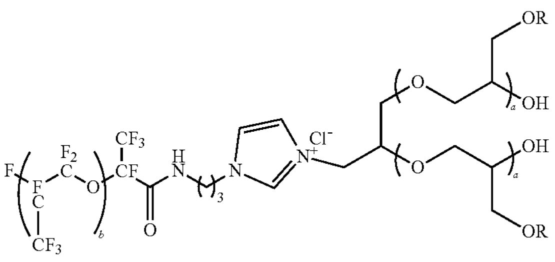

10

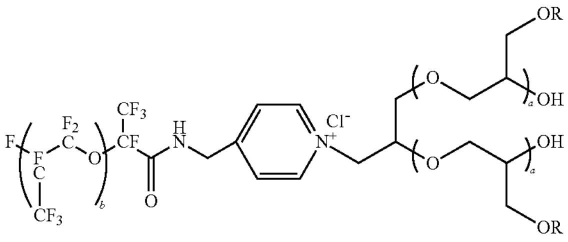

wherein each of a, b and R are as defined above in relation to formula (I).

Some preferred surfactants of the present invention comprise a linking group 'X' of formula (IIIh), (IIIi) or (IIIj), preferably (IIIi) or (IIIj):

IIIh (IIIh)

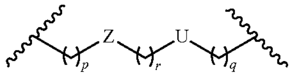

IIIi (IIIi)

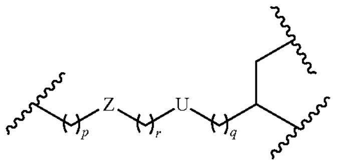

IIIj (IIIj)

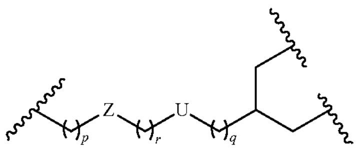

wherein p is 0 or 1;

q is 0, 1 or 2, preferably 0 or 1;

r is an integer between 1 and 6, preferably 1, 2 or 3;

Z is selected from C(O)NH, C(O)NMe, NHC(O), NMeC(O), OC(O)NH, C(O)O, —NHC(O)O—, —NMeC(O)O— and O; and U is a heterocycle.

Preferred surfactants of formula (I) of the present invention comprising a linking group 'X' of formula (IIIh), (IIIi) or (IIIj) are shown below:

34

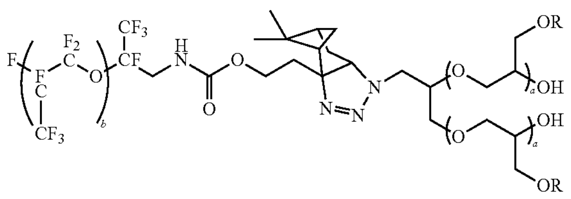

35

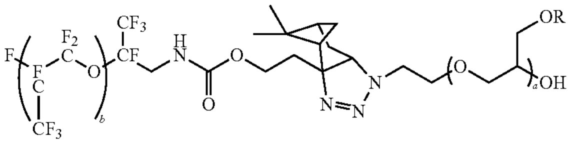

wherein each of a, b and R are as defined above in relation to formula (I).

Some preferred surfactants of the present invention comprise a linking group 'X' of formula (IIIk):

(IIIk)

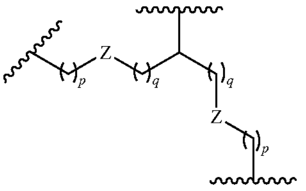

wherein each p is 0 or 1;

each q is 0, 1 or 2, preferably 0 or 1; and each Z is independently selected from C(O)NH, C(O)NMe, NHC(O), NMeC(O), OC(O)NH, C(O)O, —NHC(O)O—, —NMeC(O)O— and O.

A preferred surfactant of formula (I) of the present invention comprising a linking group 'X' of formula (IIIk) is shown below:

15

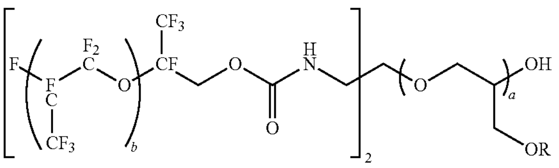

wherein each of a, b and R are as defined above in relation to formula (I).

Some preferred surfactants of the present invention comprise a linking group 'X' of formula (IIIl) or (IIIm):

IIIl

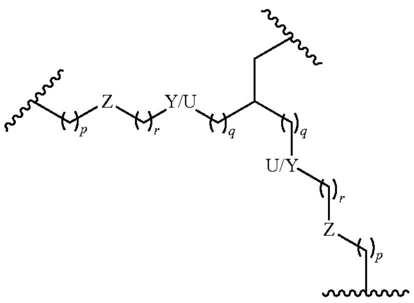

IIIm

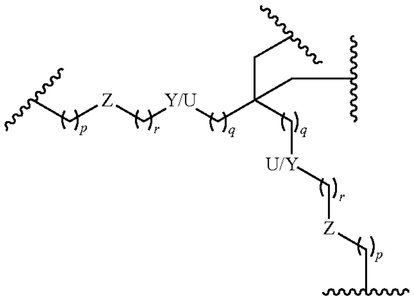

wherein each p is 0 or 1;

each q is 0, 1 or 2, preferably 0 or 1;

each r is an integer between 1 and 6, preferably 1, 2 or 3;

each Z is independently selected from C(O)NH, C(O)NMe, NHC(O), NMeC(O), OC(O)NH, C(O)O, —NHC(O)O—, —NMeC(O)O— and O;

each U is a heterocycle; and each Y is independently selected from:

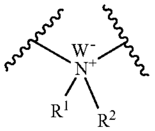

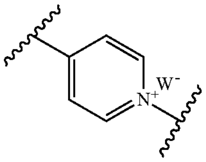

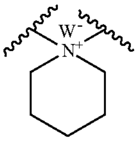

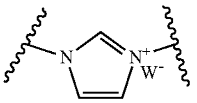

wherein W, $R^1$ and $R^2$ are as defined above in relation to formula (II).

Preferred surfactants of formula (I) of the present invention comprising a linking group 'X' of formula (IIIl) or (IIIm) are shown below:

16
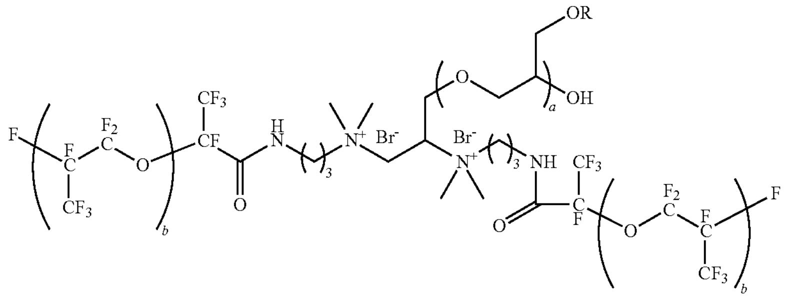
17
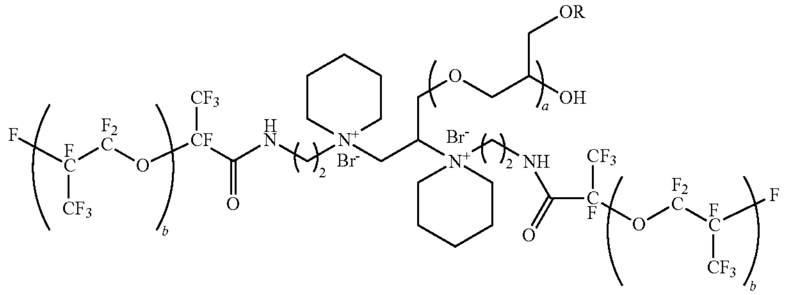
18
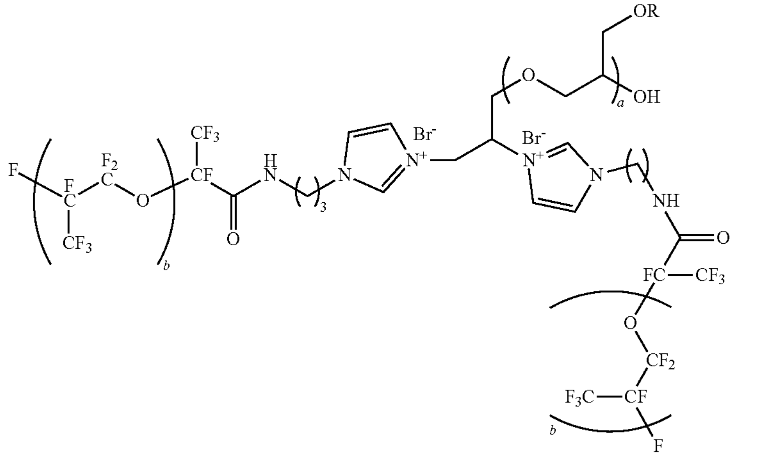
19
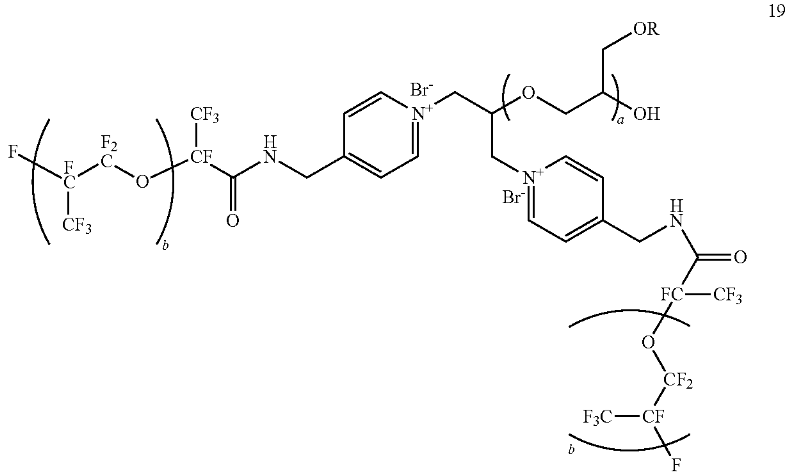

-continued

23

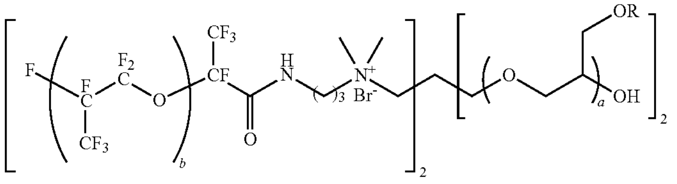

24

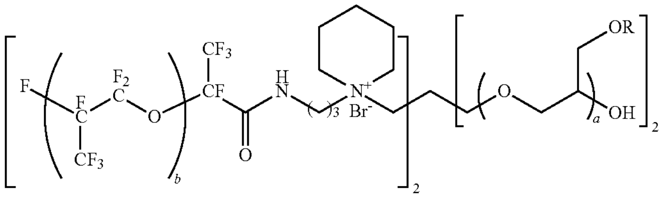

25

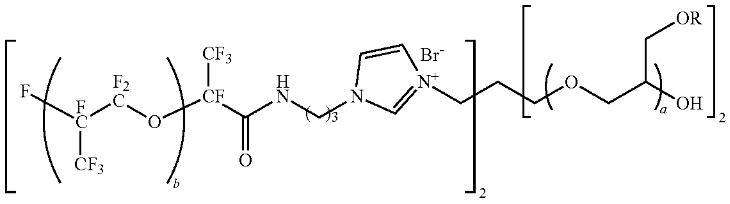

26

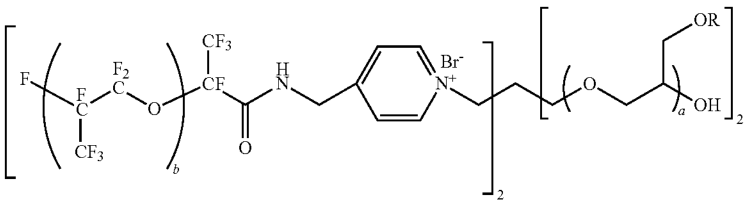

wherein each of a, b and R are as defined above in relation to formula (I).

Some preferred surfactants of the present invention comprise a linking group 'X' of formula (IIIn):

(IIIn)

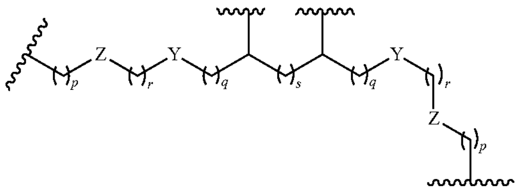

wherein each p is 0 or 1;

each q is 0, 1 or 2, preferably 0 or 1;

each r is an integer between 1 and 6;

s is an integer between 1 and 6; preferably 1, 2 or 3;

each Z is independently selected from C(O)NH, C(O)NMe, NHC(O), NMeC(O), OC(O)NH, C(O)O, —NHC(O)O—, —NMeC(O)O— and O; and each Y is independently selected from:

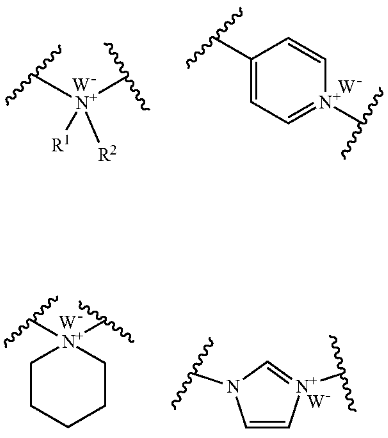

wherein W, $R^1$ and $R^2$ are as defined above in relation to formula (II).

Preferred surfactants of formula (I) of the present invention comprising a linking group 'X' of formula (IIIn) are shown below:

27

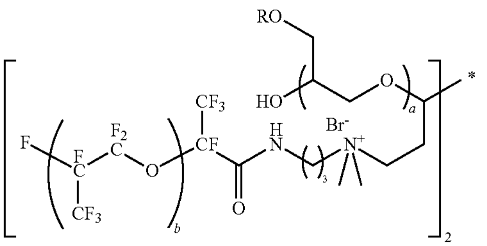

28

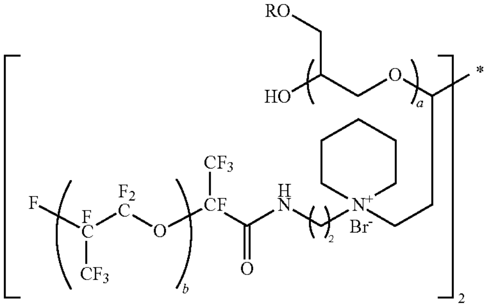

29

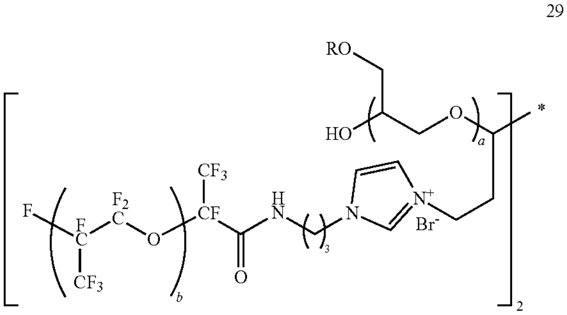

30

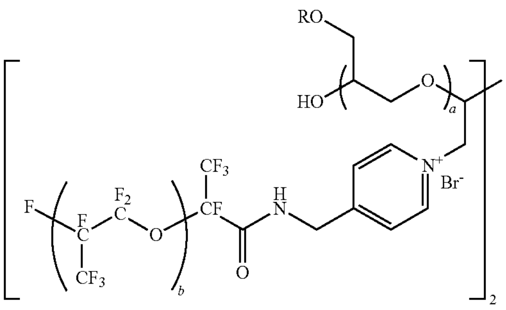

wherein each of a, b and R are as defined above in relation to formula (I).

Some preferred surfactants of the present invention comprise a linking group 'X' of formula (IIIo):

IIIo

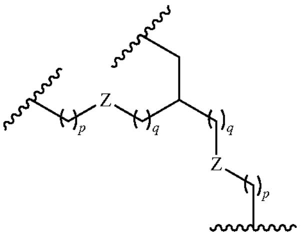

wherein each p is independently 0 or an integer between 1 and 6;

each q is independently 0 or an integer between 1 and 6; and each Z is independently selected from C(O)NH, C(O)NMe, NHC(O), NMeC(O), OC(O)NH, C(O)O, —NHC(O)O—, —NMeC(O)O— and O.

Preferred surfactants of formula (I) of the present invention comprising a linking group of 'X' of formula (IIIo) are shown below:

20

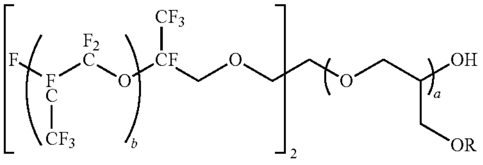

37

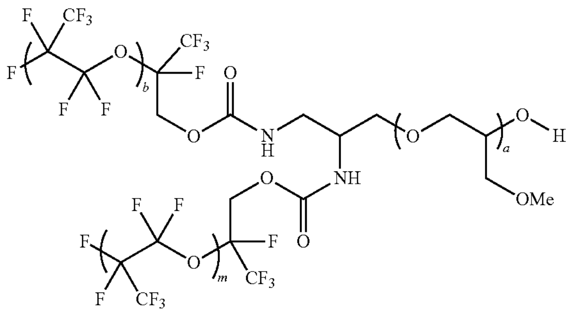

Some preferred surfactants of the present invention comprise a linking group 'X' of formula (IIIp):

IIIp

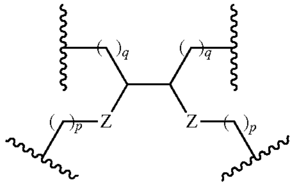

wherein each p is independently 0 or an integer between 1 and 6;

each q is independently 0 or an integer between 1 and 6; and each Z is independently selected from C(O)NH, C(O)NMe, NHC(O), NMeC(O), OC(O)NH, C(O)O, —NHC(O)O—, —NMeC(O)O— and O.

A preferred surfactant of formula (I) of the present invention comprising a linking group of 'X' of formula (IIIp) is shown below:

38

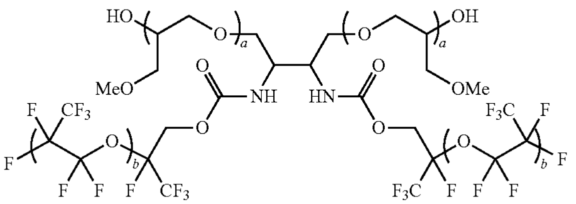

Some preferred surfactants of the present invention comprise a linking group 'X' of formula (IIIq):

IIIq

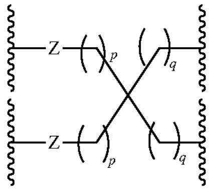

wherein each p is independently 0 or an integer between 1 and 6;

each q is independently 0 or an integer between 1 and 6; and each Z is independently selected from C(O)NH, C(O)NMe, NHC(O), NMeC(O), OC(O)NH, C(O)O, —NHC(O)O—, —NMeC(O)O— and O.

Preferred surfactants of formula (I) of the present invention comprising a linking group of 'X' of formula (IIIq) are shown below:

22

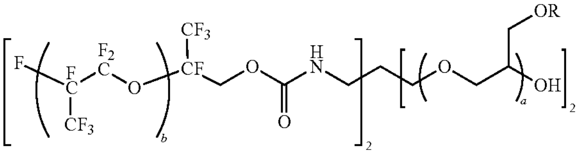

40

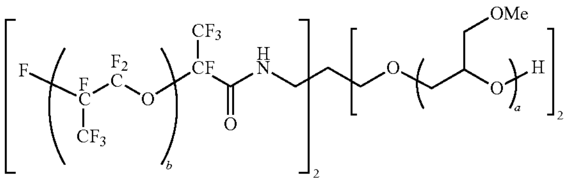

Preferred surfactants of formula (I) of the present invention are selected from the group consisting of:

1

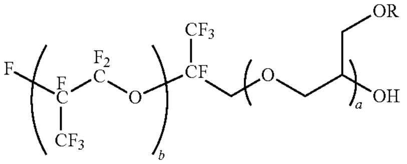

2

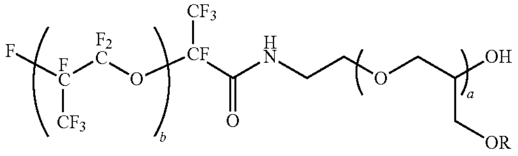

3

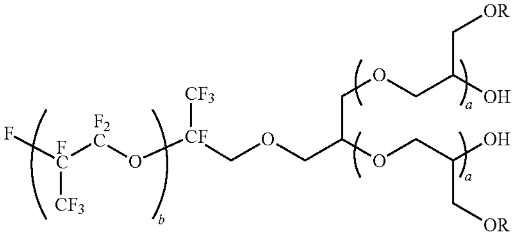

4

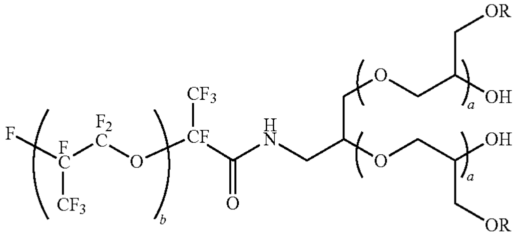

5

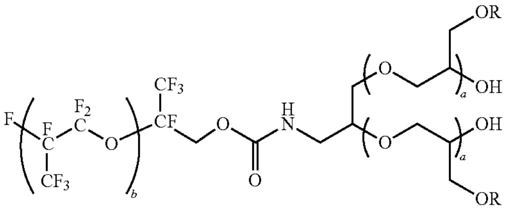

6

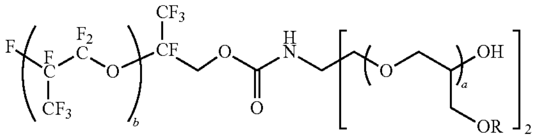

7

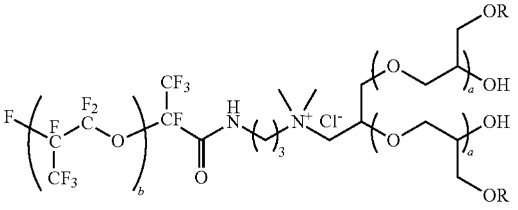

8

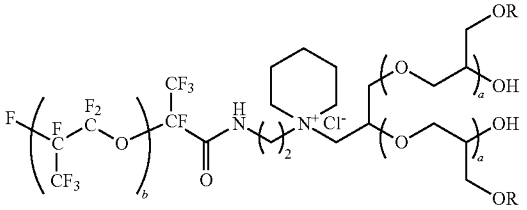

-continued
9
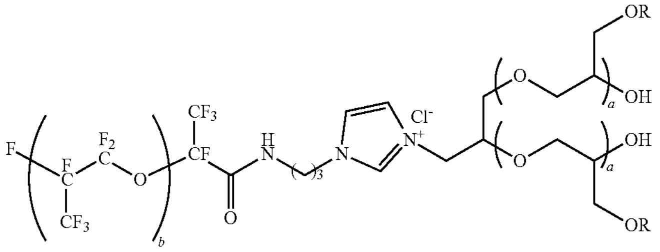
10
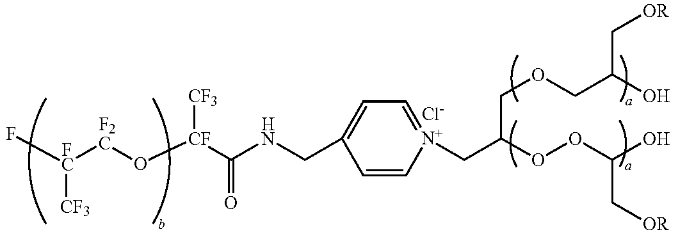
11
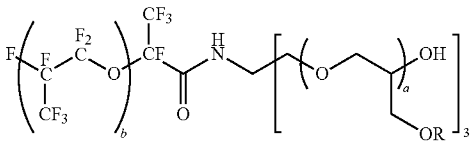
12
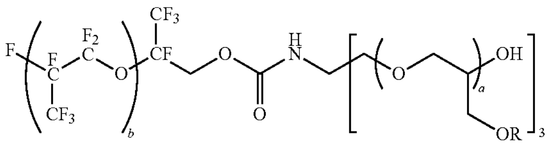
13
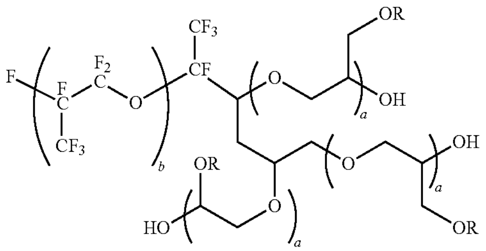
14
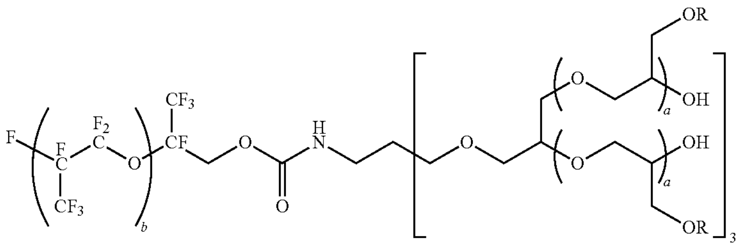
15
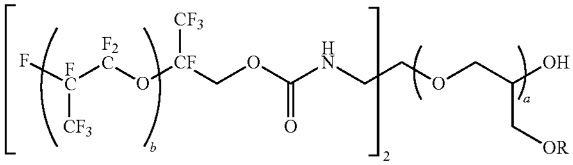

-continued
16
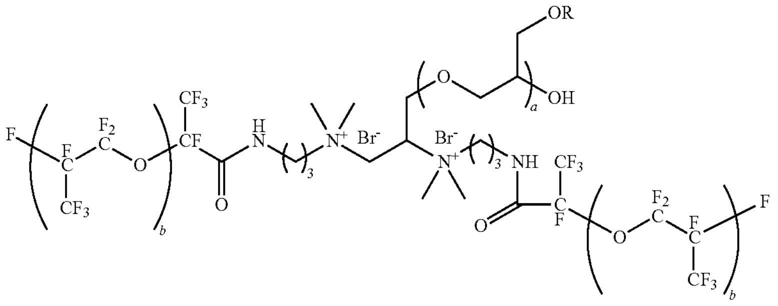
17
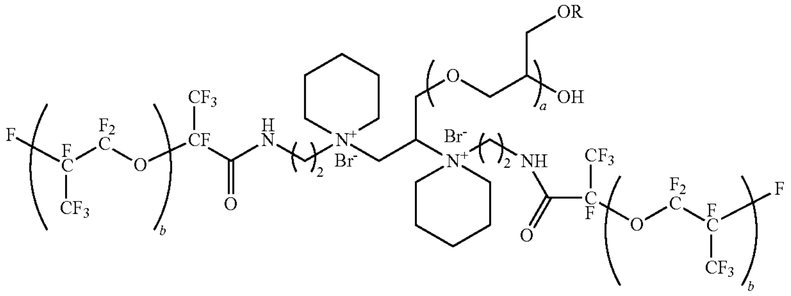
18
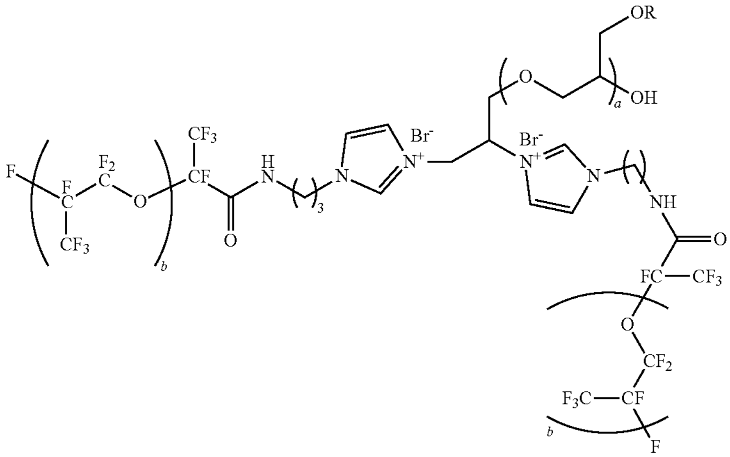
19
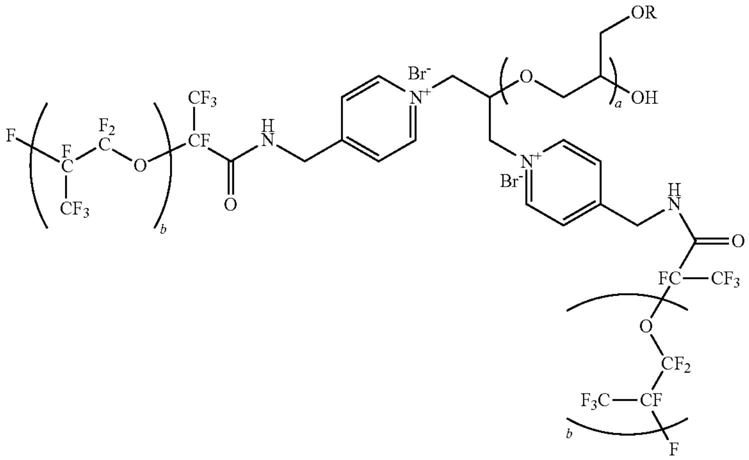

-continued
20
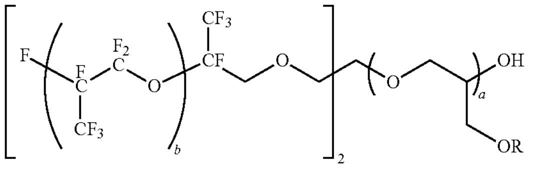
21
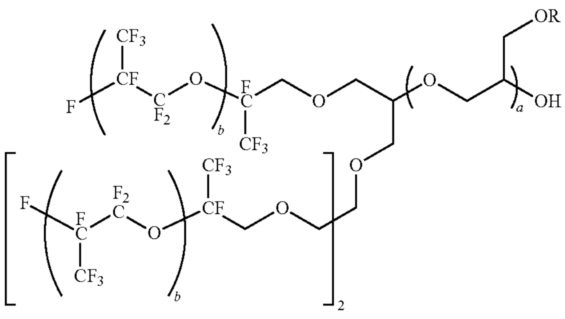
22
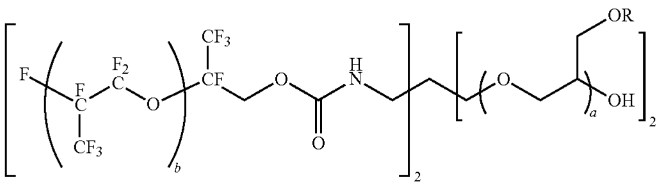
23
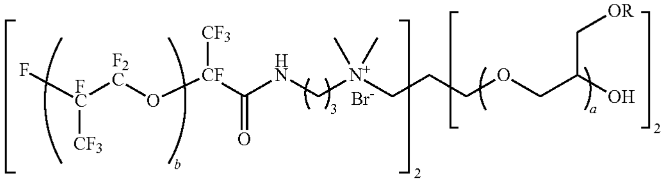
24
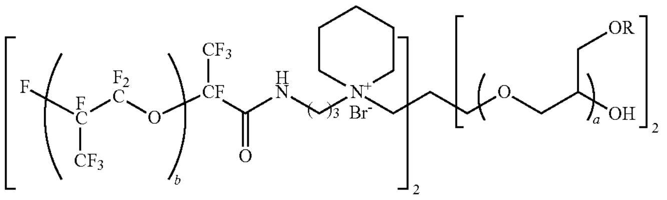
25
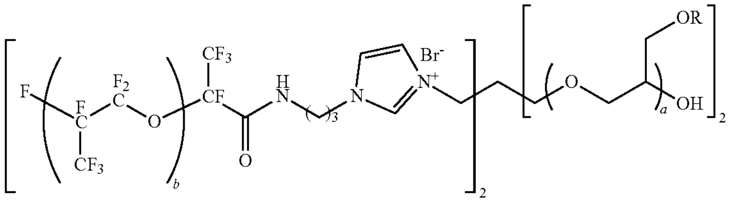
26
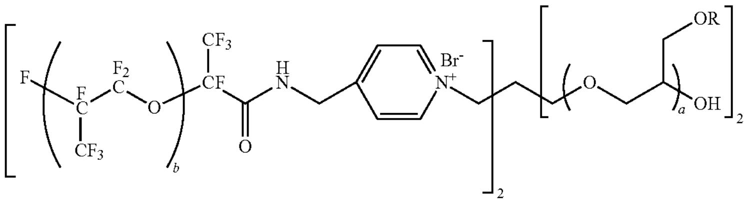

-continued
27
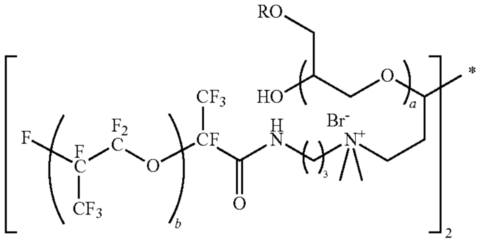
28
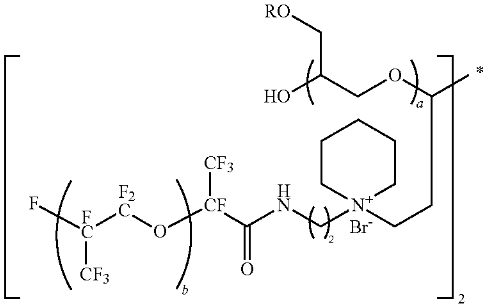
29
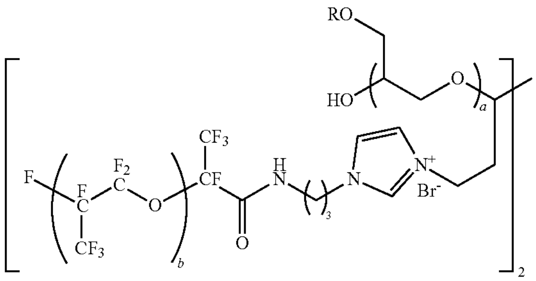
30
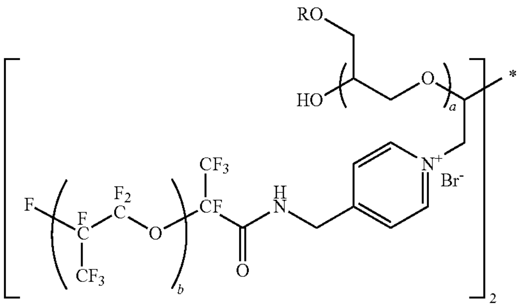
31
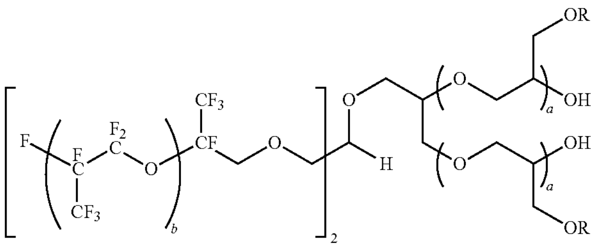
32
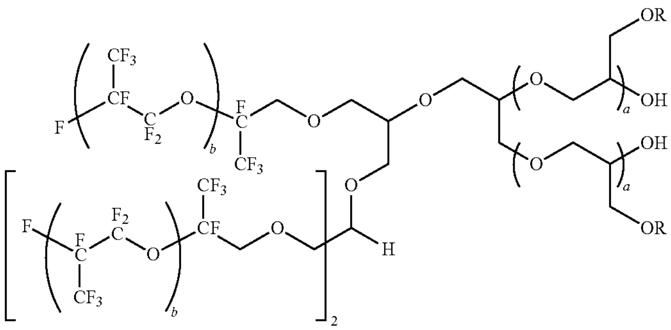
33
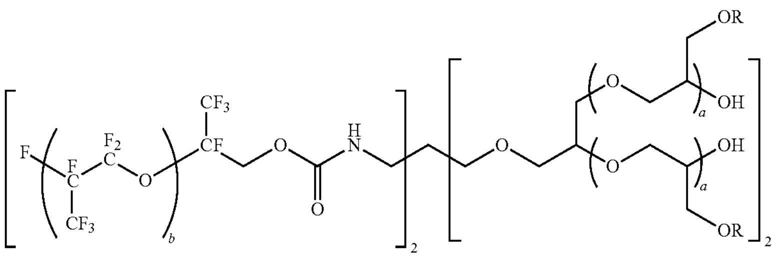

-continued
34
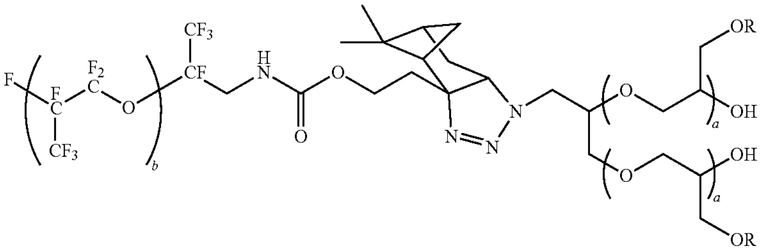
35
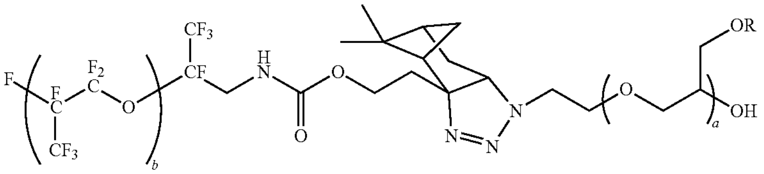
36
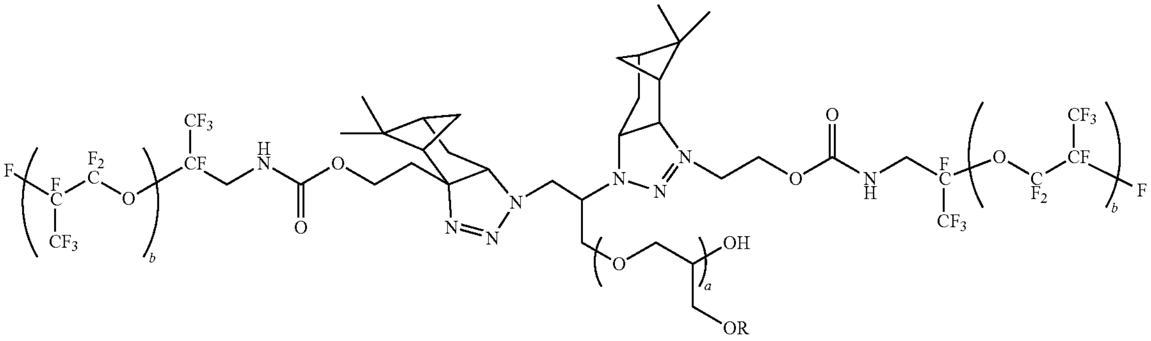
37
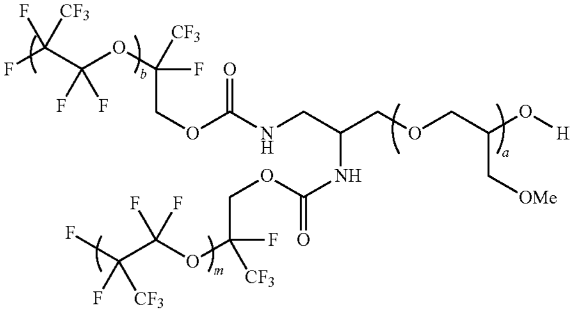
38
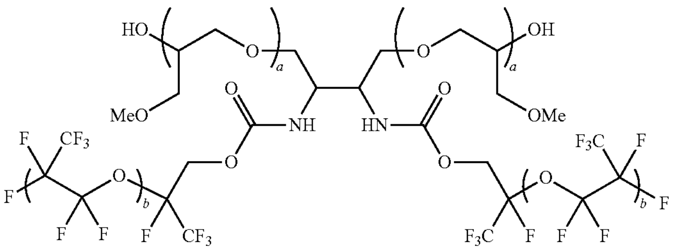
39
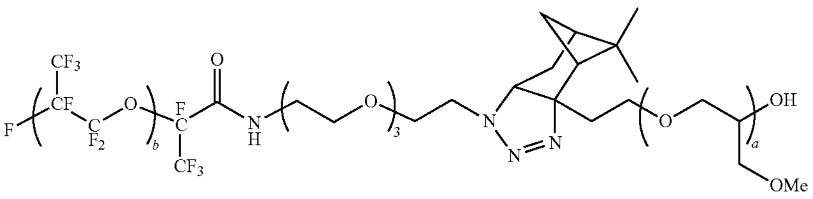

-continued

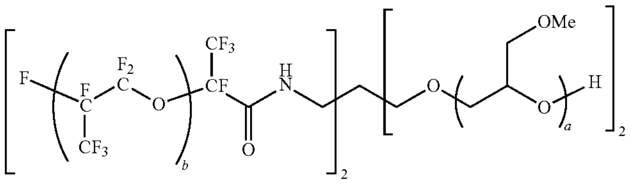

40

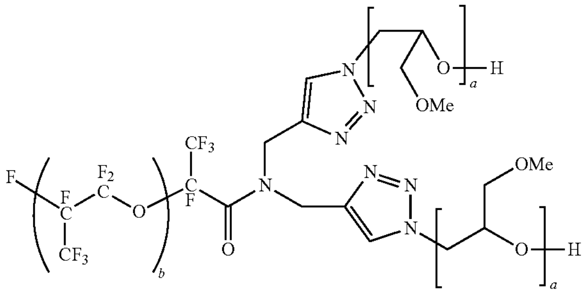

41

Preferred surfactants of the present invention have a weight average molecular weight of 1,000-100,000 Dalton, preferably 2,000-30,000 Dalton, and further preferably 5,000-15,000 Dalton.

The present invention also relates to method for making the surfactants of formula (I) as hereinbefore defined. The surfactants may be prepared using conventional reactions from commercially available starting materials.

One preferred method for making a surfactant as hereinbefore described comprises:

reacting a compound of formula (II)

$$(A)_m\text{-X—(OH)}_n \qquad \text{(II)}$$

wherein

X is a linking group;

each A is independently a fluorocarbon or a perfluoropolyether;

m is an integer between 1 and 10;

n is an integer between 1 and 10; and with a compound of formula (III)

(III)

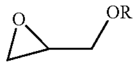

wherein each R is independently $C_{1-6}$ alkyl, $CH_2CH_2OC_{1-6}$ alkyl or $CH_2CH(CH_3)OC_{1-6}$ alkyl.

Another further preferred method for making a surfactant as hereinbefore described comprises reacting a compound comprising (A)m with a compound comprising (B)n, wherein said reaction is a coupling reaction and forms linker X between said (A)m and said (B)n.

The compounds of formula (I) as hereinbefore defined are for use as surfactants. Thus, in another aspect the present invention relates to the use of a compound having a formula (I) as hereinbefore defined as a surfactant. The surfactants of the invention may be used to stabilise an emulsion, more particularly to stabilise a discontinuous aqueous phase, e.g. one or more aqueous droplets, in a continuous oil phase, e.g. a continuous oil phase comprising a fluorous oil. The perfluoropolyether and/or fluorocarbon component of the surfactants of the present invention acts as a fluorophilic tail, and is soluble in an oil phase, e.g. the continuous oil phase of an emulsion, particularly wherein the oil phase comprises a fluorous oil, e.g. a fluorous oil phase. The hydrophilic tail(s) of the surfactants of the invention acts as an ionic group, and is soluble in an aqueous phase, e.g. the discontinuous aqueous phase of an emulsion.

The surfactants of the present invention may be used in the preparation of an emulsion. The present invention thus also relates to the use of a surfactant as hereinbefore described in the preparation of an emulsion.

The present invention also relates to an emulsion comprising a surfactant as hereinbefore described. Preferred emulsions of the present invention comprise a discontinuous aqueous phase, a continuous oil phase and a surfactant as hereinbefore described. The emulsions may comprise aqueous phase, oil phase and surfactants in any amounts suitable to form an emulsion. The skilled man will be readily able to determine such amounts.

Preferably, the continuous oil phase of the emulsions of the invention comprises a fluorous oil. The fluorous oil is preferably a partially fluorinated hydrocarbon, a perfluorocarbon, a hydrofluoroether, or a mixture thereof. Particularly preferably the fluorous oil is a hydrofluoroether. Preferred fluorous oils present in the continuous oil phase of the emulsions of the present invention are Novec™ 7500 (3-ethoxy-1,1,1,2,3,4,4,5,5,6,6,6-dodecafluoro-2-(trifluoromethyl)-hexane), Novec™ 7300 (1,1,1,2,2,3,4,5,5,5-decafluoro-3-methoxy-4-(trifluoromethyl)-pentane), Novec™ 7200 ($C_4F_9OC_2H_5$), Novec™ 7100 ($C_4F_9OCH_3$), Fluorinert™ FC-72, Fluorinert™ FC-84, Fluorinert™ FC-77, Fluorinert™ FC-40, Fluorinert™ FC3283, Fluorinert™ FC-43, Fluorinert™ FC-70, perfluorodecalin and mixtures thereof. More preferred fluorous oils are Novec™ 7500 (3-ethoxy-1,1,1,2,3,4,4,5,5,6,6,6-dodecafluoro-2-(trifluoromethyl)-hexane), Fluorinert™ FC-40, Fluorinert™ FC3283 and perfluorodecalin, and still more preferred is Novec™ 7500 (3-ethoxy-1,1,1,2,3,4,4,5,5,6,6,6-dodecafluoro-2-(trifluoromethyl)-hexane).

In preferred emulsions of the present invention, the discontinuous aqueous phase comprises a plurality of droplets. The droplets preferably have an average diameter of 1 μm to 500 μm, more preferably 10 to 150 μm and still more preferably 30 to 120 μm. This is advantageous because the volume of a droplet is therefore small, and thus the amount of material, e.g. biological material, needed is small. It is preferred that at least some of the droplets comprise one or more analytes. Preferably each droplet comprises an average number of 0 to 100 analytes, more preferably 1 to 20 and still more preferably 1 to 5, e.g. 1 analyte.

In preferred emulsions of the present invention comprising a plurality of droplets, at least some of the droplets further comprise an aqueous and non-aqueous phase, a chemical buffer, a biochemical buffer or a culture or other media. Examples of suitable chemical buffers include ammonium bicarbonate, ammonium acetate and phosphate-buffered saline (PBS). Examples of suitable biochemical buffers include HEPES, PBS and Trizma.

In emulsions of the invention comprising a plurality of droplets wherein at least some of the droplets comprise one or more analytes, the analyte may be any entity of interest. In one group of emulsions of the invention comprising a plurality of droplets wherein at least some of the droplets comprise one or more analytes, the analytes are preferably biological molecules selected from small molecules, amino acids, peptides, proteins, antibodies, enzymes, monosaccharides, disaccharides, oligosaccharides, polysaccharides, nucleic acids, oligonucleotides, nucleotides, metabolites, cofactors and artificially engineered molecules. More preferably the biological molecules are selected from antibodies, enzymes, oligonucleotides and metabolites and still more preferably from antibodies and metabolites. Optionally the biological molecules may be contained in cells (e.g. mammalian cells, plant cells, algal cells, yeast cells, hybridomas, microorganisms), cell organelles (e.g. cell nuclei, mitochondria), viruses or prions.

In another group of emulsions of the invention comprising a plurality of droplets wherein at least some of the droplets comprise one or more analytes, the analytes are biological analytes, e.g. cells, sub-cellular complexes of cellular building blocks or components. The biological analytes are preferably selected from cells (e.g. mammalian cells, plant cells, algal cells, microbial cells, yeast cells), primary B-cells, T-cells, hybridomas, microorganisms, viruses, bacteria, or prions, cell organelles (e.g. cell nuclei, mitochondria) or exosomes, more preferably from B-cells, T-cells, hybridomas and microorganisms, and still more preferably from hybridomas and microorganisms. When the biological analyte is a cell, the cell is preferably selected from mammalian cells, plant cells, algal cells, microbial cells, more preferably from mammalian cells and microbial cells and still more preferably from mammalian cells. Preferably molecules are produced in, excreted or secreted from the cells, e.g. molecules are excreted or secreted from the cells. When the biological analyte is a cell organelle, the cell organelle is preferably selected from cell nuclei and mitochondria.

In a further group of emulsions of the invention comprising a plurality of droplets wherein at least some of the droplets comprise one or more analytes, the analytes are assay components which are preferably selected from beads, nanoparticles, crystals, micelles, quantum dots, detection reagents, antibodies, enzyme co-factors, nucleic acid amplification reagents, oligonucleotide sequencing reagents, cell transformation reagents, cell transduction mixtures and genome editing reagents. More preferably the assay components are selected from beads, detection reagents, nucleic acid amplification reagents and genome editing reagents, still more preferably detection reagents.

When at least some of the droplets contain a living entity, e.g. cell or bacterium, the aqueous phase preferably comprises a culture or growth medium. Any conventional medium may be used. The medium may, for example, comprise glucose, vitamins, amino acids, proteins, salts, pH indicators and density matching reagents, e.g. Ficoll. Sufficient medium must be provided to keep the entity alive for the duration of the analysis, reaction or other process of interest, e.g. sorting in a microfluidic device.

The present invention also relates to a method of preparing an emulsion as hereinbefore described, comprising:

(i) preparing an aqueous phase;
(ii) preparing an oil phase; and
(iii) mixing the aqueous phase, the oil phase and a surfactant as hereinbefore described to form the emulsion.

In one group of preferred methods of preparing an emulsion the surfactant is mixed with (e.g. dissolved in) the oil phase prior to mixing with said aqueous phase. Preferably, the surfactant is dissolved in the oil phase at a concentration of 0.001% (w/w) to 20% (w/w), more preferably 0.1% (w/w) to 10% (w/w) and still more preferably 0.5% (w/w) to 5% (w/w). Preferably, the aqueous phase comprises at least one analyte. In some preferred methods the oil phase may be a solution of the surfactant in a fluorous solvent. In other words, the surfactant may be dissolved in a fluorous solvent to give the oil phase.

In alternative preferred methods of preparing an emulsion the surfactant is mixed with (e.g. dissolved in) the aqueous phase prior to mixing with the oil phase.

In further preferred methods of preparing an emulsion the surfactant is mixed with (e.g. dissolved in) the aqueous phase and is separately mixed with (e.g. dissolved in) the oil phase prior to mixing of the aqueous phase with the oil phase. Any conventional mixing method may be used, e.g. T-junction, step emulsification, flow focus junction etc.

In preferred methods of preparing an emulsion as hereinbefore described the mixing is by a flow focus junction of a microfluidic device, e.g. a microfluidic device as disclosed in WO2012/022976 and WO2015/015199. This is advantageous because it enables very small aqueous phases, e.g. droplets, to be produced, with volumes typically in the order of picolitres or nanoliters.

Further preferred features of the method of preparing an emulsion are the same as the preferred features of the emulsion described above. Thus preferably the emulsion, the aqueous phase and the oil phase are as defined above in relation to the emulsion.

Experiments, assays, reactions and processes may be carried out in the emulsions of the present invention. The discontinuous aqueous phase of the emulsion, e.g. aqueous droplets, may serve as the site for the experiments, assays, reactions and processes. The surfactants of the present invention stabilise the emulsion, e.g. a discontinuous aqueous phase in an oil phase, allowing the experiment, assay, reaction or process to be carried out in the emulsion. The experiment, assay, reaction or process may therefore be carried out without the discontinuous aqueous phase, e.g. aqueous droplets, coalescing. The experiment, assay, reaction or process may involve one or more analytes present in the aqueous phase of the emulsion. Thus a method of performing one or more experiments, assays, reactions and processes within an emulsion, e.g. within the discontinuous aqueous phase (preferably aqueous droplets) of an emulsion as hereinbefore described forms another aspect of the present invention. The experiments, assays, reactions and processes carried out in the emulsions of the present invention may be carried out in a microfluidic channel or in a microfluidic device, e.g. the experiments, assays, reactions and processes may be carried out in one or more channels of a microfluidic device.

The present invention thus also relates to a method of performing one or more chemical and/or biological reactions, and/or biological processes in the discontinuous aqueous phase of an emulsion as hereinbefore described.

In one aspect the method of performing one or more chemical and/or biological reactions, and/or biological processes in the discontinuous aqueous phase of an emulsion as hereinbefore described is preferably a method of performing one or more chemical and/or biological reactions. The chemical and/or biological reaction may be an enzymatic reaction. Alternatively, the chemical and/or biological reaction is a molecular binding, molecular interaction, cellular interaction or conformational change resulting in a measurable signal. Preferably the chemical and/or biological reaction is an enzyme reaction, a molecular binding or a molecular/cellular interaction.

In another aspect the method of performing one or more chemical and/or biological reactions, and/or biological processes in the discontinuous aqueous phase of an emulsion as hereinbefore described is preferably a method of performing one or more biological processes. The biological process may be antibody secretion or enzyme secretion by cells, or enzyme production inside cells. Alternatively, the biological process is antibody binding. In alternative methods the biological process may be a nucleic acid amplification process, partial or full nucleic acid replication process or nucleic acid transcription process. Alternatively, the biological process may be cell proliferation, cell metabolism, cell transfection, cell transduction, cell signalling, cell apoptosis or cell death. Preferably the biological process is PCR. The process used could be for digital PCR.

The present invention thus also relates to a method of performing one or more drug screening tests against cells, molecules or cell constituents in the discontinuous aqueous phase of an emulsion as hereinbefore described.

In another aspect of the method of performing one or more biological processes the biological process may be a genome editing process. The biological process may be sample preparation, e.g. oligonucleotide sample preparation process for sequencing. The biological process may be nucleic acid sequencing. The molecules being sequenced could be RNA or DNA and the sequencing could be at the genomic, epigenomic or transcriptomic level.

The method of performing one or more chemical and/or biological reactions, and/or biological processes in the discontinuous aqueous phase of an emulsion as hereinbefore described may comprise one or more chemical reactions, one or more biological reactions, one or more biological processes or a mixture thereof. Preferred chemical and/or biological reactions, and/or biological processes are as described above.

Preferably, the method of performing one or more chemical and/or biological reactions, and/or biological processes in the discontinuous aqueous phase of an emulsion as hereinbefore described is carried out in a microfluidic channel or microfluidic device. This enables chemical and/or biological reactions and/or biological processes to be performed on a very small scale, e.g. in droplets, and so very little material, e.g. biological material, is required. The microfluidic channel or device is preferably controlled by an automated device and software.

Preferably, the method of performing one or more chemical and/or biological reactions, and/or biological processes in the discontinuous aqueous phase of an emulsion as hereinbefore described is carried out under thermal, pH or environmental cycling conditions.

The surfactants and emulsions of the present invention have many useful applications. They particularly have many potential uses in microfluidics applications. For example, the surfactants and/or emulsions hereinbefore defined may be used in methods of sorting droplets, coalescing droplets or introducing fluid into a droplet. The surfactants and/or emulsions may also be used in methods of extracting a protein from a fluid. These methods are preferably carried in a microfluidic device.

The methods of the invention described herein (e.g. method of preparing an emulsion, method comprising performing one or more chemical and/or biological reactions, and/or biological processes in the discontinuous phase of an emulsion, method for sorting droplets in a microfluidic device, method of coalescing droplets in a microfluidic device, method of introducing a fluid into a droplet in a microfluidic device, method of splitting droplets in a microfluidic device, method of extracting a molecule from a fluid) may be carried out simultaneously or sequentially (e.g. sequentially) in any combination and order. The carrying out of two or more methods of the invention may be known as a workflow of functions.

A preferred workflow of functions comprises the steps of:

(i) preparing an emulsion as hereinbefore defined, comprising a) preparing an aqueous phase, b) preparing an oil phase, and c) mixing said aqueous phase, said oil phase and a surfactant as hereinbefore defined to form said emulsion in a microfluidic device, wherein the aqueous phase contains cells (e.g. mammalian cells, plant cells, algal cells, yeast cells, hybridomas, microorganisms), cell organelles (e.g. cell nuclei, mitochondria), viruses, or prions in a biological media; the oil phase consists of a fluorous solvents as hereinbefore defined and a surfactant as hereinbefore defined; the resultant emulsion comprises a plurality of droplets, and each droplet contains one cell or a small pool or cells, such as up to 50 (e.g. mammalian cells, plant cells, algal cells, yeast cells, hybridomas, microorganisms), cell organelle (e.g. cell nuclei, mitochondria), virus, or prion;

(ii) performing a first biological process as hereinbefore defined inside the said droplets from step (i), wherein the biological processes are cell proliferation, antibody production by cells, antibody secretion by cells, genome editing of cells, enzyme secretion by cells, enzyme production in cells and enzyme reaction;

(iii) sorting droplets as hereinbefore defined in a microfluidic device, comprising a) providing a stream of said aqueous droplets from step (ii) in an emulsion as hereinbefore defined in a channel of the microfluidic device; illuminating the stream from a first direction; detecting light from analytes within the droplets in a second direction, wherein detecting light is a scattered light or a fluorescence from analytes; sorting the droplets into one of a plurality of differentiated streams responsive to the detected light or a measurable signal;

(iv) optionally introducing a fluid into the said sorted droplets from step (iii) as hereinbefore defined in a microfluidic device, wherein the fluid comprises at least one biological molecule, wherein the biological molecule is selected from small molecules, proteins, enzymes, peptides, amino acids, polysaccharides, oligosaccharides, disaccharides, monosaccharides, nucleic acids, oligonucleotides, nucleotides, cofactors, and cell lysing reagents;

(v) optionally performing a second biological process as hereinbefore defined inside the said droplets from step (iv), wherein the said biological processes are cell lysis and an enzyme reaction, wherein the said enzyme is secreted by the said cell or produced inside the said cell in step (ii), and the said enzyme reaction is to convert a said biological molecule in step (iv) into its corresponding products;

(vi) optionally quenching the said enzyme reaction in step (v) by a) treating the said droplets from step (v) at an elevated temperature for a certain period of time, wherein the temperature is from 50° C. to 98° C., and the period of time is from 10 seconds to 1 hour; b) introducing a fluid into the said droplets from step (v) as hereinbefore defined in a microfluidic device, wherein the fluid comprises an acid, an alkaline, or an enzyme inhibitor; c) storing the said droplets from step (v) at a temperature from 4° C. to 10° C.;

(vii) splitting droplets from step (iii) or (vi) as hereinbefore defined in a microfluidic device comprising a) providing droplets from step (iii) or (vi) in a first microfluidic channel of a microfluidic junctions comprising three microfluidic channels on the microfluidic device; and passing the aqueous droplet through the microfluidic junction, thereby splitting the said droplet into two daughter droplets, the first daughter droplet in the second microfluidic channel and the second daughter droplet in the third microfluidic channel;

(viii) analysing the product molecule produced from the said enzyme reaction in step (iii) or (v) inside the first daughter droplet using mass spectrometry (MS) method after evaporating and ionizing the contents of the first daughter droplet via a microfluidic electrospray ionization (i.e. ESI) emitter;

(ix) sorting the corresponding second daughter droplet in a microfluidic device responsive to MS analysis results in step (viii).

The invention will now be described by way of the following non-limiting examples and Figures wherein.

Figure 7A:
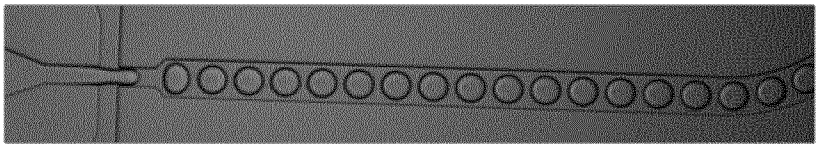
Figure 7B:
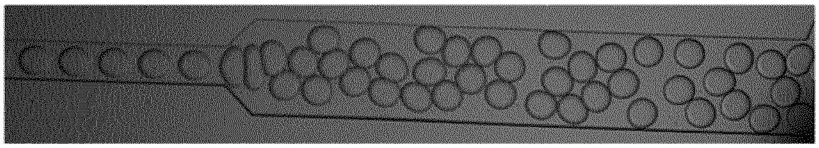
Figure 7C:
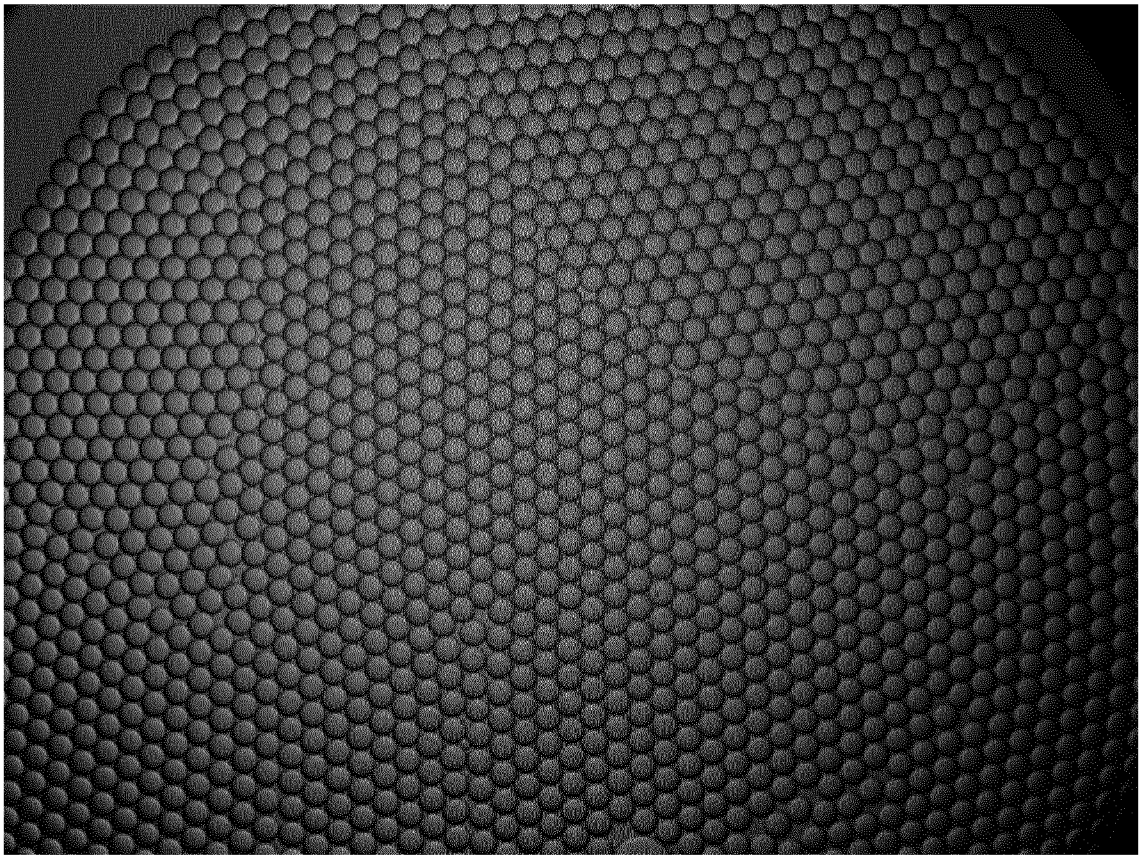

FIG. 7 shows images of microdroplets made from a 5% wt:wt solution of fraction B (surfactant 22) in Novec7500 as follows. Image 7*a*: Droplet generation using a 60 μm×60 μm flow focus device with 5% surfactant 22 in Novec 7500, flow rate 700 μL/h and hydridoma media 500 μL/h, to produce 294 pL microdroplets. Image 7*b* was generated in the same conditions as for image a, but at the generation chip exit. Image 7*c* shows the 294 pL stored picodroplets generated in images a and b above stored in a 100 μm high measurement chip; and FIG. 8 shows images of microdroplets made from surfactant 41, Krytox-bis-Click surfactant (1% surfactant in Novec7500 (w:w) as follows. Image 8*a*—droplet generation in an oil flow rate 2600 μL/h, DPBS 333 μL/h, volume 243.3 pL (n=4), φ 77.4 μm. FIG. 8*b* shows microdroplets stored in a 100 μm high reservoir made from Krytox-bis-Click surfactant 41 (1% surfactant in Novec7500 (w:w), oil flow rate 2600 μL/h, DPBS 333 μL/h, volume 243.3 pL (n=4), φ 77.4 μm. FIG. 8*c* shows microdroplet generation of the Krytox-bis-Click surfactant 41 (1% surfactant in Novec7500 (w:w), oil flow rate 2000 μL/h, DPBS 333 μL/h, volume 293.5 pL (n=4), φ 82.4 μm. FIG. 8*d* shows microdroplets stored in a 100 μm high reservoir made from Krytox-bis-Click surfactant 41 (1% surfactant in Novec7500 (w:w), oil flow rate 2000 μL/h, DPBS 333 μL/h, volume 293.5 pL (n=4), φ 82.4 μm.

EXAMPLES

Example 1: Synthesis of Surfactant 3 Wherein R is Me by Polymerisation

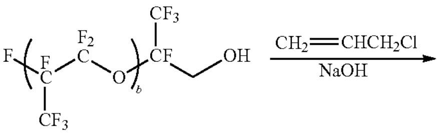

3a

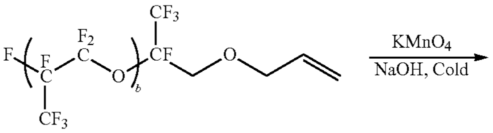

3b

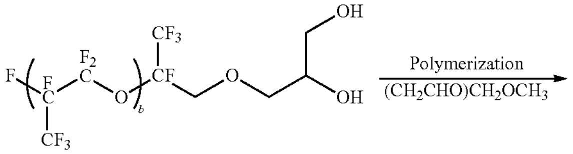

3c

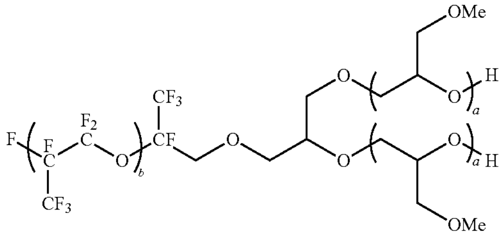

To synthesize surfactant 3, Krytox alcohol (3a) firstly reacts with allyl chloride. The double bond of the resultant intermediate 3b is then oxidized into 1,2-diol, followed by polymer chain extension from the two hydroxyl groups of the Krytox diol intermediate 3c.

Example 2: Synthesis of Surfactant 3 Wherein R is Me by Ether Coupling

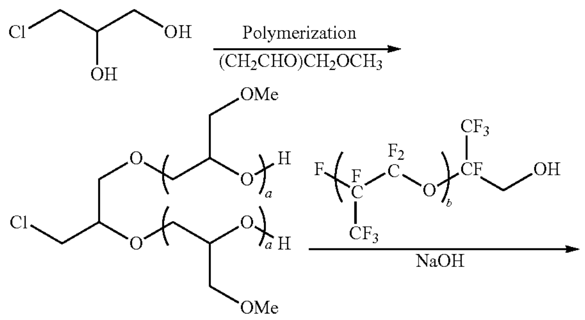

3d

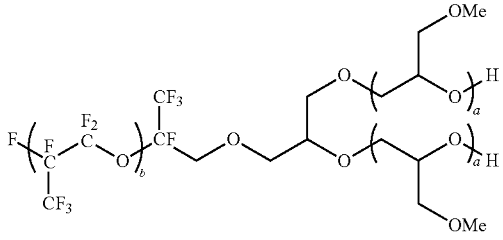

Surfactant 3 can also be synthesized starting from polymer chain extension from the two hydroxy of 3-chloro-1,2-propanediol, followed by coupling reaction between the resulting intermediate 3d and Krytox alcohol in the presence of a base.

Example 3: Synthesis of Surfactant 4 Wherein R is Me by Amide Coupling

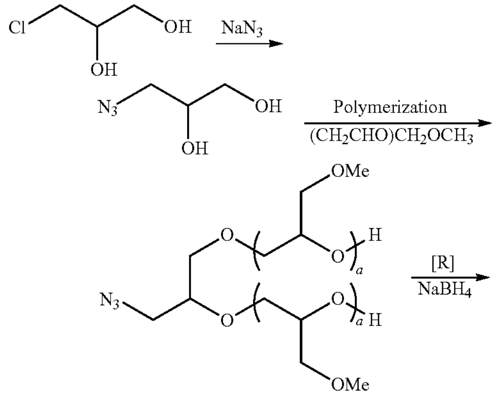

4a

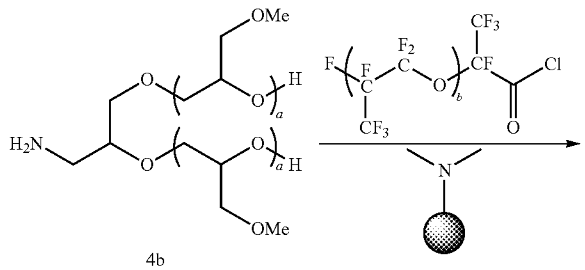

4b

-continued

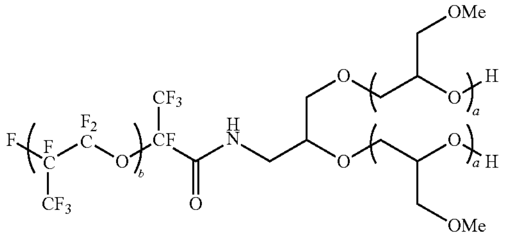

To synthesize surfactant, 4, 3-chloro-1,2-propanediol is firstly converted into 3-azido-1,2-propanediol followed by polymer chain extension from the two hydroxyl groups. The azido group of the resulting intermediate 4a is reduced into an amino group. Lastly, the intermediate 4b then couples with Krytox acid chloride giving surfactant 4.

Example 4: Synthesis of Surfactant 11 Wherein R is Me by Amide Coupling

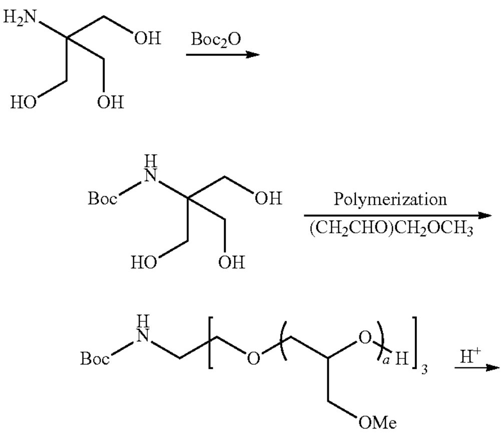

11a

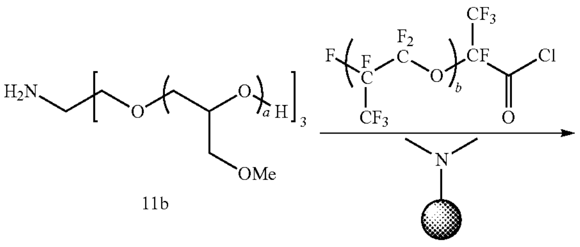

11b

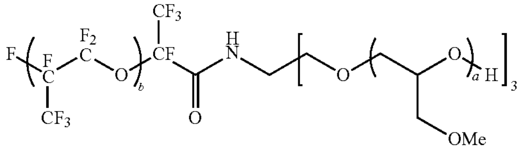

The synthesis of surfactant 11 starts from Boc protection of the amino group of Trizma® base, followed by polymer chain extension from the three hydroxyl groups. After the deprotection of Boc of the intermediate 11a, a coupling reaction between the intermediate 11b and Krytox acid chloride gives the target surfactant 11.

Example 5: Synthesis of Surfactant 5 Wherein R is Me by Carbamate Coupling
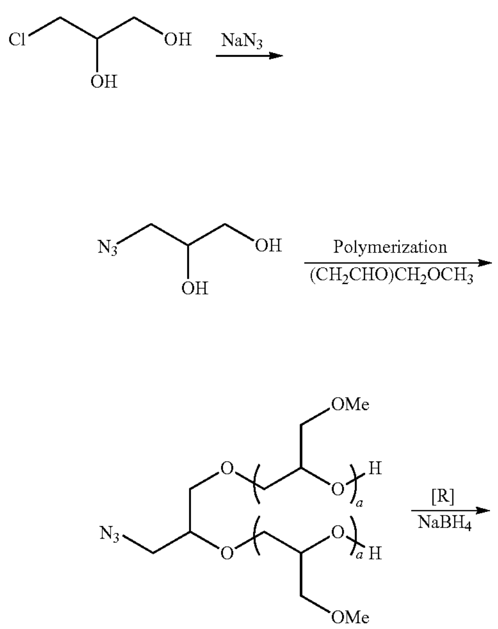
-continued
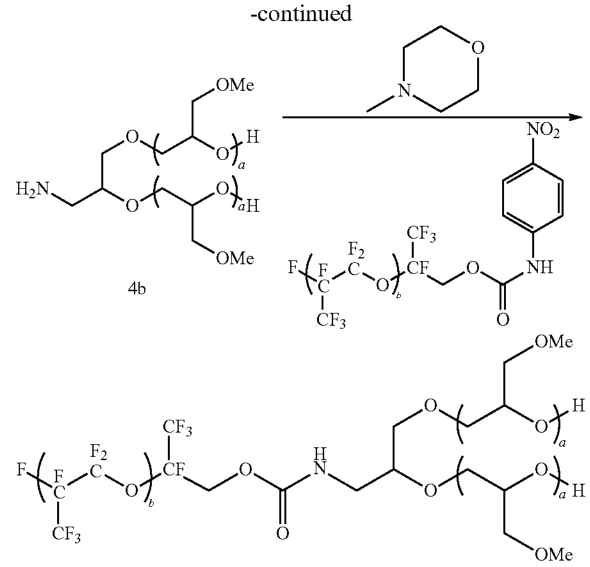
4b
Surfactant 5 is synthesized by coupling the intermediate 4b with 4-nitrophenyl chloroformate activated Krytox alcohol.
Example 6: Synthesis of Surfactant 8 Wherein R is Me by Coupling
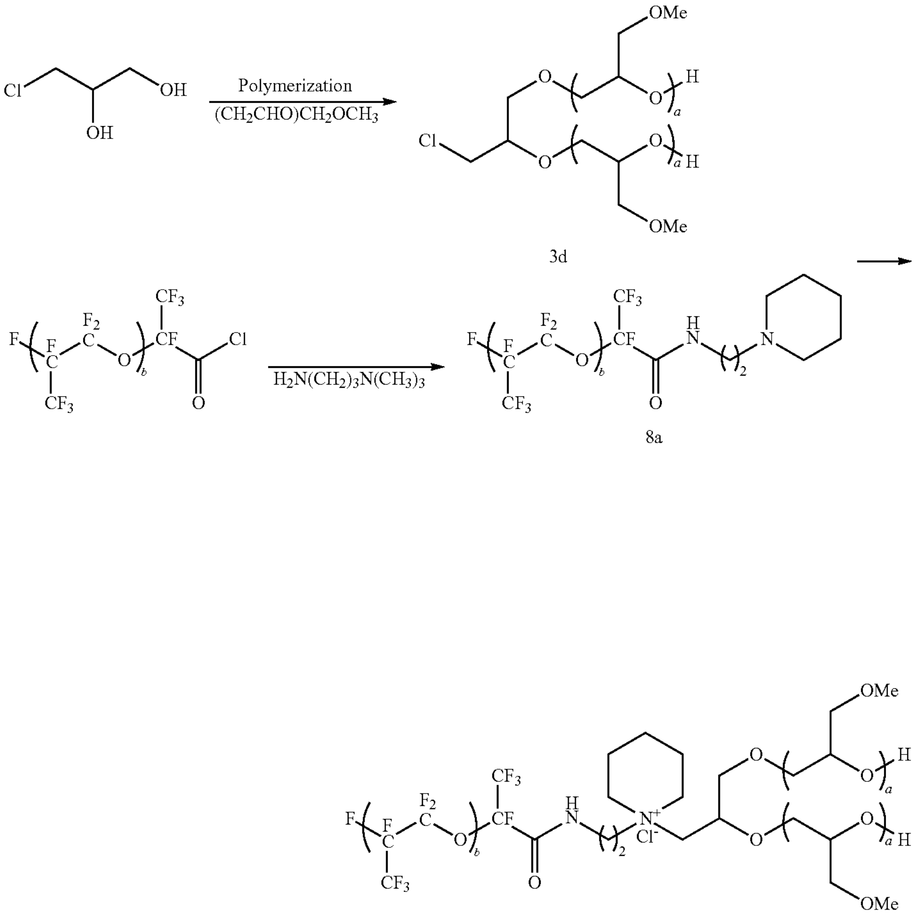
3d
8a Surfactant 8 is synthesized by coupling the intermediate 3d and the intermediate 8a, which is made by reacting Krytox acid chloride with 1-(2-aminoethyl) piperidine.

Example 7: Synthesis of Surfactant 23 Wherein R is Me by Coupling

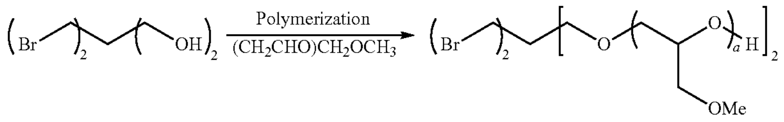

23a

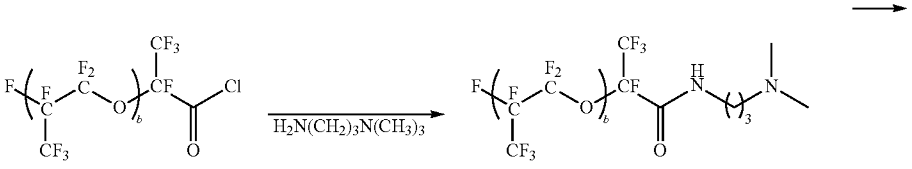

23b

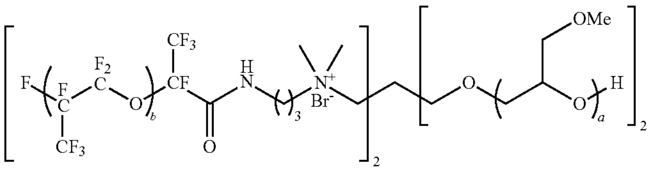

The synthesis of surfactant 23 starts from polymer chain extension from the two hydroxyl groups of 2,2-Bis(bromomethyl)-1,3-propanediol giving the intermediate 23a, followed by coupling with the intermediate 23b which is made following the procedure below.

Synthesis of N-[3-(Dimethylamino)propyl] Krytox amide (23b)

To a stirred solution of 3-(dimethylamino)-1-propylamine (50.61 g, 62.3 mL, 495 mmol) in anhydrous THF (60 mL), at 50° C. under nitrogen, was added solution of krytox acid chloride (2, 192.39 g, 82.55 mmol) in Novec 7500 (203 mL) dropwise over 1H, via canula. After stirring the mixture at 50° C. under nitrogen for 48 hours the mixture was cooled to RT and a yellow solid removed by filtration and washed with Novec 7500 (30 ml). The filtrate was stirred with methanol (4×100 mL), each time the bottom fluorous phase was separated in a separating funnel. The fluorous layer was then evaporated to dryness in vacuo to yield (6) as a pale yellow oil (189.7 g, 95.9%). IR ($cm^{-1}$): 2955.5 (bw), 2832.0 (bw), 1729.6 (sm). $^1H$ NMR (400 MHz, 5% $C_6D_{12}$ in FC72; vol:vol): 9.506 (1H, bs, NH), 3.493 (2H, m, $CONHCH_2$), 2.488 (2H, t, $CH_2$—$NMe_2$), 2.246 (6H, s, $NMe_2$), 1.692 (2H, m, $CH_2$—$CH_2NMe_2$).

Example 8: Synthesis of Surfactant 27 Wherein R is Me by Coupling

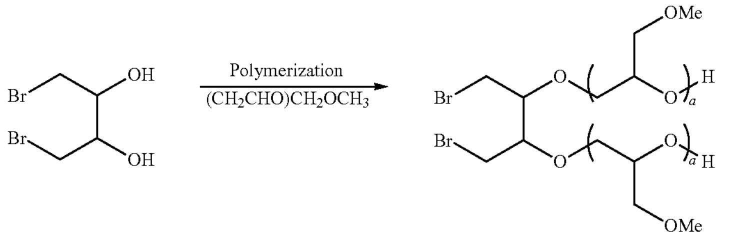

27a

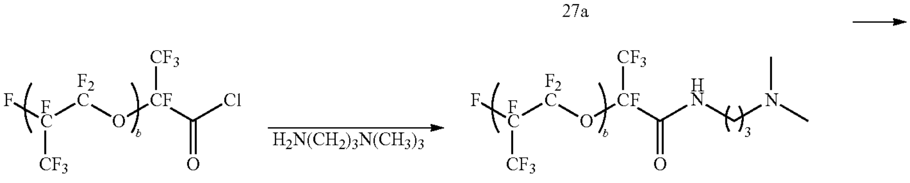

23b

-continued
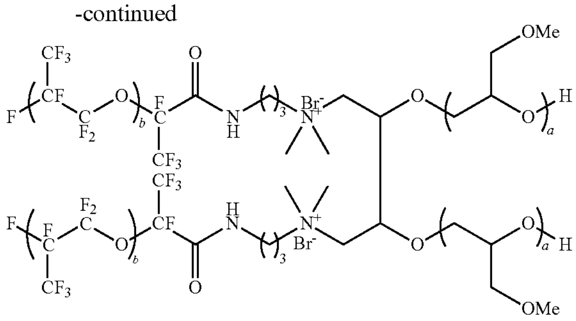
The synthesis of surfactant 27 starts from polymer chain extension from the two hydroxyl groups of 1,4-Dibromo-2,3-butanediol giving the intermediate 27a, followed by coupling with the intermediate 23b which is made following the procedure above.
Example 9: Synthesis of Surfactant 34 Wherein R is Me by Click Chemistry
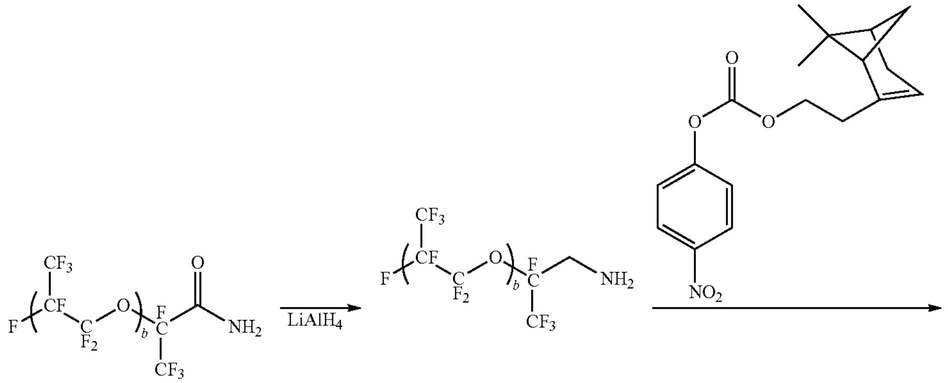
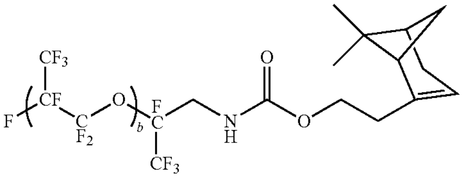
34a
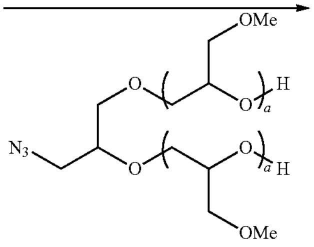
4a
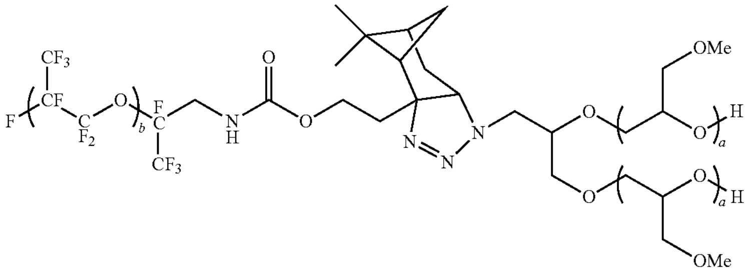

Firstly, Krytox amide was reduced to Krytox amine, followed by coupling with 4-nitrophenyl chloroformate activated (1R)-(−)-nopol. The resulting intermediate 34a then undergoes Click reaction with intermediate 4a giving the target surfactant 34.

Example 10: Synthesis of Surfactant 36 Wherein R is Me by Click Chemistry

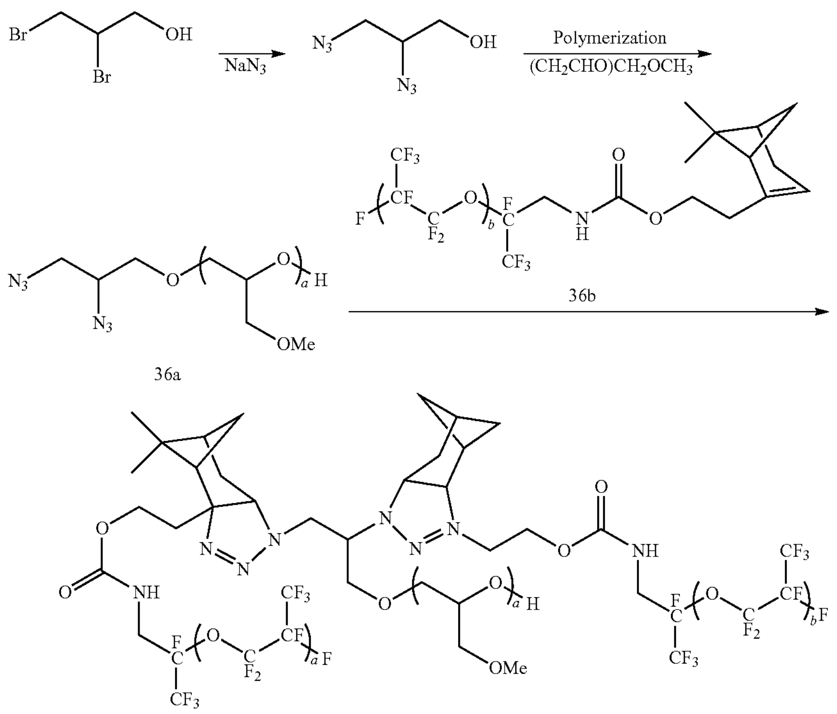

36b
36a

Firstly, 2,3-dibromo-1-propanol reacts with sodium azide giving 2,3-diazido-1-propanol, followed by polymer chain extension. The resulting intermediate 36a then undergoes Click reaction with Krytox nopol (36b), which is made from Krytox alcohol, giving the target surfactant 36.

Example 11: Synthesis of Surfactant 35 Wherein R is Me by Click Chemistry

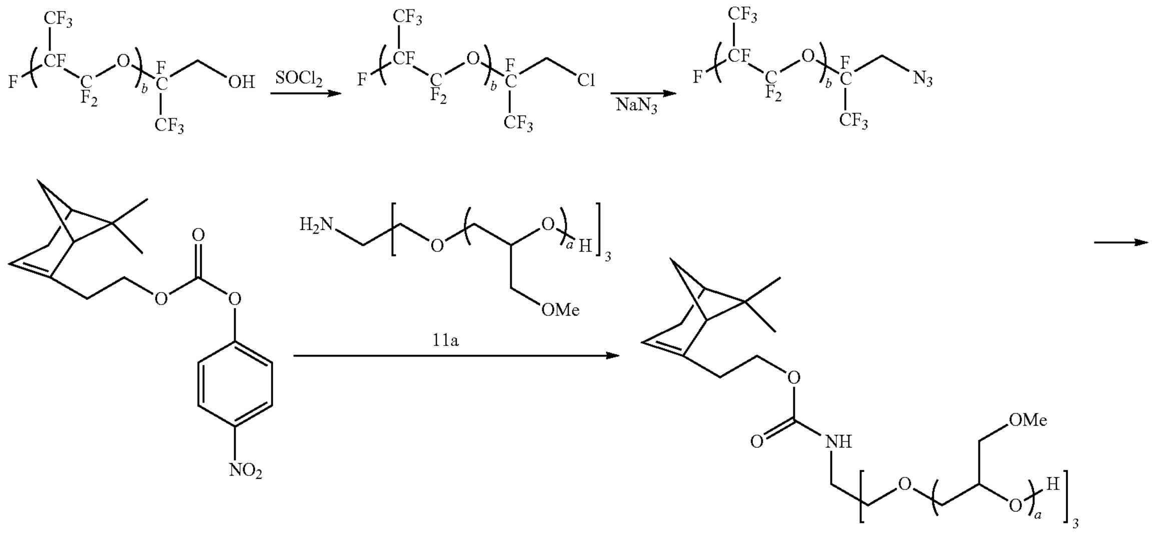

11a

-continued

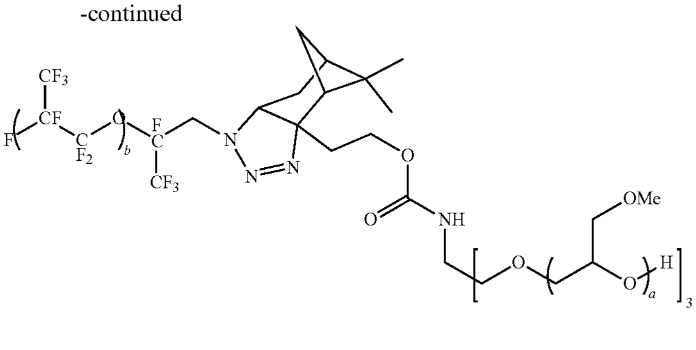

The synthesis of surfactant 35 starts from the reaction between 4-nitrophenyl chloroformate activated (1R)-(−)-nopol and the intermediate 11b. The resulting intermediate 35a then undergoes Click reaction with Krytox azide (35b), which is made from Krytox alcohol, giving the target surfactant 35.

Example 12

Synthesis of Krytox-FSL-PEG4-11-azido-1-amide

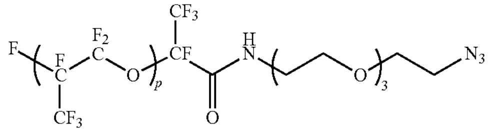

To a stirred solution of Krytox FSL 2,2,2-trifluoroethyl ester (57.26 g, 23.97 mmol) in Novec 7100 (58.0 mL), under nitrogen at 38° C., was added a solution of 11-azido-3,6,9-trioxaundecan-1-amine (5.393 g, 24.71 mmol) in anhydrous THF (25.5 mL) via syringe, including a 1.5 mL wash. Then stirred overnight at 40° C., where TLC indicated that a lot unreacted amine was present. Triethylamine (3.512 mL, 25.2 mmol) was added via syringe and the block temperature raised to 60° C. After 48 hours the reaction was cooled to RT and evaporated to dryness in vacuo. The resulting oil was dissolved in Novec 7500 (200 mL) and was extracted in a separating funnel with methanol (4×50 mL). The fluorous layer was then evaporated in vacuo to give a thick yellow oil (69.0 g). IR ($cm^{-1}$) 2115.0 ($N_3$), 1790.5 (C═O, TFE-ester), 1730.62 (C═O, product). The two carbonyl stretches were roughly equal in intensity. A portion of the crude material (20.95 g) was dissolved in Novec 7100 (15.0 mL) and loaded on to an 80 g Interchim 50 μm HC cartridge, pre-washed with Novec 7100. The column was then washed as follows: a. Novec 7100 (250 mL), b. 0.5% MeOH/Novec 7100 (250 mL), c. 1.0% MeOH/Novec 7100 (250 mL), d. 1.5% MeOH/Novec 7100 (250 mL), e. 2.0% MeOH/Novec 7100 (250 mL), f. 3.0% MeOH/Novec 7100 (250 mL), g. 5.0% MeOH/Novec 7100 (250 mL), h. 10.0% MeOH/Novec 7100 (500 mL). The starting material eluted in Novec 7100 and was evaporated in vacuuo to give a colourless oil (12.224 g). The late running product band fractions were combined and evaporated in vacuo to give the product as a clear oil (7.317 g, 12.15%). IR ($cm^{-1}$): 2112.3 ($N_3$, mBr), (C═O, 1717.15). NMR (400 MHz, 5% $C_6D_{12}$ in FC-72 (weight:weight) containing 0.04% TMS as internal standard, Δ (ppm) 7.80 (1H, s, NH), 3.72 (14H, s), 3.60 (2H, s), 3.35 (2H, s).

Polymerisation of 1-(2-(6,6-dimethylbicyclo[3.1.1]hept-2-en-2-yl)ethoxy)-poly(2-methoxymethylethylene oxide)

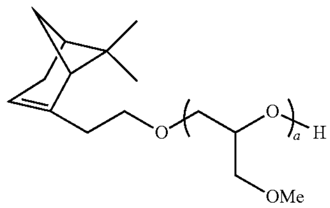

t-Bu-P4 Phosphazene base (10.48 ml, 0.8 M in Hexane, 8.4 mmol) was added to a solution of (1R)-(−)-Nopol (1.40 g, 8.4 mmol) in toluene (40 ml). Methyl Glycidyl Ether (19.6 g, 222.4 mmol) was added dropwise and the resultant mixture stirred at 40° C. under N2 for 2 days. The reaction was quenched with benzoic acid (2.0 g), concentrated under reduced pressure and re-dissolved in THF. The product was purified by passing though neutral alumina, filtering and concentrating under reduced pressure to give a pale brown oil (11.33 g).

Click Reaction Between Krytox-FSL-PEG4-11-azido-1-amide and 1-(2-(6,6-dimethylbicyclo[3.1.1]hept-2-en-2-yl)ethoxy)-poly(2-methoxymethylethylene oxide)

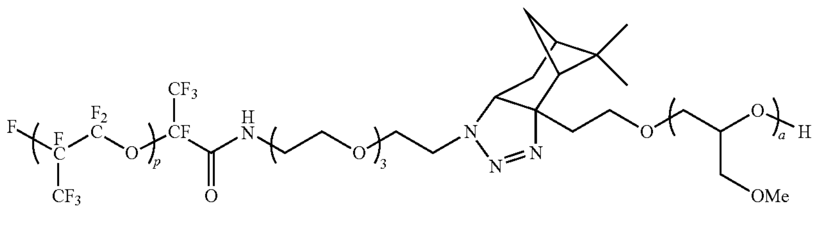

To a solution of the crude nopol polymer (0.93 g) in Novec 7500 (5.4 mL) was added a solution of Krytox-FSL-$PEG_4$-11-azido-1-amide (1.303 g, 5.18 mmol) in anhydrous DMF (2.0 mL), via syringe and under a nitrogen atmosphere. The heating block was set to 105° C. After 3 hours TLC (4% MeOH in Novec 7100 indicated that all the azide had reacted, but heating was continued at 105° C. overnight. On cooling to RT, Novec 7500 (20 mL) was added and the solution extracted in a separating flask with methanol (3×50 mL). The fluorous phase was evaporated to dryness in vacuo to give the product (1.156 g). A portion of the crude material (1.00 g) was dissolved in Novec 7100 (3.0 mL) and loaded on to an 25 g Interchim 50 μm HC cartridge, pre-washed with Novec 7100. The column was then washed as follows: a. Novec 7100 (100 mL), b. 1.0% MeOH/Novec 7100 (100 mL), c. 2.0% MeOH/Novec 7100 (100 mL), d. 3.0% MeOH/Novec 7100 (100 mL), e. 4.0% MeOH/Novec 7100 (100 mL), f. 5.0% MeOH/Novec 7100 (100 mL), g. 6.0% MeOH/Novec 7100 (100 mL), h. 7.0% MeOH/Novec 7100 (100 mL) and i. 8.0% MeOH/Novec 7100 (100 mL). The polar fractions were combined and evaporated in vacuo to give the product as a pale-yellow oil (365 mg). A 5.0% stock solution was made up by dissolving the oil in Novec 7500 (6.935 g) and used for microdroplet generation.

Example 13

2,2-Bis(azidomethyl)-1,3-propane-diol

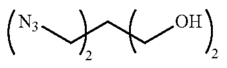

To solid 2,2-Bis(azidomethyl)-1,3-propanediol (24.06 g, 91.86 mmol) was added a solution of sodium azide (18.19 g, 275.6 mmol) in water (50 mL), at RT under nitrogen, the remaining azide beaker was washed out with water (40.0 mL) and added to the reaction. The stirred solution was then heated to a block temperature of 100° C., under nitrogen, as the solution was slightly hazy, extra water (30.0 mL) was added and the block temperature increased to 105° C. After 46 hours the reaction was cooled to RT and extracted with DCM (3×100 mL). The combined organic extracts were dried over sodium sulphate, filtered and evaporated to give the product as a pale-yellow oil (16.24 g, 95.0%). NMR (400 MHz, $CDCl_3$ containing 0.04% TMS as internal standard, Δ (ppm) 3.65 (4H, t, $CH_2$—O), 3.43 (4H, t, $CH_2$—$N_3$), 2.60 (2H, bs, OH).

2,2-Bis(azidomethyl)-1,3-propane-di-O-polymer

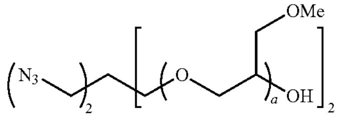

To a stirred solution of 2,2-Bis(azidomethyl)-1,3-propane-diol (200 mg, 1.075 mmol) in anhydrous toluene (10 mL), under nitrogen at RT, was added a solution $P_4$-t-Bu in hexane (0.8 M, 2.68 mL, 2.15 mmol, phosphazene base) via syringe. Then neat 2-(methoxymethyl)oxirane (2.215 mL, 36.49 mmol, 34.0 mol equivalents) was added to the stirring solution via syringe at RT. After 48 hours the reaction was quenched by the addition of solid benzoic acid (0.934 g, 7.65 mmol), following dissolution the reaction was evaporated in vacuo. The crude product was dissolved in DCM (50 mL) and washed with water (50 mL), the aqueous phase was back extracted with DCM (2×15 mL). The combined organic phase was washed with saturated sodium bicarbonate. The organic fraction was then stirred with aminopropyl silica (1.64 g, 1.78 mmol) for ten minutes, then filtered and evaporated in vacuo to give a pale-yellow oil (2.985 g). The oil was dissolved in THF (3.0 mL) and loaded on to a gravity column of alumina (34 g), pre-washed with THF. The column was washed with first THF (300 mL), which was evaporated in vacuo to give a yellow oil (0.722 g, IR (cm-1) 2101.0 (weak, s, $N_3$). Washing the column with 10% methanol in THF (250 mL) gave the crude product (1.876 g, IR ($cm^{-1}$) 2101.0 (medium, s, $N_3$).

2,2-Bis(aminomethyl)-1,3-propane-di-O-polymer

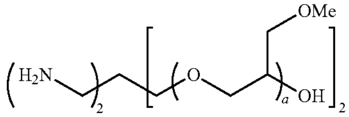

To a solution of the crude 2,2-bis(aminomethyl)-1,3-propane-di-O-polymer (0.86 g, ca. 0.27 mmol) in methanol (3.0 mL) was added solid ammonium formate (85 mg, 1.35 mmol), followed by zinc dust (118 mg, 1.80 mmol) and the reaction starred at RT under nitrogen. After 20 hours the solids were filtered off over celite and the filtrate evaporated in vacuo to give a pale-yellow oil (0.731 g). The oil was dissolved on to a 1 g SCX cartridge and eluted first with methanol (15 mL) and then with ammonia in methanol (7.0 M, 15.0 mL). The methanolic ammonia fraction was evaporated to give a green oil (90 mg).

Synthesis of Surfactant 22 Wherein R is Me

22

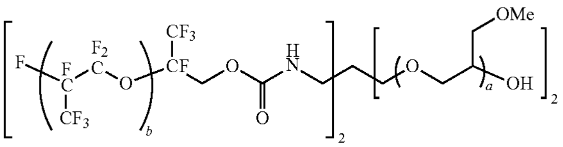

To a stirred solution of the 2,2-bis(aminomethyl)-1,3-propane-di-O-polymer (90 mg, 28.8 mmol) in THF (2.5 mL) was added N-methylmorpholine (50 pL, 0.54 mmol) at RT under nitrogen. A solution of Krytox-4-nitrophenyl carbonate (133 mg, 71.94 μmol, 2.5 mol equivalents) in Novec 7100 (3.0 mL) was added, during the addition the solution went from green to yellow. The block temperature then raised to 40° C. and stirred for ca. 112 hours before cooling to RT. The solution was evaporated to dryness in vacuo, then dissolved in Novec 7500 (12.0 mL) and washed with methanol (3×10.0 mL). The fluorous fraction was evaporated in vacuo to give the crude product as a colourless oil (219 mg). IR ($cm^{-1}$) 1779.8 (weak, s, unreacted Krytox carbonate) and 1744.6 (medium, s, carbamate).

Example 14: Water Picodroplet Generation

In order to generate droplets with volumes between 300-400 pL, fluorous oil (e.g. Novec 7500) containing 5% (w/w) of the surfactant synthesised in example 12, was used as the continuous carrier oil phase, whilst a biochemical buffer solution was used as the dispersed aqueous phase. The two phases were infused using Cetoni GmbH syringe pumps connected via polythene tubing (ID: 0.38 mm) to PDMS microfluidic chip having a single flow-focusing nozzle (nozzle dimensions: 60×60 μm). Typical flow rates ranged between 1000-1500 μL/hr for the fluorous phases and were kept constant at 500 μL/hr for aqueous phases.

Figure 1:
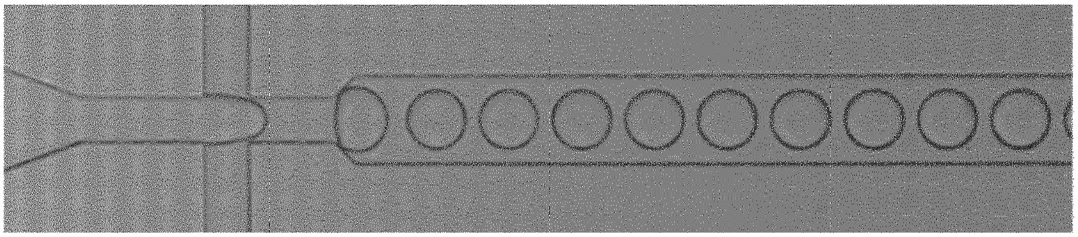
FIG. 1 shows picodroplets stabilised by a surfactant of the present invention at the flow focusing junction of a microfluidic device.
Figure 2:
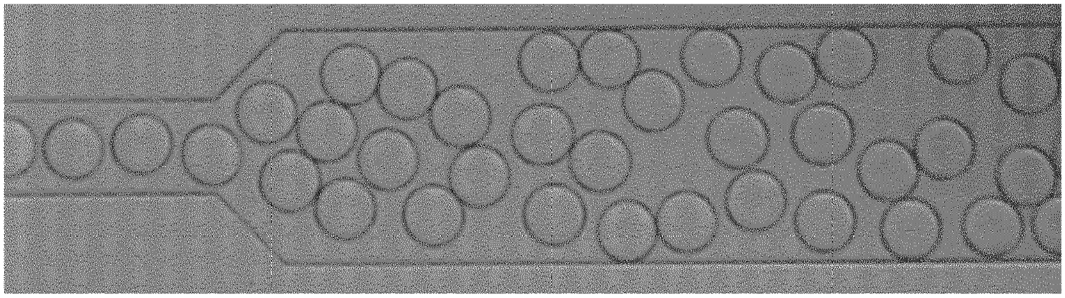
FIG. 2 shows the same picodroplets, stabilised by a surfactant of the present invention, at the outlet of the microfluidic device.
Figure 3:
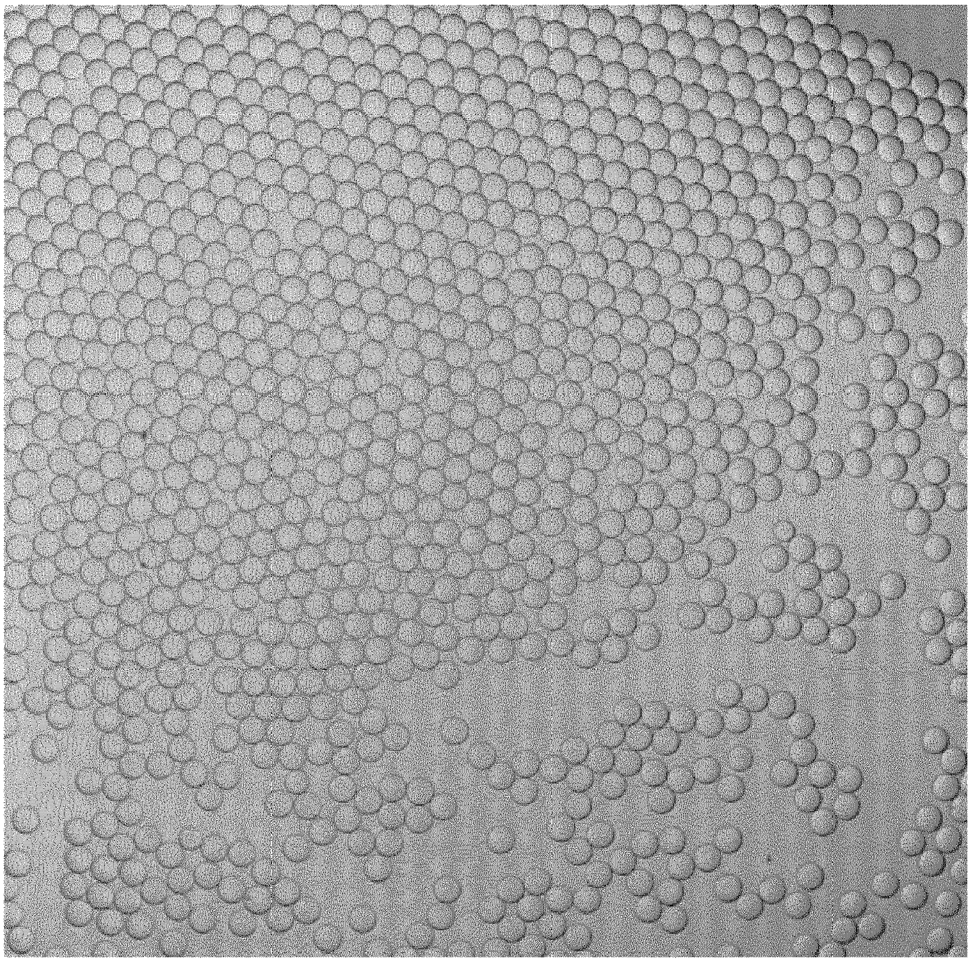
FIG. 3 shows the sample picodroplets, stabilised by a surfactant of the present invention, taken from a collection vial.

The Figures show that the picodroplets are stabilised by the surfactant. FIG. 1 shows the droplet generation at the flow focusing junction and FIG. 2 shows the droplets at the outlet. It is clear that the droplets are the same size. FIG. 3 shows the sample droplets taken from a collection vial, which further confirms the stability of the droplets.

Example 15: Synthesis of Surfactant 37 Wherein R is Me

Synthesis of 2,3-diazidopropan-1-ol

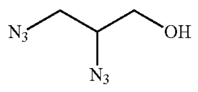

2,3-dibromopropan-1-ol (4.36 g, 20 mmol) was added to a stirring solution of $NaN_3$ in DMSO (120 mL, 60 mmol) and stirred at 75° C. for 2 days. TLC showed only 1 product spot. The reaction was quenched with water (250 mL), extracted with diethyl ether (3×, 150 mL), washed with water (2×, 150 mL) and saturated brine (150 mL), and dried with sodium sulphate (50 g). Filtration yields the product as a yellow oil (2.231 g, 15.7 mmol, 79%). IR ($cm^{-1}$) 3374.8 (broad, m, OH), 2932.8 (b, m, CH), 2085.0 (Sharp, s, $N_3$). NMR (400 MHz, $CDCl_3$ containing 0.04% TMS as internal standard, Δ (ppm) 3.82 (3H, m, $CH_2OH$ & $CHN_3$), 3.45 (1H, m, $CH_2N_3$), 2.00 (1H, s, OH).

Synthesis of 1-(2,3-diazidopropoxy)-poly(3-methoxypropyleneoxide)

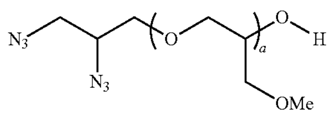

2-(methoxymethyl)oxirane (8.38 g, 95.1 mmol) was added to a solution of 2,3-diazido-propan-1-ol (0.51 g, 3.59 mmol) in toluene (20 mL). Tert-Bu-P4 base (4.49 mL, 0.8 M in hexane, 3.59 mmol) was added dropwise and the mixture stirred at room temperature for 6 days. The reaction was quenched with benzoic acid (1.00 g), and evaporated to yield a crude oil (8.183 g). This was purified by column chromatography eluted with THF (100%) giving the product (2.989 g). NMR (400 MHz, $CDCl_3$ containing 0.04% TMS as internal standard, Δ (ppm) 3.94 (2H, broad s, 2H, $CH_2OH$), 3.64 (broad m, 4H), 3.56-3.40 (m, 7.5H), 3.39-3.36 (m, 5H), 1.89 (2H, s, OH).

Synthesis of 1-(2,3-diaminopropoxy)-poly(3-methoxypropyleneoxide)

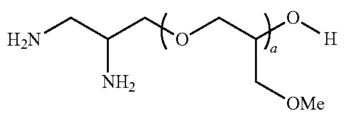

1-(2,3-diazidopropoxy)-poly(3-methoxypropyleneoxide) (2.0 g) was added to a stirring solution of triphenyl phosphine (1.20 g, 4.56 mmol) in methanol (50 mL) and heated to 50° C. The solution was stirred under $N_2$ at 50° C. for two weeks. The mixture was evaporated and redissolved in dichloromethane (30 mL). This was acidified with HCl (1.0 M, 15 mL) and brine (5 mL), washed with dichloromethane (2×15 mL), basified with NaOH (10 M) and extracted with dichloromethane (3×20 mL). The combined organic fractions were dried over $Na_2SO_4$ and evaporated to yield the product as a yellow/brown oil (0.31 g). NMR (400 MHz, $CDCl_3$ containing 0.04% TMS as internal standard, Δ (ppm) 3.94 (2H, s, $CH_2O$), 3.68 (26H, broad s), 3.55-3.28 (60H, broad m), 2.80 (4H, bm, $(NH_2)_2$), 0.8 (2H, broad s, OH).

Synthesis of Surfactant 37

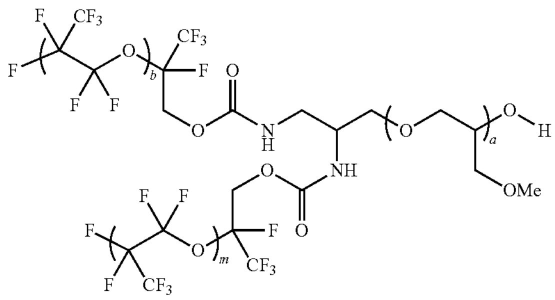

A solution of 1-(2,3-diaminopropoxy)-poly(3-methoxypropyleneoxide) (0.294 g, 0.639 mmol) and 4-methylmorphline (0.21 mL, 1.1917 mmol) in THF (25 mL) was added to a solution of PFPE-$CH_2OC(O)O$-Ph-4-$NO_2$ (2.36 g, 1.278 mmol) in Novec 7100 (15 mL) and stirred under $N_2$ at 40° C. for 1 week. The reaction mixture was filtered, evaporated and redissolved in Novec 7100. The solution was then washed, and subsequently filtered with aminopropyl functionalized silica (20 g, 10 g and 10 g) until no yellow colour remained. The resultant solution was evaporated to yield a pale yellow oil (0.765 g) which was purified on a 20 g silica (30 um) column chromatography eluted with 2% MeOH/Novec 7100 (75 mL), 5% MeOH/Novec 7100 (50 mL), 7% MeOH/Novec 7100 (50 mL) and 10% MeOH/novec 7100 (100 mL) yielding the product (0.667 g). NMR (400 MHz, 5% $C_6D_{12}$ in FC-72 (weight:weight) containing 0.04% TMS as internal standard, Δ (ppm) 4.78 (4H, broad m, (Krytox-$CH_2)_2$), 4.10-3.70 (broad m, 16H), 3.68-3.40 (broad m, 9.2H), 3.39-3.25 (broad m, 16H).

Microdroplet Generation

Figure 4:
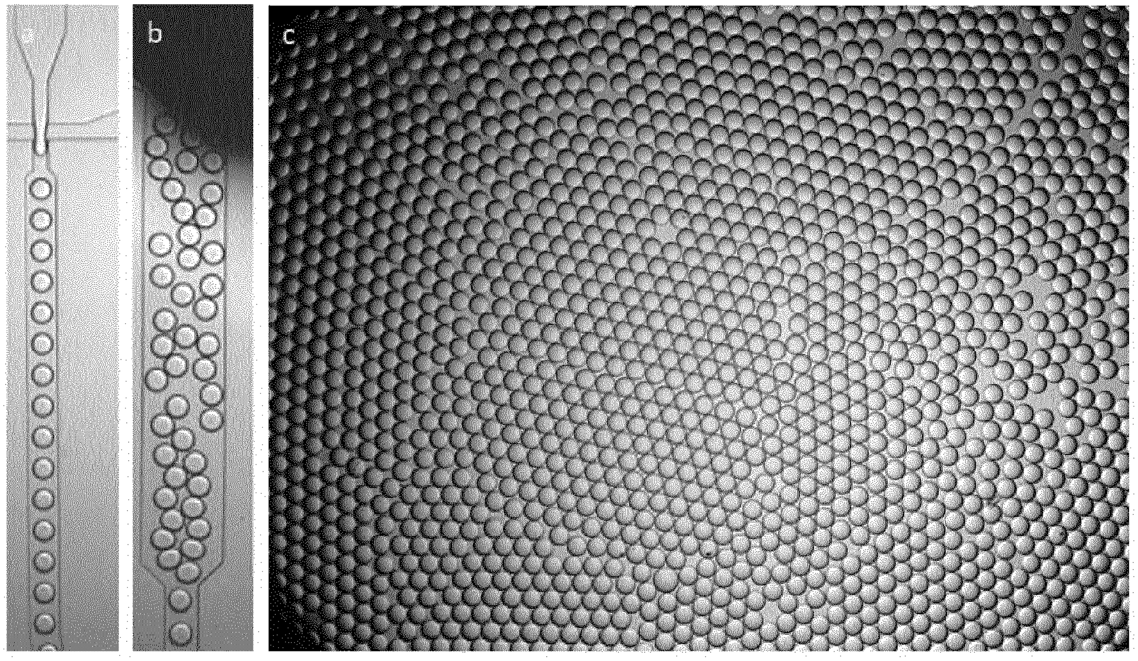
FIG. 4 shows CHO culture medium microdroplet generation using surfactant 37 at the flow focusing junction (a), microdroplets at the outlet (b), and the sample microdroplets taken from a collection vial (c)
Figure 5:
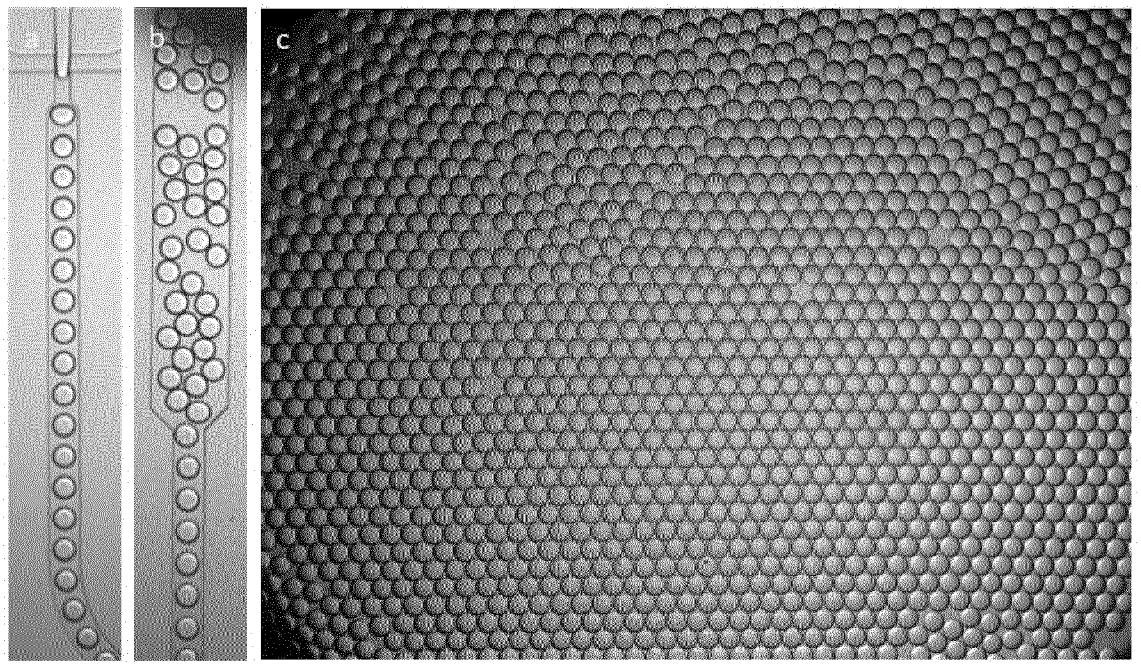
FIG. 5 shows hybridoma culture medium microdroplet generation using surfactant 37 at the flow focusing junction (a), microdroplets at the outlet (b), and the sample microdroplets taken from a collection vial (c)

In order to generate droplets with volumes between 300-400 pL, fluorous oil (e.g. Novec 7500) containing 5% (w/w) of surfactant 37 synthesised in Example 15, was used as the continuous carrier oil phase, whilst a cell culturing medium was used as the dispersed aqueous phase. The two phases were infused using Cetoni GmbH syringe pumps connected via polythene tubing (ID: 0.38 mm) to PDMS microfluidic chip having a single flow-focusing nozzle (nozzle dimensions: 60×60 μm). Typical flow rates ranged between 800-1000 μL/hr for the fluorous phases and were kept constant at 500 μL/hr for aqueous phases. FIGS. 4 and 5 show that the microdroplets are stabilised by the surfactant. FIG. 4 shows CHO culture medium microdroplet generation at the flow focusing junction (a), microdroplets at the outlet (b), and the sample microdroplets taken from a collection vial, that confirms the stability of the microdroplets. FIG. 5 shows hybridoma culture medium microdroplet generation at the flow focusing junction (a), microdroplets at the outlet (b), and the sample microdroplets taken from a collection vial, that confirms the stability of the microdroplets.

Example 16: Synthesis of Surfactant 38 Wherein R is Me

Synthesis of 2,3-diazidobutane-1,4-diol

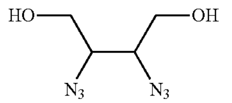

A solution of 2,3-dibromo-1,4-butanediol (4.96 g, 20 mmol) in water (25 mL) was added to a solution of $NaN_3$ (3.90 g, 60 mmol) in water (25 mL), and heated under $N_2$ at 80° C. for 5 days. The reaction mixture was cooled to room temperature, washed with chloroform/isopropanol (3:1, 4×50 mL). The combined organic extracts were dried over $Na_2SO_4$ and evaporated to yield a yellow oil (2.95 g, 17.2 mmol, 86%).

Synthesis of 1,4-(2,3-diazido butoxy)-dipoly(3-methoxypropyleneoxide)

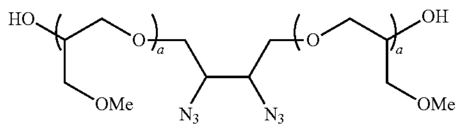

2-(methoxymethyl)oxirane (13.57 g, 154.0 mmol) was added to a solution of 2,3-diazidobutane-1,4-diol (1.00 g, 5.81 mmol) in toluene (50 mL). Tert-Bu-P4 base (7.26 mL, 5.81 mmol) was added dropwise yielding a change from colourless to clear yellow. The reaction was stirred at room temperature for 1 week under $N_2$. The reaction was quenched with benzoic acid (1.50 g), and evaporated. The crude oil was purified by column chromatography through neutral alumina eluted with THF (100%) giving the product (8.389 g).

Synthesis of 1,4-(2,3-diamino butoxy)-dipoly(3-methoxypropyleneoxide)

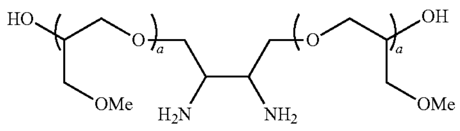

1,4-(2,3-diazido butoxy)-dipoly(3-methoxypropyleneoxide) (4.0 g) was added to a stirring solution of triphenyl phosphine (1.20 g, 4.56 mmol) in methanol (100 mL). Water (0.82 g, 45.6 mmol) was added and the solution heated to 50° C., stirred under $N_2$ at 50° C. for two days. The mixture was evaporated and redissolved in dichloromethane (30 mL). This was acidified with HCl (1.0 M, 3×15 mL) and brine (5 mL), washed with dichloromethane (2×15 mL), basified with NaOH (10 M) and extracted with dichloromethane (3×20 mL). The combined organic fractions were dried over $Na_2SO_4$ and evaporated to yield the product as a yellow oil (1.538 g).

Synthesis of Surfactant 38

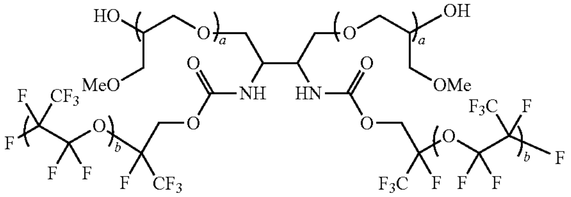

A solution of 1,4-(2,3-diamino butoxy)-dipoly(3-methoxypropyleneoxide) (0.8 g, 0.735 mmol) and 4-methylmorphline (0.22 g, 2.206 mmol) in THF (25 mL) was added to a solution of PFPE-$CH_2OC(O)O$-Ph-4-$NO_2$ (2.71 g, 1.471 mmol) in Novec 7100 (15 mL) and stirred under $N_2$ at room temperature for 1 week. The reaction mixture was evaporated and redissolved in Novec 7100 (50 mL), followed by washing with 2-aminopropyl functionalized silica (2×20 g) until no yellow colour remained. The resultant solution was evaporated to yield a pale yellow oil (0.43 g) which was purified on a 20 g silica (30 um) column chromatography eluted with 2% MeOH/Novec 7100 (75 mL), 5% MeOH/Novec 7100 (50 mL), 7% MeOH/Novec 7100 (50 mL) and 10% MeOH/novec 7100 (100 mL) yielding the product.

Example 17: Synthesis of Surfactant 39 Wherein R is Me

Polymerisation of 1-(2-(6,6-dimethylbicyclo[3.1.1]hept-2-en-2-yl)ethoxy)-poly(2-methoxymethylethylene oxide)

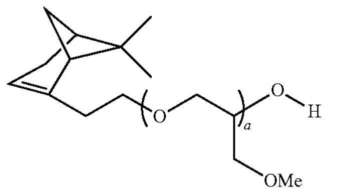

t-Bu-P4 Phosphazene base (10.48 ml, 0.8 M in Hexane, 8.4 mmol) was added to a solution of (1R)-(−)-Nopol (1.40 g, 8.4 mmol) in toluene (40 ml). Methyl Glycidyl Ether (19.6 g, 222.4 mmol) was added dropwise and the resultant mixture stirred at 40° C. under N2 for 2 days. The reaction was quenched with benzoic acid (2.0 g), concentrated under reduced pressure and redissolved in THF. The product was purified by passing though neutral alumina, filtering and concentrating under reduced pressure to give a pale brown oil (11.33 g).

Alternative Method

To a solution of (1R)-(−)-Nopol (0.181 g, 1.09 mmol) in toluene (2.6 ml) was added 2-(methoxymethyl)glycidol (0.959 g, 10.89 mmol) followed by a solution of aluminium triflate (0.0181 g, $3.817\times10^{-5}$ mol) in dioxane (0.31 mL) and the solution was warmed on a heating block at 75° C. After 18 hours the reaction mixture was allowed to cool to room temperature to give a light brown oil (1.011 g) and columned on neutral alumina (12 g) and eluted with THF. Fractions 1-3 were combined and evaporated to dryness to give a pale-yellow oil (0.198 g). NMR (400 MHz, $CDCl_3$ containing 0.04% TMS as internal standard, Δ (ppm) 5.107 (0.39H, m, Nopol=C—H, minor isomer), 5.022 (0.61H, m, Nopol=C—H, major isomer), 4.35-4.22 (m, 1H), 4.12 (m, 1H), 3.956-3.71 (m, 5H), 3.67-3.40 (m, 8H), 3.395-3.383 (m, OMe, 14.6H, n=4.86), 2.10-1.80 (m, 3.0H), 1.776 (1H, s, OH), 1.73-1.51 (m, 3H), 1.292-1.09 (m, 4H), 1.07-0.95 (m, 4H), 0.85-0.80 (m, 2H).

Synthesis of Krytox-FSL-PEG4-11-azido-1-amide

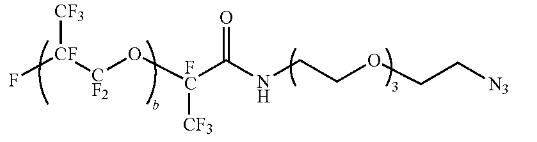

To a stirred solution of Krytox FSL 2,2,2-trifluoroethyl ester (57.26 g, 23.97 mmol) in Novec 7100 (58.0 mL), under nitrogen at 38° C., was added a solution of 11-azido-3,6,9-trioxaundecan-1-amine (5.393 g, 24.71 mmol) in anhydrous THF (25.5 mL) via syringe, including a 1.5 mL wash. Then stirred overnight at 40° C., where TLC indicated that some of the unreacted amine was still present. Triethylamine (3.512 mL, 25.2 mmol) was added via syringe and the block temperature raised to 60° C. After 48 hours the reaction was cooled to RT and evaporated to dryness in vacuuo. The resulting oil was dissolved in Novec 7500 (200 mL) and was extracted in a separating funnel with methanol (4×50 mL). The fluorous layer was then evaporated in vacuuo to give a thick yellow oil (69.0 g). IR ($cm^{-1}$) 2115.0 ($N_3$), 1790.5 (C═O, TFE-ester), 1730.62 (C═O, product). The two carbonyl stretches were roughly equal in intensity. A portion of the crude material (20.95 g) was dissolved in Novec 7100 (15.0 mL) and loaded on to an 80 g Interchim 50 μm HC cartridge, pre-washed with Novec 7100. The column was then washed as follows: a. Novec 7100 (250 mL), b. 0.5% MeOH/Novec 7100 (250 mL), c. 1.0% MeOH/Novec 7100 (250 mL), d. 1.5% MeOH/Novec 7100 (250 mL), e. 2.0% MeOH/Novec 7100 (250 mL), f. 3.0% MeOH/Novec 7100 (250 mL), g. 5.0% MeOH/Novec 7100 (250 mL), h. 10.0% MeOH/Novec 7100 (500 mL). The starting material eluted in Novec 7100 and was evaporated in vacuuo to give a colourless oil (12.224 g). The late running product band fractions were combined and evaporated in vacuuo to give the product as a clear oil (7.317 g, 12.15%). IR ($cm^{-1}$): 2112.3 ($N_3$, mBr), (C═O, 1717.15). NMR (400 MHz, 5% $C_6D_{12}$ in FC-72 (weight:weight) containing 0.04% TMS as internal standard, Δ (ppm) 7.80 (1H, s, NH), 3.72 (14H, s), 3.60 (2H, s), 3.35 (2H, s).

Alternative Procedure

To a stirred solution of Krytox FSL acid chloride (24.46 g, 12.25 mmol, IR 1806.7 $cm^{-1}$) in Novec 7500 (50.0 mL), under nitrogen at room temperature, was added a solution of 11-azido-3,6,9-trioxaundecan-1-amine (2.674 g, 12.25 mmol) in anhydrous 1,4-dioxane (20.0 mL, plus 5.0 mL wash) via syringe. Then stirred overnight at 40° C., where TLC indicated that some of the unreacted amine was still present. To the resulting solution was added PS-piperdine (3.0-4.0 mmol/g, 5.249 g) and the reaction temperature raised to 75° C. and stirred for 72 hours. The reaction was cooled to RT and the polystyrene beads removed by filtration, the reaction flask and beads were washed with Novec 7500 (2×40 mL). The filtrate was shaken with methanol (30 mL) and bottom fluorous layer separated and evaporated in vacuo to mixture of Krytox methyl ester (30.5%) and the desired Krytox-FSL-PEG4-11-azido-1-amide (26.36 g) as judged by proton NMR. %). IR ($cm^{-1}$): 2109.9 ($N_3$), 1785.7 ($CO_2Me$), 1723.0 (CONH).

Synthesis of Surfactant 39

Click Reaction Between Krytox-FSL-PEG4-11-azido-1-amide and 1-(2-(6,6-dimethylbicyclo[3.1.1]hept-2-en-2-yl)ethoxy)-poly(2-methoxymethylethylene oxide)

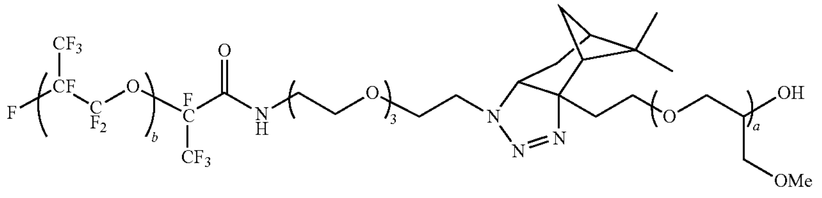

To a solution of the crude nopol polymer (0.93 g) in Novec 7500 (5.4 mL) was added a solution of Krytox-FSL-$PEG_4$-11-azido-1-amide (1.303 g, 5.18 mmol) in anhydrous DMF (2.0 mL), via syringe and under a nitrogen atmosphere. The heating block was set to 105° C. After 3 hours TLC (4% MeOH in Novec 7100 indicated that all the azide had reacted, but heating was continued at 105° C. overnight. On cooling to RT, Novec 7500 (20 mL) was added and the solution extracted in a separating flask with methanol (3×50 mL). The fluorous phase was evaporated to dryness in vacuuo to give the product (1.156 g). A portion of the crude material (1.00 g) was dissolved in Novec 7100 (3.0 mL) and loaded on to a 25 g Interchim 50 μm HC cartridge, pre-washed with Novec 7100. The column was then washed as follows: a. Novec 7100 (100 mL), b. 1.0% MeOH/Novec 7100 (100 mL), c. 2.0% MeOH/Novec 7100 (100 mL), d. 3.0% MeOH/Novec 7100 (100 mL), e. 4.0% MeOH/Novec 7100 (100 mL), f. 5.0% MeOH/Novec 7100 (100 mL), g. 6.0% MeOH/Novec 7100 (100 mL), h. 7.0% MeOH/Novec 7100 (100 mL) and i. 8.0% MeOH/Novec 7100 (100 mL). The polar fractions were combined and evaporated in vacuuo to give the product as a pale-yellow oil (365 mg). A 5.0% stock solution was made up by dissolving the oil in Novec 7500 (6.935 g) and used for microdroplet generation.

Example 18: Synthesis of Surfactant 40 Wherein R is Me

2,2-Bis(azidomethyl)-1,3-propane-diol

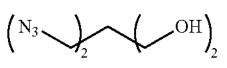

To solid 2,2-Bis(azidomethyl)-1,3-propanediol (24.06 g, 91.86 mmol) was added a solution of sodium azide (18.19 g, 275.6 mmol) in water (50 mL), at RT under nitrogen, the remaining azide beaker was washed out with water (40.0 mL) and added to the reaction. The stirred solution was then heated to a block temperature of 100° C., under nitrogen, as the solution was slightly hazy, extra water (30.0 mL) was added and the block temperature increased to 105° C. After 46 hours the reaction was cooled to RT and extracted with DCM (3×100 mL). The combined organic extracts were dried over sodium sulphate, filtered and evaporated to give the product as a pale-yellow oil (16.24 g, 95.0%). NMR (400 MHz, $CDCl_3$ containing 0.04% TMS as internal standard, Δ (ppm) 3.65 (4H, s, $CH_2$—O), 3.43 (4H, s, $CH_2$—$N_3$), 2.60 (2H, bs, OH).

2,2-Bis(azidomethyl)-1,3-propane-di-O-poly(2-methoxymethylethylene oxide)

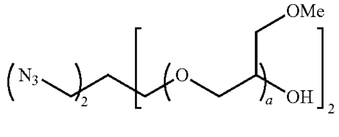

To a stirred solution of 2,2-Bis(azidomethyl)-1,3-propane-diol (200 mg, 1.075 mmol) in anhydrous toluene (10 mL), under nitrogen at RT, was added a solution $P_4$-t-Bu in hexane (0.8 M, 2.68 mL, 2.15 mmol, phosphazene base) via syringe. Then neat 2-(methoxymethyl)oxirane (2.215 mL, 36.49 mmol, 34.0 mol equivalents) was added to the stirring solution via syringe at RT. After 48 hours the reaction was quenched by the addition of solid benzoic acid (0.934 g, 7.65 mmol), following dissolution the reaction was evaporated in vacuo. The crude product was dissolved in DCM (50 mL) and washed with water (50 mL), the aqueous phase was back extracted with DCM (2×15 mL). The combined organic phase was washed with saturated sodium bicarbonate. The organic fraction was then stirred with aminopropyl silica (1.64 g, 1.78 mmol) for ten minutes, then filtered and evaporated in vacuuo to give a pale-yellow oil (2.985 g). The oil was dissolved in THF (3.0 mL) and loaded on to a gravity column of alumina (34 g), pre-washed with THF. The column was washed with first THF (300 mL), which was evaporated in vacuuo to give a yellow oil (0.722 g, IR (cm-1) 2101.0 (weak, s, $N_3$). Washing the column with 10% methanol in THF (250 mL) gave the crude product (1.876 g, IR (cm-1) 2101.0 (medium, s, $N_3$).

2,2-Bis(aminomethyl)-1,3-propane-di-O-poly(2-methoxymethylethylene oxide)

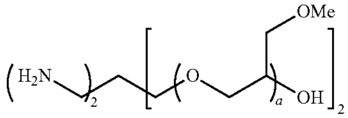

To a solution of the crude 2,2-bis(azidoomethyl)-1,3-propan-di-O-poly(2-methoxymethylethylene oxide) (2.564 g, ca. 1.74 mmol) in methanol (35.0 mL) was added triphenylphosphine (0.913 g, 3.48 mmol). Then water (0.626 mL) was added and the heating block was warmed to 77° C. and left to stir for 19 hours. The solution was evaporated to dryness to give an oily solid (3.325 g) that was dissolved in DCM and washed with 2.0 M HCl (1×10 mL) and (1×20 mL). The combined acid layer was neutralised with sodium hydroxide (10 M, 10.62 mL) and was extracted with DCM (3×20 mL). The combined organic fractions were dried over sodium sulphate filtered and evaporated to give a pale-yellow oil (1.132 g). NMR (400 MHz, $CDCl_3$ containing 0.04% TMS as internal standard, Δ (ppm) 3.95 (broad singlet), 3.8-3.40 (broad multiplet), 3.378 (—OMe, broad singlet).

Alternative Method

To a stirred solution of the 2,2-bis(azidoomethyl)-1,3-propan-di-O-poly(2-methoxymethylethylene oxide) (0.86 g, ca. 0.27 mmol)(columned on neutral alumina) in methanol (3.0 mL), under nitrogen at room temperature, was added first ammonium formate (solid, 85.2 mg, 1.35 mmol) and then zinc dust (<10 μm, 110 mg, 1.68 mmol). The crude reaction mixture was filtered over celite and washed with methanol and the filtrate evaporated in vacuo to give a pale-yellow oil (0.731 g). The crude oil was purified on a 1 g SCX cartridge, eluting first with methanol and then ammonia in methanol (7 M, 15 mL), which was concentrated in vacuo to give a green oil (90 mg).

Surfactant 40—2,2-Bis(krytox carboxamido-methyl)-1,3-propan-di-O-poly(2-methoxymethylethylene oxide)

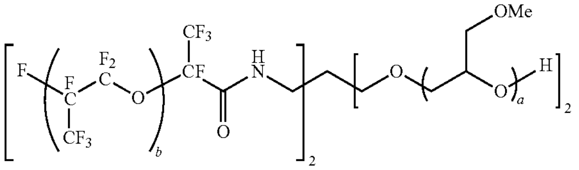

To a stirred solution of the crude 2,2-bis(aminomethyl)-1,3-propane-di-O-poly(2-methoxymethylethylene oxide) (0.705 g) in dioxane (anhydrous, 17.5 mL), under nitrogen, was added PS-piperidine (0.652 g, ca. 3.5 mmol/g). A solution of Krytox acid chloride (3.416 g) in Novec7500 (15.0 mL, plus 2.5 mL wash) was then added via syringe. The aluminium block temperature was raised to 80° C. and allowed to stir for approximately 60 hours. The reaction mixture was then allowed to cool to RT, filtered and the filtrate transferred to a separating funnel. The lower fluorous layer was separated from the dioxane layer and extracted once with methanol (25 mL). The fluorous layer was separated and evaporated to dryness to give a pale yellow oil (3.456 g). IR (cm-1) 1790.7 (weak, s, CO, ester) and 1738.9 (weak, sharp, CO, amide). The crude material was columned on a silica cartridge (25 g) and eluted with 1% methanol in Novec7100 to 15% methanol in Novec7100 stepwise. The late running fractions were evaporated to give a brown oil (0.54 g), IR (cm-1) 3369.8 (weak, b, —OH), 2891.3 (strong, br, CH), 1699.6 (strong, s, CO, amide). NMR (400 MHz, $CDCl_3$ containing 0.04% TMS as internal standard, Δ (ppm) 5.35 (broad multiplet, NH), 3.82 (s, $CH_2O$), 3.77 (s, $CH_2O$), 3.72 (s, $CH_2O$), 3.72 (s, $CH_2O$), 3.7-3.5 (broad multiplet, CHO), 3.46 (s, OMe), 3.45-3.10 (broad multiplet, CHO). Sample contains $P_4$-t-Bu impurity.

Example 19 Alternative Synthesis of Surfactant 22 Wherein R is Me

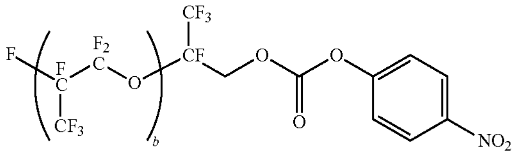

To a stirred solution of 4-nitrophenyl chloroformate (25.24 g, 125.22 mmol) in THF (54.5 mL), at room temperature under nitrogen, was added Novec7100 (32.0 mL) via syringe. A solution of Krytox alcohol (52.63 g, 31.3 mmol) was then added via syringe in a mixture of Novec7100 (15.0 mL) and THF (24.5 mL). Finally a solution of pyridine (5.1 mL, 62.6 mmol) in a mixture of Novec7100 (4.0 mL) and THF (6.5 mL) was added via syringe, where upon a white solid immediately started to precipitate out of solution. The reaction was then warmed to 40° C. and allowed to stir for 48 hours. The reaction was cooled to room temperature and filtered over celite and the bed washed with Novec7100 (50 mL). The filtrate was evaporated in vacuo and dissolved in Novec7100:FC72 (1:1, vol:vol, 200 mL), where upon a precipitate started to form. After 1 hour the solution was filtered over celite and the bed washed with a little FC72 (30 mL). The filtrate was concentrated in vacuo and redissolved in FC72 (180 mL) and allowed to stand overnight. Finally the solution was filtered over celite and evaporated to dryness to give a colourless oil (54.88 g, 95.0%). NMR (400 MHz, 5% $C_6D_{12}$ in FC-72 (weight:weight) containing 0.04% TMS as internal standard, Δ (ppm) 8.21 (2H, d, aromatic), 7.30 (2H, d, aromatic), 4.80 (2H, m, $CH_2$).

22

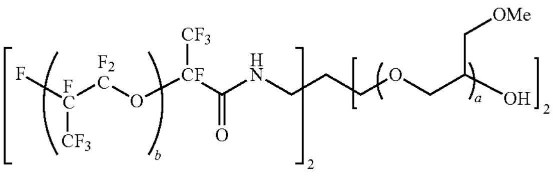

Figure 6A:
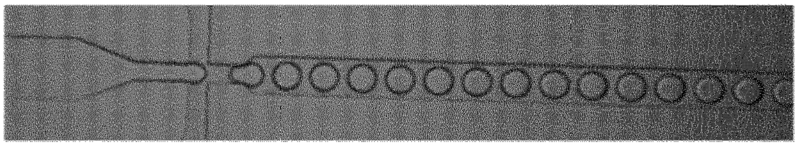
FIG. 6 shows images of surfactant 22 (a) in a flow focus device; (b) at the generation chip exit; and (c) the droplets shown in images (a) and (b) stored in a 100 μm high measurement chip.
Figure 6B:
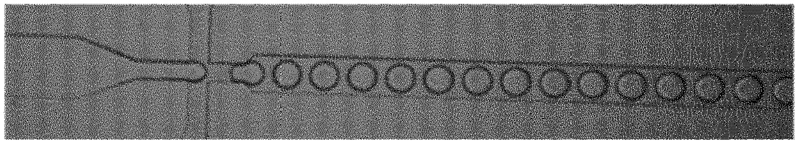
Figure 6C:
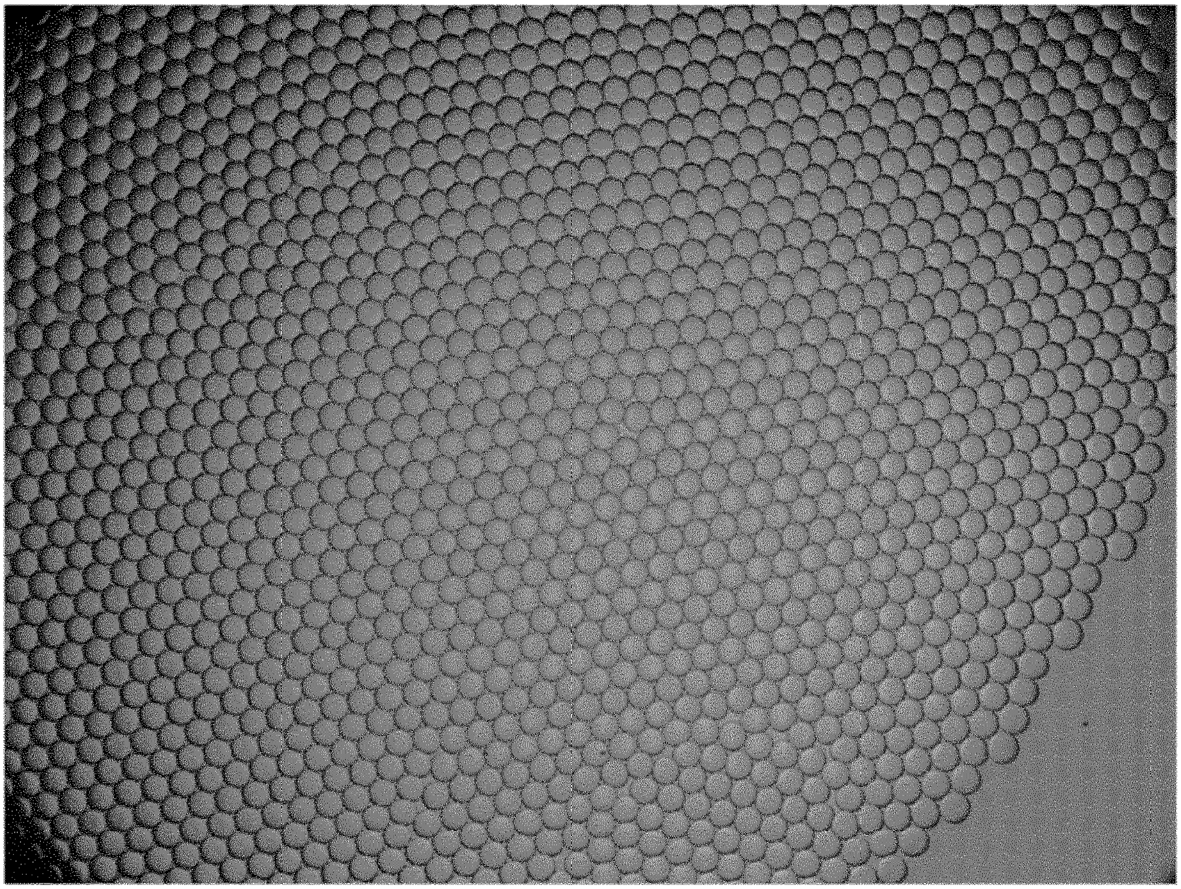

To a stirred solution of the crude 2,2-bis(aminomethyl)-1,3-propane-di-O-polymer (1.072 g, ca. 0.87 mmol) in THF (anhydrous, 12.5 mL), under nitrogen at room temperature, was added N-methylmorpholine (0.48 mL, 4.35 mmol) via syringe. Then a solution of Krytox 4-nitrophenyl carbonate (3.53 g, 19.15 mmol) was added in Novec 7100 (14.0 mL, plus 1.0 ml wash) was added via syringe and the heating block set to 42° C. and allowed to stir for 48 hours. The reaction was cooled to room temperature and was evaporated to dryness in vacuo to give an oil, which was washed with THF (2x20 mL) and decanted off the residue. The residue was dissolved in Novec7500 (50 mL) and extracted with methanol (1x50 mL and 2x30 mL). The fluorous phase was concentrated in vacuo to give a dark oil (4.54 g). The oil was dissolved in Novec7100 (50 mL), with stirring and aminopropyl silica (2.52 g, 1.78 mml/g) was added and allowed to stir for 30 minutes. The mixture was filtered and the silica washed with a little Novec7100 (10 mL). The filtrate was treated with aminopropyl silica (2.52 g, 1.78 mml/g) two more times and after 30 minutes the solution was filtered and the silica washed with a little Novec7100 (10 mL). After the third filtration the filtrate was concentrated under low vacuum. The resulting oil was dissolved in Novec7100 (4.0 mL) and loaded on to a silica cartridge (25 g, SIHC, Interchim) packed in Novec7100. A gradient from Novec7100 to 15% methanol in 7100 was run collecting 50 mL fractions. Fractions 12 and 13 were combined and concentrated in vacuo to yield a light-brown oil, fraction A (0.84 g). IR ($cm^{-1}$) 1737.9 (Krytox-$CH_2C$═O, carbamate). NMR (400 MHz, 5% $C_6D_{12}$ in FC-72 (weight:weight) containing 0.04% TMS as internal standard, Δ (ppm) 5.47 (4H, s, Krytox-$CH_2$), 5.05 (6H, s), 4.78 (12H, m), 4.00-3.48 (68H, m), 3.47-3.25 (47.5H, bs, OMe). Fractions 14-18 were concentrated in vacuo to give a light brown oil, fraction B (0.685 g). IR ($cm^{-1}$) 1768.3 (Krytox-$CH_2O$, carbonate). NMR 400 MHz, 5% $C_6D_{12}$ in FC-72 (weight:weight) containing 0.04% TMS as internal standard, Δ (ppm) 5.45 (4H, s, Krytox-$CH_2O$), 5.05 (10H, s) 4.75 (25H, s), 4.00-3.48 (96H), 3.47-3.28 (100H, bs, OMe). FIGS. 6*a* and 6*b* show microdroplets made from a 5% wt:wt solution of fraction B in Novec7500. Image 6*a*: Droplet generation using a 60 μm×60 μm flow focus device with 5% surfactant 22 in Novec 7500, flow rate 700 μL/h and CHO media 500 μL/h, to produce 308 pL microdroplets. Image 6*b* was generated in the same conditions as for image A, but at the generation chip exit. Image 6*c* shows the 308 pL stored picodroplets generated in images A and B above stored in a 100 μm high measurement chip.

FIGS. 7*a* and 7*b* show microdroplets made from a 5% wt:wt solution of fraction B in Novec7500. Image 7*a*: Droplet generation using a 60 μm×60 μm flow focus device with 5% surfactant 22 in Novec 7500, flow rate 700 μL/h and hydridoma media 500 μL/h, to produce 294 pL microdroplets. Image 7*b* was generated in the same conditions as for image a, but at the generation chip exit. Image 7*c* shows the 294 pL stored picodroplets generated in images a and b above stored in a 100 μm high measurement chip.

Example 20

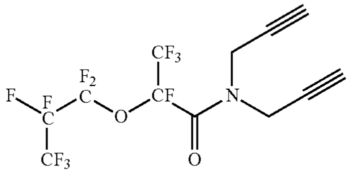

To a stirred solution of Krytox acid chloride (12.893 g, 5.54 mmol) in Novec7100 was added a solution of dipropargylamide (0.60 mL, 5.81 mmol) in anhydrous THF (4.0 mL, plus 1.00 mL wash), under nitrogen at room temperature, where a fine white precipitate started to form. Finally, a solution of triethylamine (1.16 mL, 8.30 mmol) in anhydrous THF (4.0 mL) was added and the solution warmed to 55° C. After 20 hours the reaction was cooled to RT and filtered over celite and washed with Novec7100 (20 mL) and the filtrate evaporated to dryness in vacuo to yield a light brown oil (13.009 g, 98.5%). IR (cm-1) 3320.2 (weak, CH), 1697.3 (medium, s, CO). NMR (400 MHz, $CDCl_3$ containing 0.04% TMS as internal standard, Δ (ppm) (4H, dt, N(CH2)2), 2.08 (2H, d, CH).

1-Azido-3-methoxy-propan-2-ol & 2-azido-3-methoxy-propan-1-ol

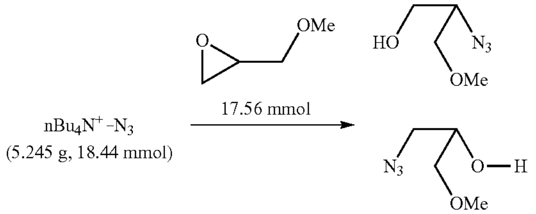

To a stirred solution of tetra-n-butylammonium azide (5.245 g, 18.44 mmol) in 1,2-DME (74.0 mL), at room temperature under nitrogen, was added a solution of 2-(methoxymethyl)oxirane (1.547 g, 17.56 mmol) in 1,2-DME (anhydrous, 9.0 mL plus 1.0 mL wash) via syringe. Finally, a solution of aluminium triflate (10 mM, 1.756 mmol) in 1,2-DME was added and the heating block temperature was raised to 65° C. The reaction was stirred for 48H and then allowed to cool to RT. The crude reaction mixture was cooled to room temperature and concentrated in vacuo to give a yellow oil (7.60 g). Multiple chromatography using ethyl acetate in hexane gradients finally gave the desired mixture of diastereomers free of tetra-n-butylammonium salts as a pale-yellow oil (0.798 g, 34.9%). IR ($cm^{-1}$) 3421.3 (OH, bm), 2927.7 (CH, bm), 2094.0 ($N_3$, ss). NMR (400 MHz, $CDCl_3$ containing 0.04% TMS as internal standard, Δ (ppm) 3.94 (1H, m, CH—OH), 3.55-3.42 (2H, m, $CH_2OMe$), 3.40 (3H, s, OMe), 3.38-3.32 (2H, m, $CH_2$—N3), 2.46 (1H, s, OH).

1-Azido-3-methoxy-propan-2-O-poly(2-methoxymethylethylene oxide)

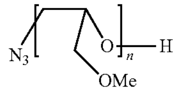

To a stirred solution of tetra-n-butylammonium azide (1.493 mmol, 0.25 M) in 1,2-DME (5.97 mL), at room temperature under nitrogen, was added a solution of 2-(methoxymethyl)oxirane (1.973 g, 22.40 mmol) in 1,2-DME (anhydrous, 4.0 mL plus 1.0 mL wash) via syringe. Finally, a solution of aluminium triflate (10 mM, 44.8 μmol, 4.48 mL) in 1,2-DME was added and the heating block temperature was raised to 75° C. The reaction was stirred for 48H and then allowed to cool to RT. The crude reaction mixture was cooled to room temperature and concentrated in vacuo to give a yellow oil (2.1 g). Purification on a 40 g silica cartridge (SIHC, Interchim) using ethyl acetate in hexane gave the desired azido-polymer (0.473 g, 33.7%, n=10.2, mw 941, using internal standard) as a pale-yellow oil. IR ($cm^{-1}$) 3460.0 (OH, bm), 2877.7 (CH, bm), 2097.2 ($N_3$, ss). NMR (400 MHz, $CDCl_3$ containing 0.04% TMS as internal standard, Δ (ppm) 4.03-3.93 (1H, m, CH—OH), 3.77-3.54 (6H, m, $CH_2OMe$), 3.53-3.42 (12.5H, s, OMe), 3.38-3.32 (2H, m, $CH_2$—N3), 1.96 (1H, s, OH).

Krytox-bis-Click Surfactant 41

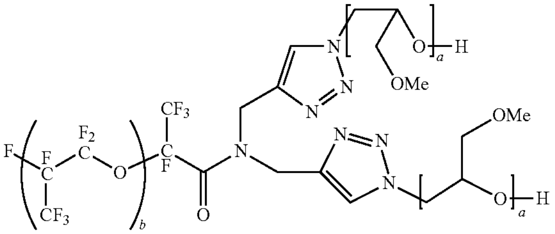

To a stirred solution of 1-Azido-3-methoxy-propan-2-O-poly(2-methoxymethylethylene oxide)(0.257 g, Mn 836, 0.307 mmol) in t-butanol (2.70 mL), under nitrogen at 36° C., was added a solution of Krytox dipropargylamide (1.10 g, 0.4611 mmol) in Novec7100 (5.0 mL). Then a solution of copper (II) acetate:THPTA (1:1, 9.357 μmol each) in t-butanol:water (5:1, vol:vol, 0.783 mL) was added via pipette. Next morning the reaction was cooled to room temperature and evaporated to dryness in vacuo to a blue/green oil (1.294 g), which was dissolved in Novec7100 and purified on a 25 g silica cartridge (SiHC, Interchim) and eluted with a gradient of 100% Novec7100 To 12% MeOH in Novec7100. The later running fractions were combined to give the bis-1,4-triazole surfactant (0.884 g). NMR 400 MHz, 5% $C_6D_{12}$ in FC-72 (weight:weight) containing 0.04% TMS as internal standard, Δ (ppm) 8.08 (2H, broad m, (triazole-$H5)_2$), 5.40-4.26 (5H, broad m), 4.25-3.90 (3H, broad m), 3.90-3.15 (25H, broad m, OMe), 1.37 (1H, broad m, OH), 0.85 (1H, broad m, OH).

Figure 8A:
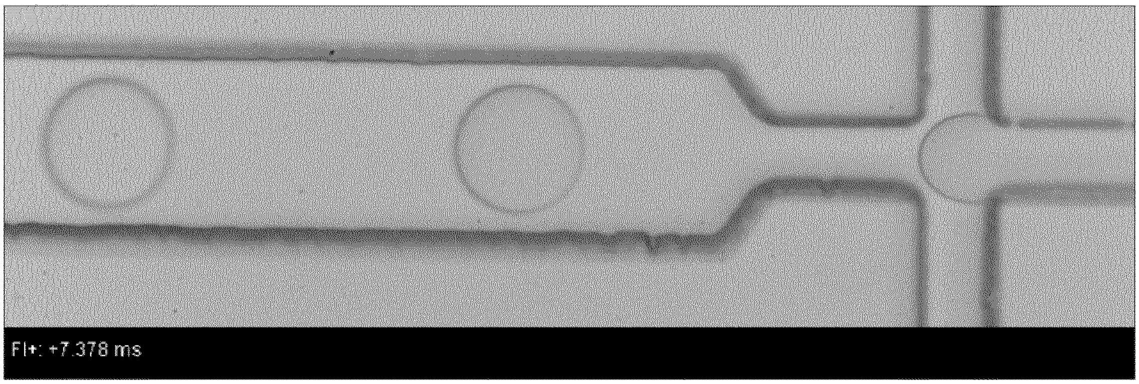
Figure 8B:
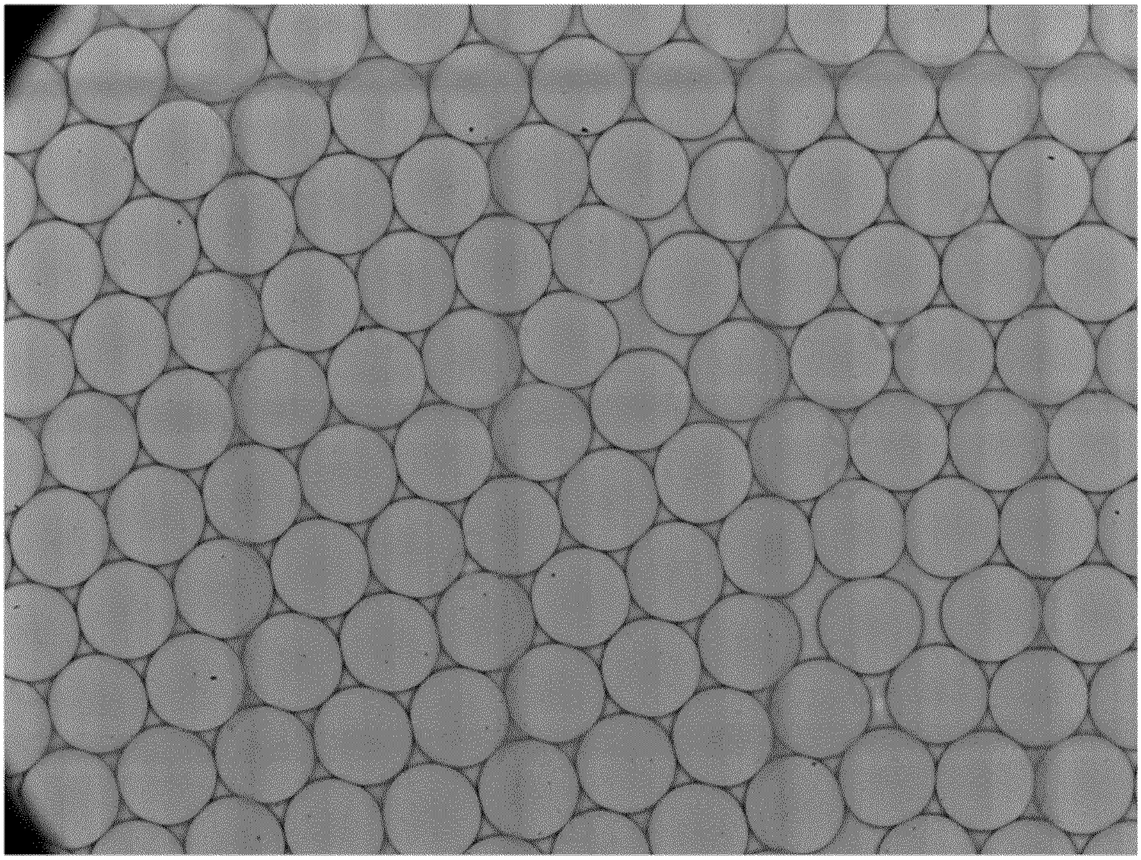
Figure 8C:
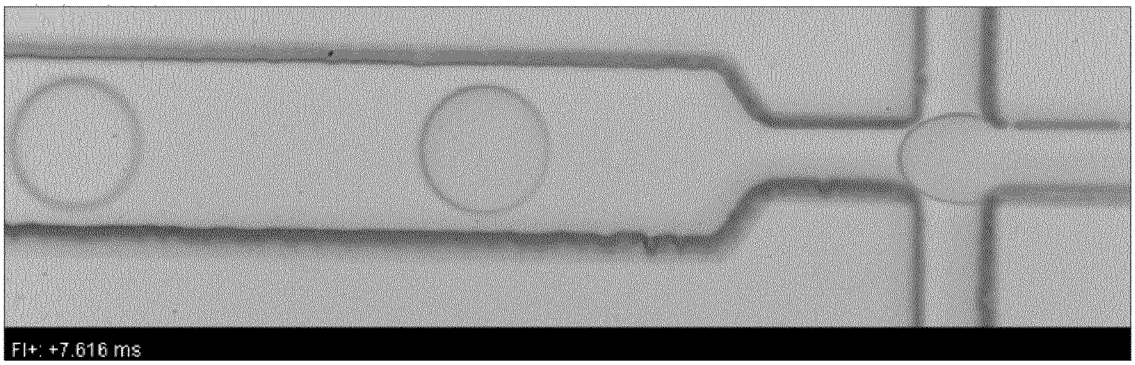
Figure 8D:
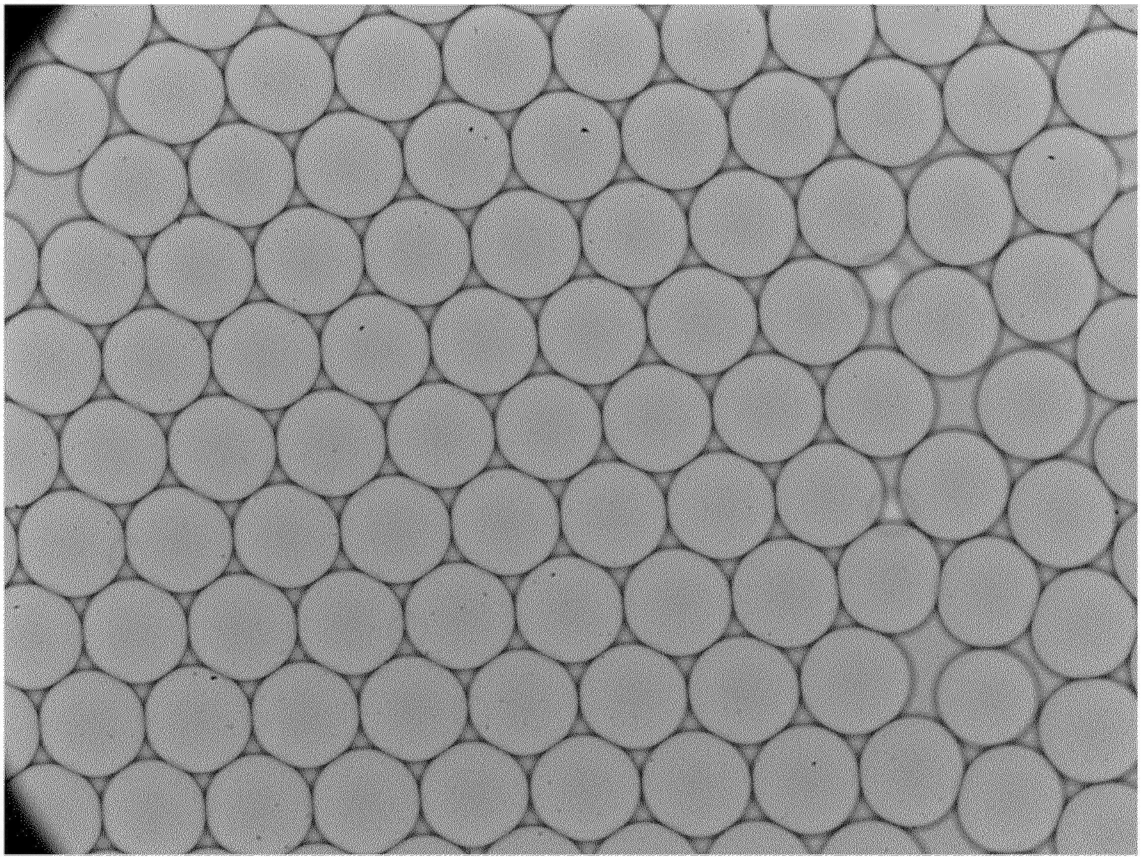

FIG. 8*a* shows microdroplet generation of the Krytox-bis-Click surfactant (1% surfactant in Novec7500 (w:w), oil flow rate 2600 μL/h, DPBS 333 μL/h, volume 243.3 pL (n=4), φ 77.4 μm. FIG. 8*b* shows microdroplets stored in a 100 μm high reservoir made from Krytox-bis-Click surfactant (1% surfactant in Novec7500 (w:w), oil flow rate 2600 μL/h, DPBS 333 μL/h, volume 243.3 pL (n=4), φ 77.4 μm. FIG. 8*c* shows microdroplet generation of the Krytox-bis-Click surfactant (1% surfactant in Novec7500 (w:w), oil flow rate 2000 μL/h, DPBS 333 μL/h, volume 293.5 pL (n=4), φ 82.4 μm. FIG. 8*d* shows microdroplets stored in a 100 μm high reservoir made from Krytox-bis-Click surfactant (1% surfactant in Novec7500 (w:w), oil flow rate 2000 μL/h, DPBS 333 μL/h, volume 293.5 pL (n=4), φ 82.4 μm.

The invention claimed is:

1. A surfactant of formula (I):

$$(A)_m\text{-}X—(B)_n \quad (I)$$

wherein

X is a linking group;

each A is independently a fluorocarbon or a perfluoropolyether;

each B is independently

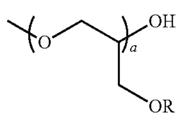

wherein a is an integer between 3 and 50 and each R is independently $C_{1-6}$ alkyl, $CH_2CH_2OC_{1-6}$ alkyl or $CH_2CH(CH_3)OC_{1-6}$ alkyl;

m is an integer between 1 and 10; and n is an integer between 1 and 10.

2. A surfactant as claimed in claim 1, which is a star surfactant.

3. A surfactant as claimed in claim 1, wherein the sum of n and m is an integer between 3 and 10.

4. A surfactant as claimed in claim 1, wherein the sum of n and m is 3, 4, 5, 6 or 7.

5. A surfactant as claimed in claim 1, wherein a is an integer between 3 and 24.

6. A surfactant as claimed in claim 1, wherein each R is $C_{1-6}$ alkyl.

7. A surfactant as claimed in claim 1, wherein n is an integer between 1 and 6.

8. A surfactant as claimed in claim 1, wherein m is 1, 2 or 3.

9. A surfactant as claimed in claim 1, wherein at least one A is a perfluoropolyether.

10. A surfactant as claimed in claim 1, wherein said perfluoropolyether comprises a repeat unit of the formula:

$$-[CF(CF_3)CF_2O]_b—,$$

wherein b is a positive integer.

11. A surfactant as claimed in claim 1, wherein said linking group comprises a group selected from —C(O)NH—, —C(O)NMe-, —NHC(O)—, —NMeC(O)—, —C(O)S—, —SC(O)—, —C(O)O—, —OC(O)—, —OC(O)O—, —OC(O)NH—, —OC(O)NMe-, —O—, —S—, —NHC(O)NH—, —NMeC(O)NH—, —NHC(O)NMe-, —NHC(O)O—, —NMeC(O)O—, $—SO_2NH—$, $—NHSO_2—$, $—NHSO_2—C_6H_4—O—$ and $—O—C_6H_4—SO_2NH$.

12. A surfactant as claimed in claim 1, wherein said linking group comprises a charged group.

13. A surfactant as claimed in claim 1, wherein said linking group comprises a group selected from:

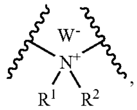
,
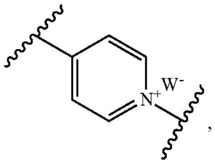
,
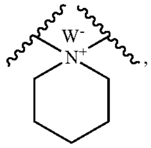
, and
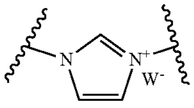

wherein $R^1$ and $R^2$ are independently selected from H and $C_{1-6}$ alkyl; and $W^-$ is a counter ion.

14. A surfactant as claimed in claim 1, wherein said linking group comprises a heterocycle and/or a $C_{1-6}$ alkylene group, or consists of a $C_{1-6}$ alkylene group.

15. A surfactant as claimed in claim 1, wherein said linking group comprises a group selected from:

IIIa

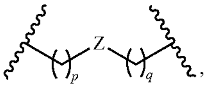
,

IIIb

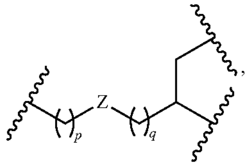
,

IIIc

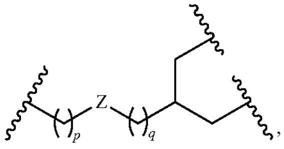
,

IIId

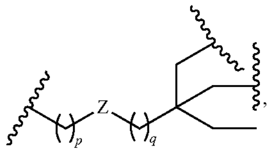
,

IIIe

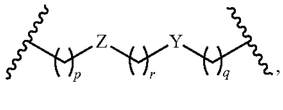
,

-continued

IIIf

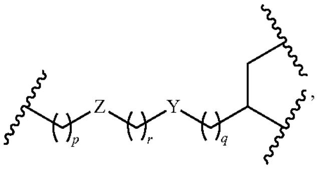

IIIg

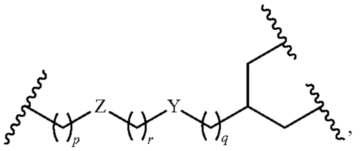

IIIh

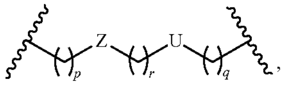

IIIi

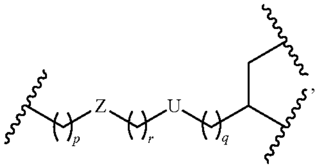

IIIj

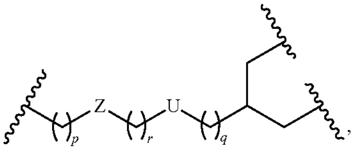

IIIk

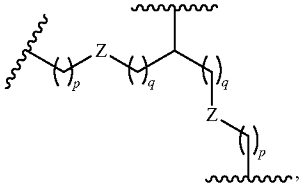

IIIl

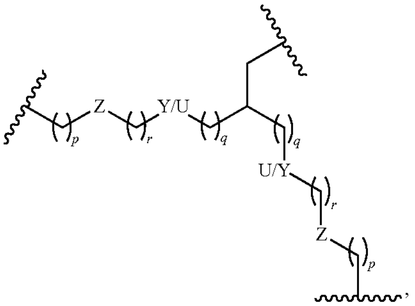

IIIm

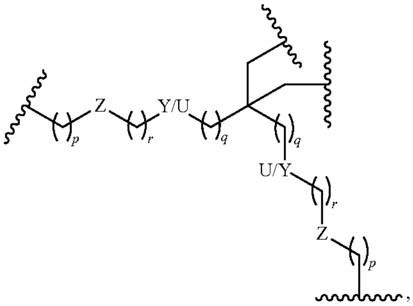

and

-continued

IIIn

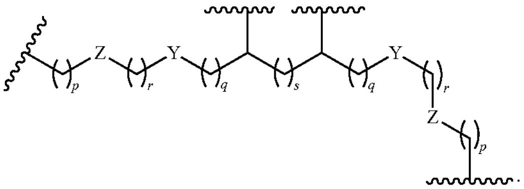

wherein each p is independently 0 or an integer between 1 and 6;

each q is independently 0 or an integer between 1 and 6;

each r is independently an integer between 1 and 6;

s is an integer between 1 and 6;

each Z is independently selected from C(O)NH, C(O)NMe, NHC(O), NMeC(O), OC(O)NH, C(O)O, —NHC(O)O—, —NMeC(O)O— or O;

each U is independently a heterocycle; and each Y is independently selected from

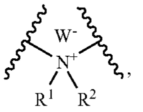

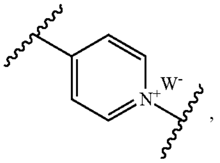

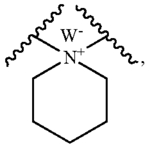

or

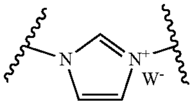

wherein W, $R^1$ and $R^2$ are as defined in claim 13.

16. A surfactant as claimed in claim 1, wherein said linking group is of formula (IIa), (IIb), (IIc) or (IId):

IIIa

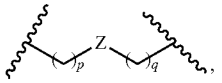

IIIb

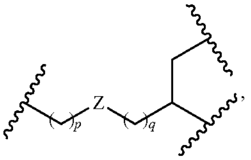

IIIc

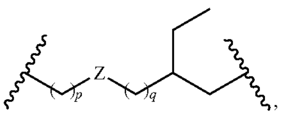

or

IIId

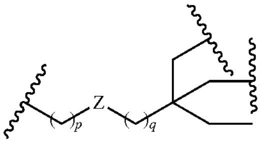

wherein p is 0 or 1;

q is 0, 1 or 2; and

Z is selected from C(O)NH, C(O)NMe, NHC(O), NMeC(O), OC(O)NH, C(O)O, —NHC(O)O—, —NMeC(O)O— or O;

or said linking group is of formula (IIIe), (IIIf) or (IIIg):

(IIIe)

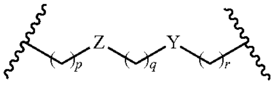

, (IIIf)

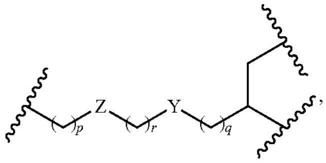

, or (IIIg)

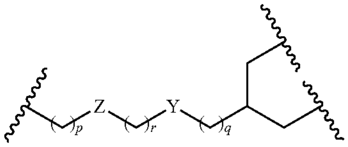

wherein p is 0 or 1;

q is 0, 1 or 2;

r is an integer between 1 and 6;

Z is selected from C(O)NH, C(O)NMe, NHC(O), NMeC(O), OC(O)NH, C(O)O, —NHC(O)O—, —NMeC(O)O— or O;

Y is selected from

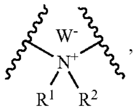

,

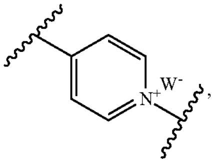

,

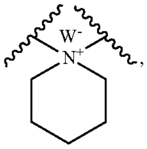

, or

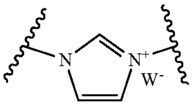

wherein W, $R^1$ and $R^2$ are as defined in claim 13;

or said linking group is of formula (IIIh), (IIIi) or (IIIj)

(IIIh)

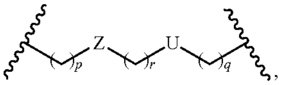

, (IIIi)

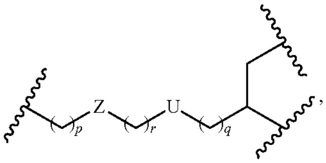

, or

-continued (IIIj)

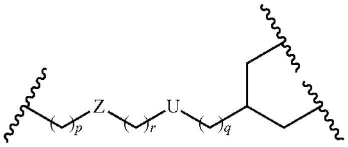

wherein p is 0 or 1;

q is 0, 1 or 2;

r is an integer between 1 and 6;

Z is selected from C(O)NH, C(O)NMe, NHC(O), NMeC(O), OC(O)NH, C(O)O, —NHC(O)O—, —NMeC(O)O— or O; and U is a heterocycle;

or said linking group is of formula (IIIk):

(IIIk)

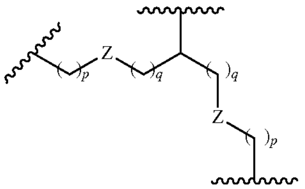

wherein each p is 0 or 1;

each q is 0, 1 or 2; and each Z is independently selected from C(O)NH, C(O)NMe, NHC(O), NMeC(O), OC(O)NH, C(O)O, —NHC(O)O—, —NMeC(O)O— or O;

or said linking group is of formula (IIIl) or (IIIm):

IIIl

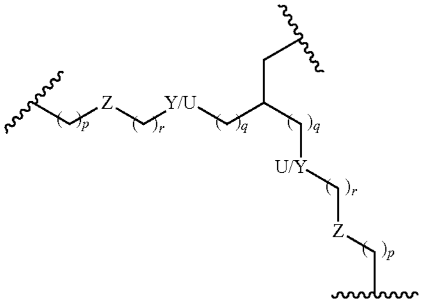

IIIm

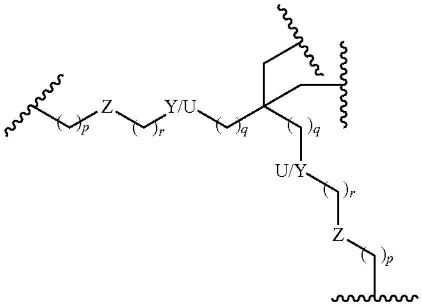

wherein each p is 0 or 1;

each q is 0, 1 or 2;

® each r is an integer between 1 and 6;

each Z is independently selected from C(O)NH, C(O)NMe, NHC(O), NMeC(O), OC(O)NH, C(O)O, —NHC(O)O—, —NMeC(O)O— or O;

each U is a heterocycle; and each Y is independently selected from:

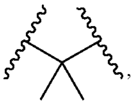,
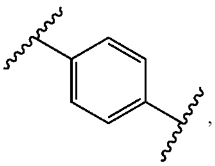,

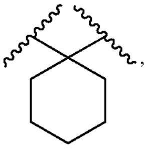, or 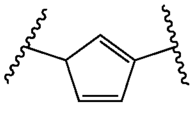

wherein W, $R^1$ and $R^2$ are as defined in claim 13;

or said linking group is of formula (IIIn):

(IIIn)

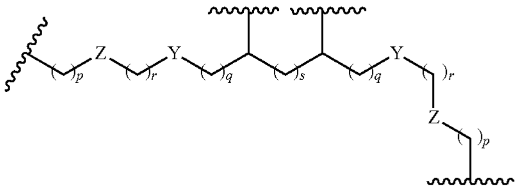

wherein each p is 0 or 1;

each q is 0, 1 or 2;

each r is an integer between 1 and 6;

s is an integer between 1 and 6;

each Z is independently selected from C(O)NH, C(O)NMe, NHC(O), NMeC(O), OC(O)NH, C(O)O, —NHC(O)O—, —NMeC(O)O— or O; and each Y is independently selected from:

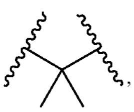,
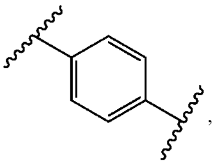,

-continued

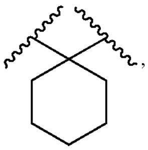, or 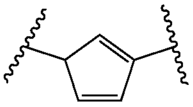

wherein W, $R^1$ and $R^2$ are as defined in claim 13;

or said linking group is of formula IIIo, IIIp, or IIIq

IIIo

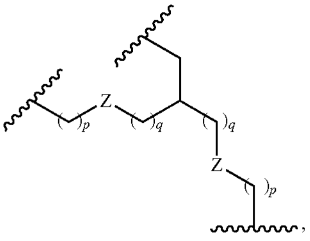,

IIIp

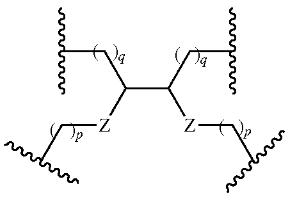 or

IIIq

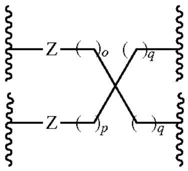

wherein each p is independently 0 or an integer between 1 and 6;

each q is independently 0 or an integer between 1 and 6; and each Z is independently selected from C(O)NH, C(O)NMe, NHC(O), NMeC(O), OC(O)NHI, C(O)O, —NHC(O)O—, —NMeC(O)O— or O.

17. A surfactant as claimed in claim 1, wherein the ratio of the number of atoms in the linking group, excluding hydrogen and halogen atoms, as well as any atoms on side or branch groups, to the total number of atoms in the groups A and B, excluding hydrogen and halogen atoms, as well as any atoms on side or branch groups, is 1:2 to 1:500.

18. A surfactant as claimed in claim 1 is selected from the group consisting of:
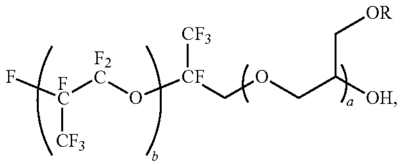
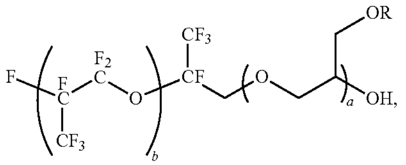
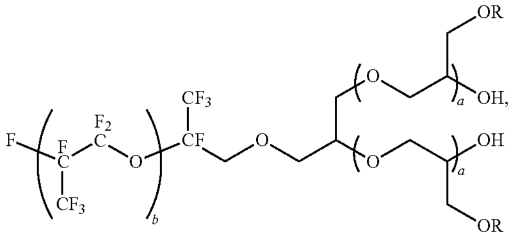
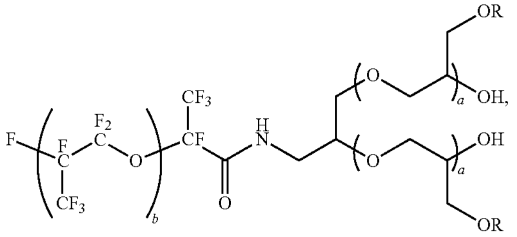
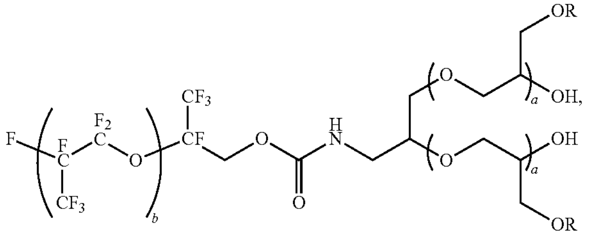
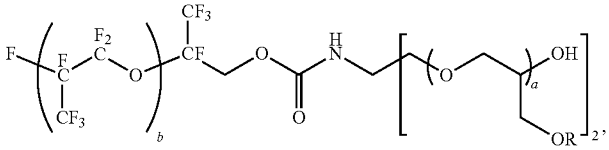
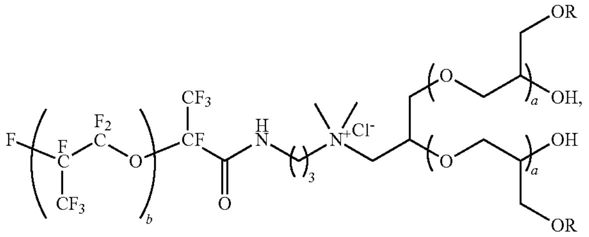
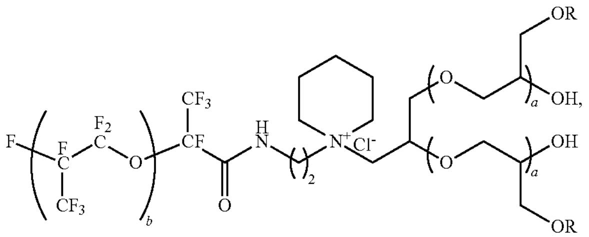

-continued
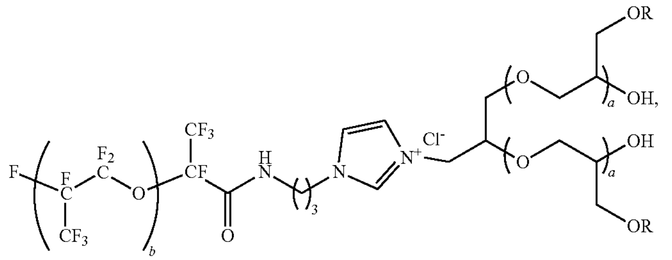
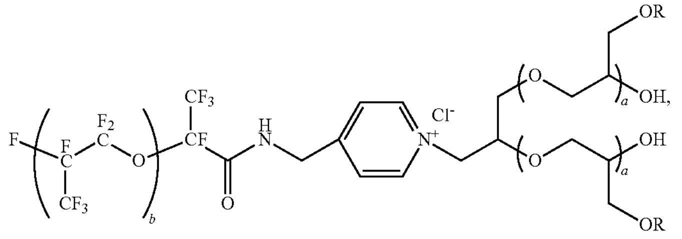
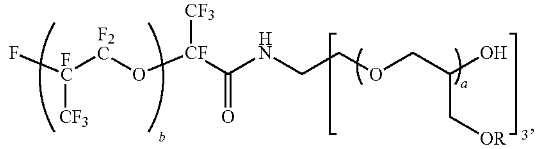
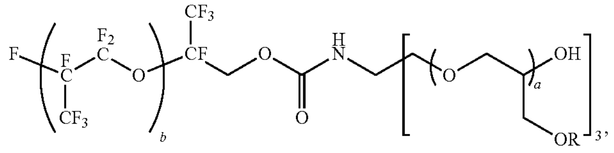
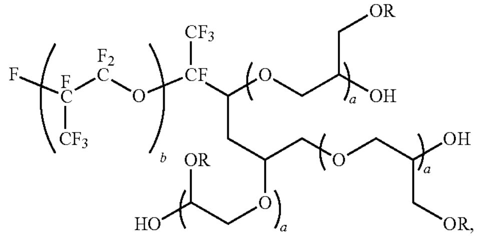
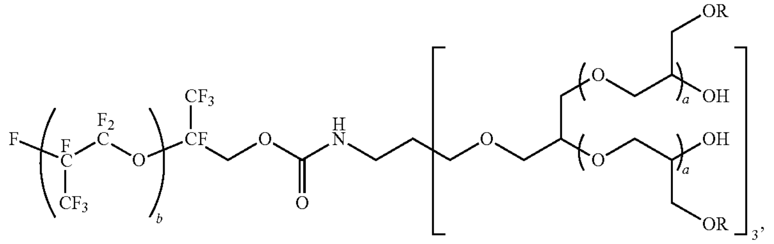
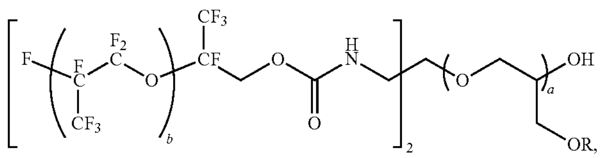
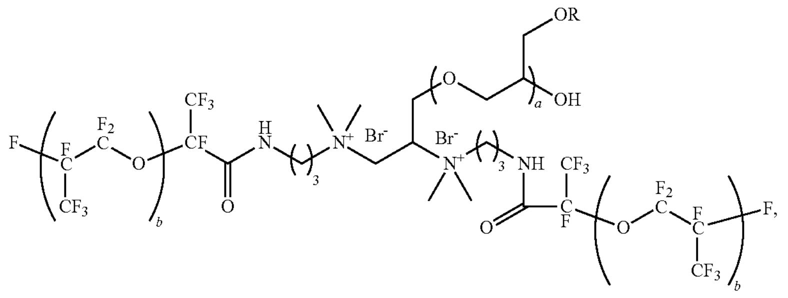

-continued
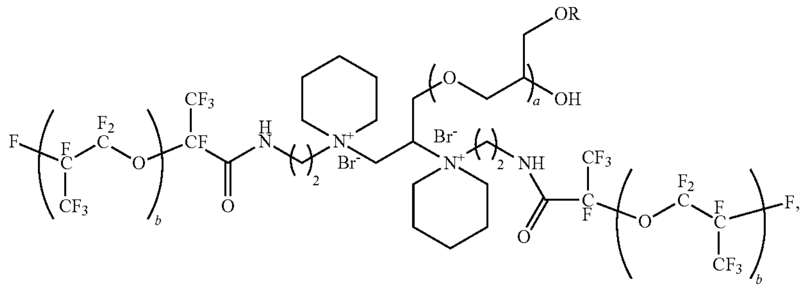
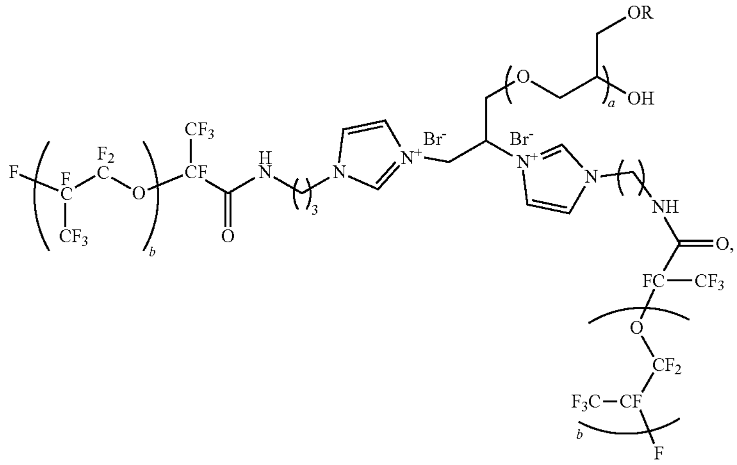
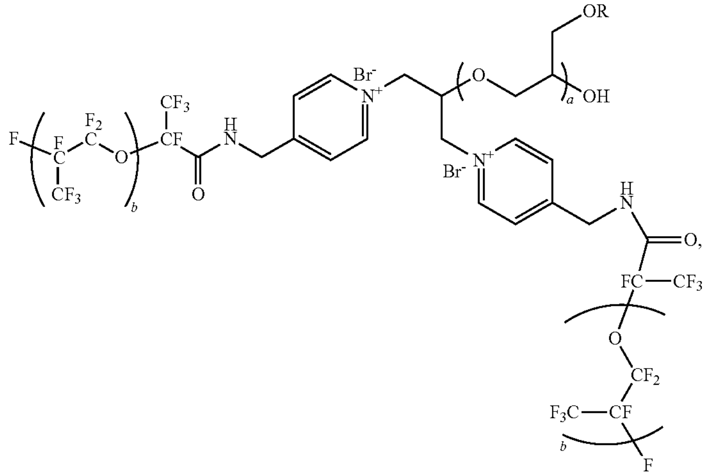
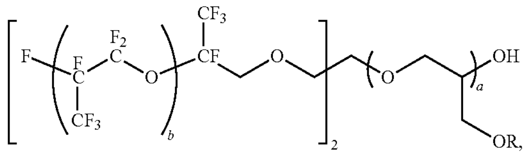
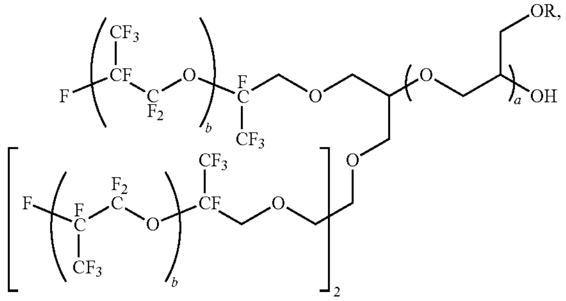

-continued
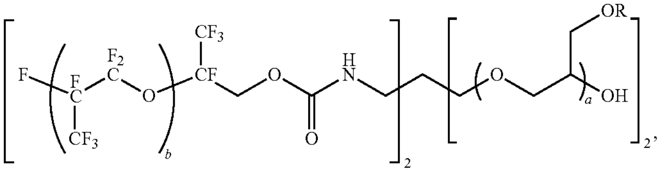
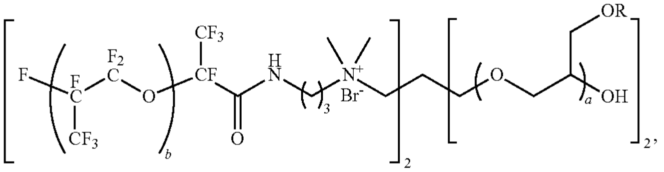
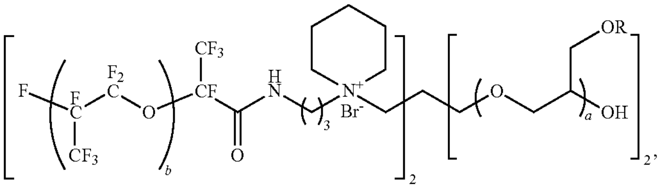
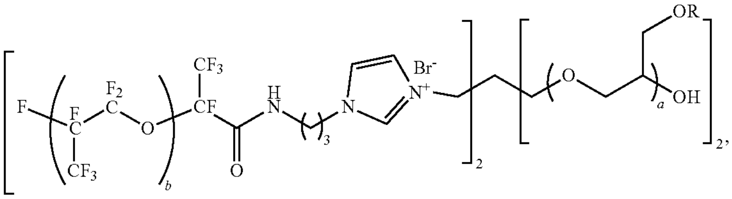
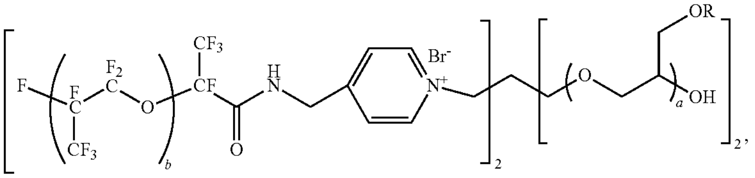
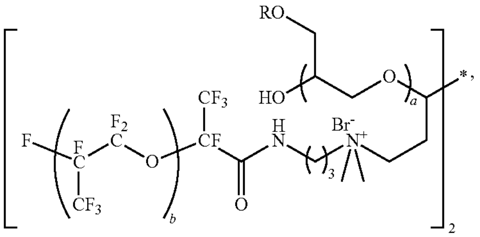
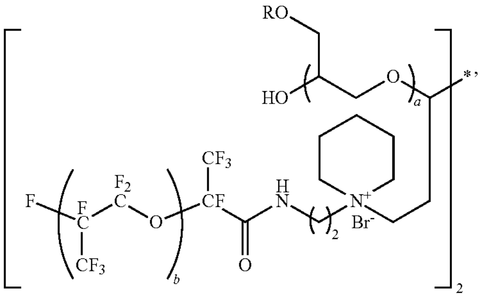
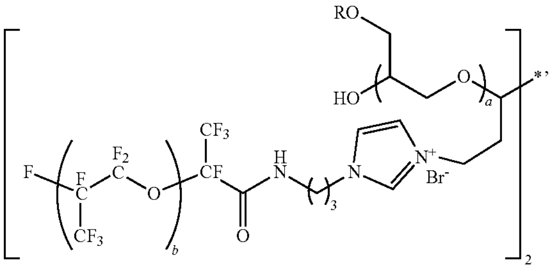

-continued
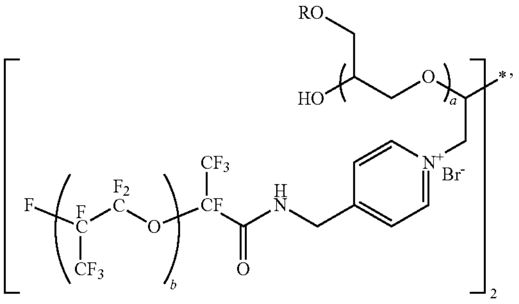
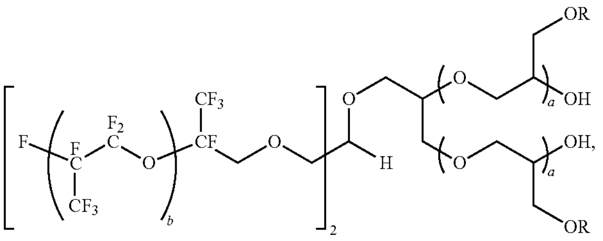
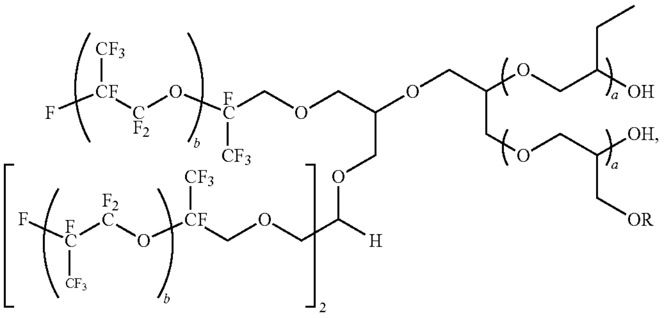
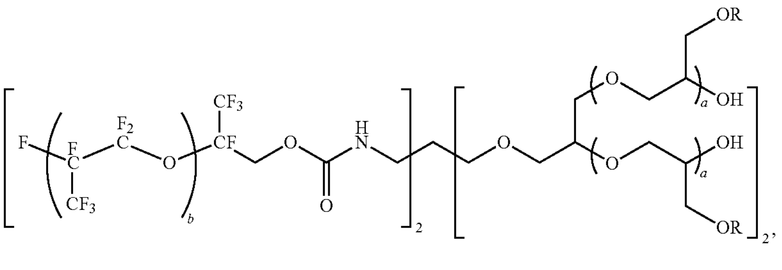
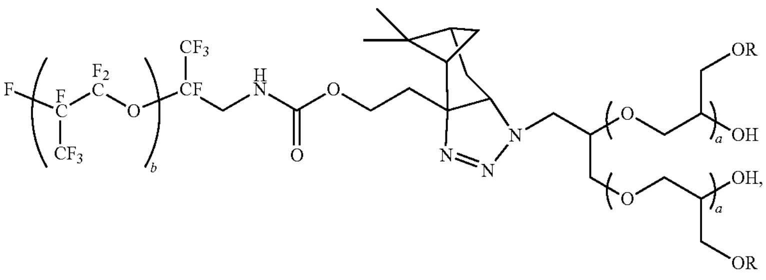
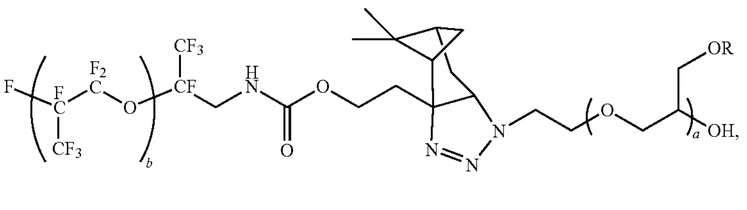

-continued
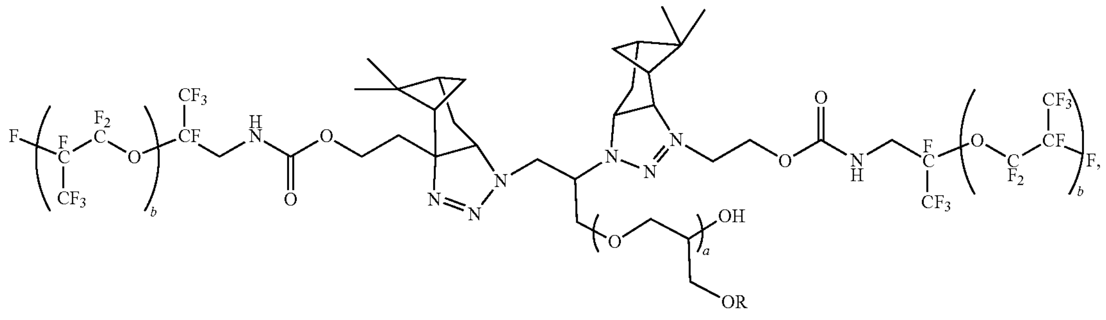
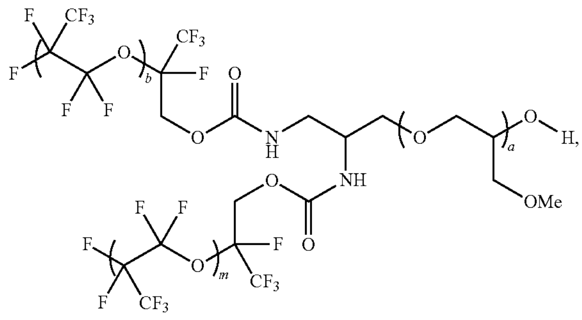
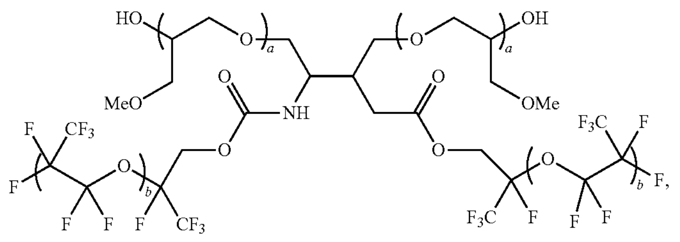
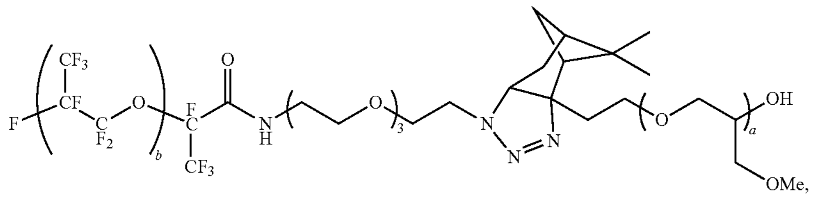
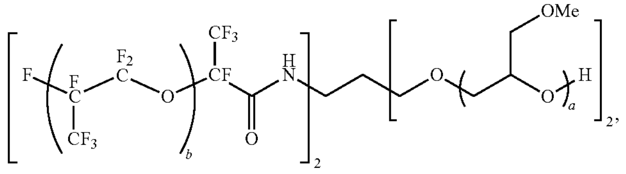
and
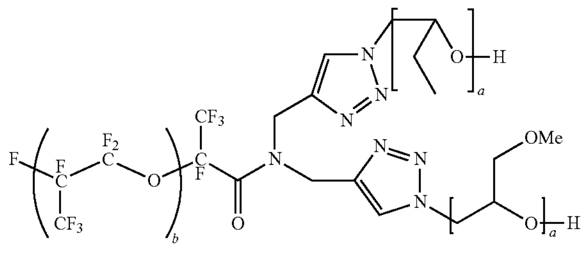

wherein a is an integer between 3 and 50; and b is a positive integer.

19. A method for making a surfactant as claimed in claim 1 comprising:

reacting a compound of formula (II)

$$(A)_m\text{-}X\text{—}(OH)_n \quad \text{(II)}$$

wherein

X is a linking group;

each A is independently a fluorocarbon or a perfluoropolyether;

m is an integer between 1 and 10;

n is an integer between 1 and 10;

with a compound of formula (III)

(III)

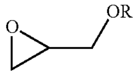

wherein each R is independently $C_{1-6}$ alkyl, $CH_2CH_2OC_{1-6}$ alkyl or $CH_2CH(CH_3)OC_{1-6}$ alkyl;

or reacting a compound comprising $(A)_m$ with a compound comprising $(B)_n$, wherein said reaction is a coupling reaction and forms linker X between said $(A)_m$ and said $(B)_n$.

20. A composition, comprising a surfactant of formula (I) as claimed in claim 1.

21. A composition as claimed in claim 20, wherein the composition is an emulsion, and wherein said emulsion comprises a continuous oil phase and a discontinuous aqueous phase.

22. A method comprising performing one or more chemical and/or biological reactions, and/or biological processes in the discontinuous aqueous phase of an emulsion as claimed in claim 21.

* * * * *